(12) United States Patent
Terada et al.

(10) Patent No.: US 8,705,925 B2
(45) Date of Patent: Apr. 22, 2014

(54) OPTICAL WAVEGUIDE FILM, LAMINATED TYPE OPTICAL WAVEGUIDE FILM, OPTICAL WAVEGUIDE, OPTICAL WAVEGUIDE ASSEMBLY, OPTICAL WIRING LINE, OPTICAL/ELECTRICAL COMBINATION SUBSTRATE AND ELECTRONIC DEVICE

(75) Inventors: Shinsuke Terada, Utsunomiya (JP); Koji Choki, Kawasaki (JP)

(73) Assignee: Sumitomo Bakelite Company Limited, Tokyo (JP)

( * ) Notice: Subject to any disclaimer, the term of this patent is extended or adjusted under 35 U.S.C. 154(b) by 364 days.

(21) Appl. No.: 13/000,050

(22) PCT Filed: Jun. 16, 2009

(86) PCT No.: PCT/JP2009/060961
§ 371 (c)(1),
(2), (4) Date: Dec. 20, 2010

(87) PCT Pub. No.: WO2009/154206
PCT Pub. Date: Dec. 23, 2009

(65) Prior Publication Data
US 2011/0110623 A1    May 12, 2011

(30) Foreign Application Priority Data

Jun. 20, 2008 (JP) ................................. 2008-161882
Feb. 23, 2009 (JP) ................................. 2009-039821
Mar. 27, 2009 (JP) ................................. 2009-080298
Apr. 16, 2009 (JP) ................................. 2009-099622

(51) Int. Cl.
*G02B 6/26* (2006.01)
*G02B 6/42* (2006.01)
*G02B 6/10* (2006.01)

(52) U.S. Cl.
USPC .............................. 385/129; 385/46; 385/130

(58) Field of Classification Search
USPC ........................................................ 385/129
See application file for complete search history.

(56) References Cited

U.S. PATENT DOCUMENTS 5,195,162 A    3/1993   Sultan et al.
6,012,855 A    1/2000   Hahn
(Continued)

FOREIGN PATENT DOCUMENTS

JP    62 502146    8/1987
JP    02 000903    1/1990
(Continued)

OTHER PUBLICATIONS

International Search Report issued Sep. 8, 2009 in PCT/JP09/060961 filed Jun. 16, 2009.
(Continued)

*Primary Examiner* — Uyen Chau N Le
*Assistant Examiner* — Kajli Prince
(74) *Attorney, Agent, or Firm* — Oblon, Spivak, McClelland, Maier & Neustadt, L.L.P.

(57) ABSTRACT

An optical waveguide film includes at least one optical waveguide area having an X-direction and a Y-direction orthogonal to the X-direction. Such an optical waveguide film includes a plurality of core portions arranged side by side within the same layer so as to extend along the X-direction, each of the core portions having side surfaces, and the core portions adjoining to each other in the Y-direction being arranged through a gap therebetween; and a plurality of cladding portions provided so as to cover the side surfaces of each of the core portions, each of the cladding portions formed of a resin having an optical refractive index smaller than that of each of the core portions, and the cladding portion between the adjoining core portions providing each gap. In the optical waveguide film, a size of the gap between the adjoining core portions varies along the X-direction in at least a part of the optical waveguide area. This makes it possible to precisely match a gap between core portions in a cut end surface with a desired value by selection of cutting positions of the optical waveguide film even when the optical waveguide film is shrunken.

44 Claims, 28 Drawing Sheets

(56) References Cited

U.S. PATENT DOCUMENTS

| | | | |
|---|---|---|---|
| 6,993,233 B2* | 1/2006 | Shimizu et al. | 385/129 |
| 2005/0018989 A1 | 1/2005 | Shimizu et al. | |
| 2008/0013903 A1 | 1/2008 | Fujii et al. | |
| 2011/0110623 A1 | 5/2011 | Terada et al. | |

FOREIGN PATENT DOCUMENTS

| | | |
|---|---|---|
| JP | 06-160666 | 6/1994 |
| JP | 06 160666 | 6/1994 |
| JP | 06-186455 | 7/1994 |
| JP | 06 186455 | 7/1994 |
| JP | 08 271768 | 10/1996 |
| JP | 08-271768 | 10/1996 |
| JP | 11 231158 | 8/1999 |
| JP | 11-231158 | 8/1999 |
| JP | 2002-131566 | 5/2002 |
| JP | 2002 131566 | 5/2002 |
| JP | 2003 322740 | 11/2003 |
| JP | 2003-322740 | 11/2003 |
| JP | 2004-118117 | 4/2004 |
| JP | 2004 118117 | 4/2004 |
| JP | 2004-334057 | 11/2004 |
| JP | 2004 334057 | 11/2004 |
| JP | 2005-043785 | 2/2005 |
| JP | 2005 043785 | 2/2005 |
| JP | 2005 070193 | 3/2005 |
| JP | 2005-070193 | 3/2005 |
| JP | 2005-128513 | 5/2005 |
| JP | 2005 128513 | 5/2005 |
| JP | 2005 250270 | 9/2005 |
| JP | 2005-250270 | 9/2005 |
| JP | 2006 011179 | 1/2006 |
| JP | 2006-011179 | 1/2006 |
| JP | 2006 23385 | 1/2006 |
| JP | 2006-23385 | 1/2006 |
| JP | 2007-84765 | 4/2007 |
| JP | 2007 84765 | 4/2007 |
| JP | 2008-020722 | 1/2008 |
| JP | 2008 020722 | 1/2008 |

OTHER PUBLICATIONS

U.S. Appl. No. 13/062,309, filed Mar. 4, 2011, Terada, et al.
Extended European Search Report issued Oct. 9, 2013 in European Patent Application No. 09766654.9, filed Jun. 16, 2009.
Office Action issued Dec. 18, 2012, in Japanese Patent Application No. 2008-161882.
Office Action issued Dec. 18, 2012, in Japanese Patent Application No. 2009-039821.
Office Action issued Dec. 18, 2C12, in Japanese Patent Application No. 2009-099622.

* cited by examiner

OPTICAL WAVEGUIDE FILM, LAMINATED TYPE OPTICAL WAVEGUIDE FILM, OPTICAL WAVEGUIDE, OPTICAL WAVEGUIDE ASSEMBLY, OPTICAL WIRING LINE, OPTICAL/ELECTRICAL COMBINATION SUBSTRATE AND ELECTRONIC DEVICE

TECHNICAL FIELD

The present invention relates to an optical waveguide film, a laminated type optical waveguide film, an optical waveguide, an optical waveguide assembly, an optical wiring line, an optical/electrical combination substrate and an electronic device.

BACKGROUND ART

Along with the advent of information era, a broadband capable of communicating a large volume of information at a high speed becomes widespread. Transmission devices such as a router device and a WDM (Wavelength Division Multiplexing) device are used as devices for sending information to the broadband.

Optical communication technology for transferring data through use of optical carrier waves is employed in the transmission devices. A multiplicity of optical waveguides are used as a means for guiding the optical carrier waves from one point to another.

Each of the optical waveguides includes a linear core portion and a cladding portion configured so as to cover the core portion. The core portion is made of a material which does not substantially absorb the optical carrier waves, while the cladding portion is formed of a material having a refractive index smaller than that of the core portion.

In the optical waveguide having such a configuration, light introduced from one end of the core portion is reflected by an interfacial surface between the core portion and the cladding portion and then transferred to the other end of the core portion. A light emitting element such as a semiconductor laser is arranged at an incoming side of the optical waveguide.

On the other hand, a light receiving element such as a photodiode is arranged at an outgoing side of the optical waveguide. Light emitted from the light emitting element travels along the optical waveguide and arrives at the light receiving element. Communication is performed according to flickering patterns of the light received by the light receiving element.

In recent years, a quantity of information treated by the transmission devices tends to increase, thereby requiring an increased transmission speed and an increased density of the optical waveguide. There are also many demands for size reduction and density increase of the transmission devices. In other words, a demand has existed for a multichannel type light transmission module having reduced light loss and increased reliability.

For the above demand, patent document 1 discloses a laminated type flexible optical waveguide having a plurality of core portions (waveguide cores) and exhibiting high bendability. Such an optical waveguide is a multichannel type and is therefore capable of transmitting a large quantity of information. Further, the optical waveguide is made of a transparent resin material and can make communication even when being bent. This makes it possible to efficiently use a mounting space within a transmission device.

Further, patent document 2 discloses a prior art regarding an optical waveguide having a film shape similar to that disclosed in patent document 1.

The conventional optical waveguide is usually made of a resin material. Therefore, when being solidified in a production process of the optical waveguide, the resin material is shrunken. This means that shrinkage of the optical waveguide is unavoidable. As a consequence, dimensional accuracy between the core portions (channels) of the optical waveguide is reduced, which in turn impairs connectivity of the optical waveguide with a connection counterpart (e.g., connector).

In other words, a size of a gap between the core portions of the optical waveguide, through which light is propagated, is changed due to the shrinkage of the optical waveguide. Thus, a channel pitch of the optical waveguide does not match a channel pitch of the connector. This increases optical connection loss in an optical connection portion between the optical waveguide and the connector, which may possibly impair the quality of optical communication.

If the conventional multichannel type optical waveguide is optically connected to a multi-core connector such as a MPO connector (JIS C 5982), there is posed a problem in that the optical connection loss becomes greater. As described above, the optical waveguide is molded with a polymer material. Inasmuch as the optical waveguide is shrunken in a molding process thereof, a pitch (gap) between the core portions of the optical waveguide is also reduced in the molding process thereof.

Difficulties are involved in accurately controlling and precisely estimating a shrinkage ratio of the optical waveguide. For this reason, when the multichannel type optical waveguide is connected to the multi-core optical connector, positional misalignment occurs between optical fiber cores of the multi-core optical connector and the core portions of the optical waveguide. Presumably, this increases the optical connection loss.

FIG. 33 is a view schematically showing a positional relationship between core portions 99 of a conventional multichannel type optical waveguide 990 and optical fiber cores 810 and 820 of multi-core optical connectors 81 and 82 as connection counterparts.

As shown in FIG. 33, the multichannel type optical waveguide 990 is usually connected to the multi-core optical connectors 81 and 82 provided with the optical fiber cores 810 and 820 corresponding to an arrangement of the core portions 99. This makes it possible to propagate optical signals between the optical waveguide 990 and the multi-core optical connectors 81 and 82.

If a resin material is heavily shrunken in a production process of the optical waveguide 990, however, positional misalignment occurs between optical axes of the core portions 99 of the optical waveguide 990 and optical axes of the optical fiber cores 810 and 820 of the multi-core optical connectors 81 and 82 as shown in FIG. 33. This increases the optical connection loss between the multi-core optical connectors 81 and 82 and the optical waveguide 990.

In addition, there is a possibility that an optical signal propagating through one of the core portions (channels) 99 is not received to a right optical fiber core (channel) 820, but is leaked to an adjoining optical fiber core 820 in the connection portion to the multi-core optical connector 82.

On the contrary, there is also a possibility that an optical signal propagating through one of the optical fiber cores 810 is not received to a right core portion 99, but is leaked to an adjoining core portion 99 in the connection portion to the multi-core optical connector 81 (which is called "cross torque").

Occurrence of such leakage impairs the quality of optical communication.

It is difficult to accurately control a shrinkage ratio of the resin material. Even if the optical waveguide is designed by preliminarily assuming the shrinkage of the resin material, dimensional accuracy of the optical waveguide becomes insufficient.

On the other hand, the above optical waveguide also can be obtained by dividing an optical waveguide film. Specifically, the optical waveguide film is cut along longitudinal directions of cladding portions included therein so that the optical waveguide film is divided into a plurality of strip-shaped optical waveguides.

In this cutting process, the plurality of cladding portions can be cut at one time through use of a multi-blade saw having a plurality of saw blades arranged at an equal interval. At this time, there is a need to match a size of a gap between the core portions of the optical waveguide film with a size of a gap between the saw blades.

FIGS. 34(a) and 34(b) are views each explaining a method of cutting a conventional multichannel type optical waveguide film 10' using a multi-blade saw. FIG. 34(a) is a front view of the optical waveguide film 10' as seen from an end portion side thereof and FIG. 34(b) is a top view of the optical waveguide film 10'.

The optical waveguide film 10' is formed of a laminated body in which a cladding layer 901, a core layer 903 and a cladding layer 902 are laminated one above another. The core layer 903 includes a plurality of rectilinear core portions 904 arranged side by side at an equal interval when seen in a plan view and a plurality of cladding portions 905 adjoining to the respective core portions 904.

As shown in FIG. 34(a), a multi-blade saw 7 having a plurality of saw blades 71 arranged at an equal interval is positioned above the optical waveguide film 10'. Each of the saw blades 71 has a circular shape when seen in a plan view. A rotation shaft 72 passes through central portions of the saw blades 71.

In such a multi-blade saw 7, the saw blades 71 are pressed against the optical waveguide film 10' while rotating the rotation shaft 72. A size of a gap between the saw blades 71 is preliminarily adjusted in conformity with a size of a gap (pitch) between the cladding portions 905. Thus, the optical waveguide film 10' is cut in positions corresponding to central lines of the respective cladding portions 905.

The optical waveguide film 10' is severed into a plurality of strip-shaped optical waveguides 90 at one time by moving the saw blades 71 along longitudinal directions of the respective cladding portions 905 of the optical waveguide film 10' as indicated by arrows in FIG. 34(b).

In the meantime, a resin material as a raw material of the optical waveguide film 10' is subjected to shrinkage as it is solidified in a production process thereof. Since a shrinkage ratio of the resin material is affected by factors such as a composition or raw substances of the resin material and a production environment, dimension of the optical waveguide film 10' necessarily involves individual variability.

In the case where the optical waveguide film 10' having such individual dimension variability is cut with the blade saw 7, the size of the gap between the saw blades 71 need to be adjusted on a case-by-case basis in conformity with the individual dimension variability. As a result, efficiency of cutting works is reduced sharply.

Further, if a plurality of optical waveguide films 10' are cut with no adjustment of the size of the gap between the saw blades 71, positions of the core portions 904 in each of the optical waveguide films 10' are deviated according to the individual dimension variability.

Consequently, the core portions 904 are off-centered in each of the optical waveguides 90 thus diced, which impairs connectivity of each of the optical waveguides 90. In other words, the off-centering of the core portions 904 increases light loss in a connection portion between each of the optical waveguides 90 and a connection counterpart thereof.

Further, off-centering amounts of the core portions 904 tend to be cumulatively increased toward outer sides of the optical waveguide film 10'. Therefore, in each of the optical waveguides 90 diced from outer sides of the optical waveguide film 10', there is a case that cutting traces of the saw blades 71 interfere with a part of the core portions 904. Such optical waveguides may possibly lower their functions.

Patent document 1: JP-A 2007-84765
Patent document 2: JP-A 2006-23385

DISCLOSURE OF THE INVENTION

It is an object of the present invention to provide: an optical waveguide film which can precisely match a size of a gap between core portions in a cut end surface with a desired value by selection of cutting positions of the optical waveguide film even when the optical waveguide film is shrunken, and can suppress optical connection loss with respect to a connection counterpart even if the size of the gap between the core portions becomes indefinite under influence of shrinkage of a resin material constituting the optical waveguide film; a laminated type optical waveguide film produced by laminating the optical waveguide film; an optical waveguide having high reliability and obtained using the optical waveguide film; an optical wiring line; an optical/electrical combination substrate; and an electronic device.

Another object of the present invention is to provide: an optical waveguide assembly which can eliminate a need to change a cutting pitch in every cutting works even if individual variability in a size of a gap between core portions occurs under influence of shrinkage of a resin material constituting the optical waveguide assembly, and can efficiently produce a plurality of optical waveguides each having reduced eccentricity even if the optical waveguide assembly is cut at a uniform cutting pitch; an optical wiring line having high reliability and provided with an optical waveguide produced by cutting the optical waveguide assembly; an optical/electrical combination substrate; and an electronic device.

In order to achieve the above object, the present invention is directed to an optical waveguide film including at least one optical waveguide area, the optical waveguide area having an X-direction and a Y-direction orthogonal to the X-direction, comprising:

a plurality of core portions arranged side by side within the same layer so as to extend along the X-direction, each of the core portions having side surfaces, and the core portions adjoining to each other in the Y-direction being arranged through a gap therebetween; and a plurality of cladding portions provided so as to cover the side surfaces of each of the core portions, each of the cladding portions formed of a resin having an optical refractive index smaller than that of each of the core portions, and the cladding portion between the adjoining core portions providing each gap, wherein a size of the gap between the adjoining core portions varies along the X-direction in at least a part of the optical waveguide area.

In the above optical waveguide film, it is preferred that in the case where the optical waveguide area is represented by X-Y coordinates, the X-Y coordinates of at least a part of each of the core portions satisfy a relationship represented by the following equation (1) or (2):

$$Y = A\cos(2\pi X/L) + B \quad (1); \text{ or}$$

$$Y = A\sin(2\pi X/L) + B \quad (2),$$

where A, B and L are arbitrary real numbers in the equations (1) and (2).

In other words, the present invention is directed to an optical waveguide film, comprising:

a plurality of elongated core portions arranged side by side on a plane, the core portions each having side surfaces; and a plurality of cladding portions provided so as to cover the side surfaces of the core portions, wherein in the case where mutually orthogonal X-Y coordinates are set on the plane on which the core portions are arranged, the X-Y coordinates of at least a part of each of the core portions satisfy a relationship represented by the following equation (1) or (2):

$$Y = A\cos(2\pi X/L) + B \quad (1); \text{ or}$$

$$Y = A\sin(2\pi X/L) + B \quad (2),$$

where A, B and L are arbitrary real numbers in the equations (1) and (2).

In the above optical waveguide film, it is preferred that in the equations (1) and (2) of each of the core portions, L is the same value, and A and B are different values.

In the above optical waveguide film, it is preferred that the optical waveguide film is made of a solidified product obtained by solidifying a material which undergoes shrinkage when being solidified, wherein before the optical waveguide film is solidified, in the equations (1) and (2) of each of the core portions, A satisfies the following equation (3):

$$A = \pm(R\text{max} - R\text{min})(N-1)P/4 \quad (3),$$

where Rmax and Rmin are arbitrary real numbers of 1 or more, Rmax is greater than Rmin, N satisfies the following equation (5), and P is a positive real number in the equation (3), $$N = N_0 + 2 - 2n \quad (5),$$

where $N_0$ is the total number of the core portions, and n is an arrangement order of the core portions from an external side thereof in the equation (5).

In the above optical waveguide film, it is also preferred that the optical waveguide film is made of a solidified product obtained by solidifying a material which undergoes shrinkage when being solidified, wherein before the optical waveguide film is solidified, in the equations (1) and (2) of each of the core portions, B satisfies the following equation (4):

$$B = \pm(R\text{max} + R\text{min})(N-1)P/4 \quad (4),$$

where Rmax and Rmin are arbitrary real numbers of 1 or more, Rmax is greater than Rmin, N satisfies the following equation (5), and P is a positive real number in the equation (4), $$N = N_0 + 2 - 2n \quad (5),$$

where $N_0$ is the total number of the core portions, and n is an arrangement order of the core portions from an external side thereof in the equation (5).

In the above optical waveguide film, it is preferred that in the equations (3) and (4) of each of the core portions, Rmax is the same value, and Rmin is also the same value.

In the above optical waveguide film, it is preferred that the optical waveguide film is adapted to be connected to a connection counterpart, the connection counterpart having light receiving portions optically connected to the core portions of the optical waveguide film, respectively, wherein in the equations (3) and (4) of each of the core portions, P is equal to the size of the gap between the light receiving portions of the connection counterpart.

In the above optical waveguide film, it is preferred that in the equations (3) and (4) of each of the core portions, P is the same value.

In the above optical waveguide film, it is preferred that the core portions comprise M core portions (where M is an integer of 3 or more), and gaps between the M core portions adjoining to each other in the Y-direction are M−1 in number, wherein a ratio of sizes of the M−1 gaps is constant in an entire of the optical waveguide area.

In the above optical waveguide film, it is preferred that each of the core portions provides an optical path, wherein an inclination angle of the optical path thereof with respect to the X-direction continuously varies along the X-direction in at least a part of each of the core portions.

In the above optical waveguide film, it is preferred that the size of the gap between the core portions continuously varies along the X-direction in the at least a part of the optical waveguide area.

In the above optical waveguide film, it is preferred that the size of the gap between the core portions cyclically varies along the X-direction in the at least a part of the optical waveguide area.

In the above optical waveguide film, it is preferred that the inclination angle of the optical path of each of the core portions with respect to the X-direction is 1° or less.

Further, it is preferred that the above optical waveguide film further comprises at least one alignment pattern formed along the X-direction, the alignment pattern including a plurality of alignment marks.

In the above optical waveguide film, it is preferred that the alignment pattern is formed within the same layer as the core portions.

In the above optical waveguide film, it is preferred that the alignment pattern further includes at least one linear pattern which divides the optical waveguide area including the core portions.

In the above optical waveguide film, it is preferred that each of the core portions is formed of a first norbornene-based material as a major component thereof and each of the cladding portions is formed of a second norbornene-based material having a refractive index lower than that of the first norbornene-based material as a major component thereof.

In the above optical waveguide film, it is preferred that the optical waveguide film is adapted to be used by being cut along the Y-direction, wherein the optical waveguide film has at least one expected cutting area where the optical waveguide film is to be cut along the Y-direction, and a width of the cladding portion positioned between the adjoining core portions continuously varies at one and the other X-direction end sides of the expected cutting area.

In other words, the present invention is directed to an optical waveguide film having a longitudinal direction, the optical waveguide film being adapted to be used by being cut along a direction orthogonal to the longitudinal direction, comprising:

a plurality of cladding portions extending along the longitudinal direction; and a plurality of core portions extending along the longitudinal direction and adjoining to one another with the cladding portion interposed therebetween, wherein the optical waveguide film has an expected cutting area where the optical waveguide film is to be cut along the direction orthogonal to the longitudinal direction, and a width of the cladding portion positioned between the adjoining core portions continuously varies at one and the other longitudinal end sides of the expected cutting area.

In the above optical waveguide film, it is preferred that the width of the cladding portion continuously increases toward the other X-direction end side of the expected cutting area from the one X-direction end side thereof.

In the above optical waveguide film, it is preferred that in the case where a minimum value and a maximum value of the width of the cladding portion in the expected cutting area are defined as W1 and W2, respectively, a ratio of W1 and W2 (W2/W1) is in the range of 1.01 to 1.1.

In the above optical waveguide film, it is preferred that the at least one expected cutting area includes a plurality of expected cutting areas intermittently existing along the X-direction.

In the above optical waveguide film, it is preferred that the widths of the cladding portions positioned between the respective adjoining core portions continuously vary at the one and the other X-direction end sides of the expected cutting area.

In the above optical waveguide film, it is preferred that a variation percentage of the width of each of the cladding portions is kept constant.

Further, in order to achieve the above object, the present invention is directed to a laminated type optical waveguide film produced by laminating the above optical waveguide film.

Furthermore, in order to achieve the above object, the present invention is directed to an optical waveguide obtained using the above optical waveguide film It is preferred that the above optical waveguide further comprises a cladding layer provided on at least one of surfaces of the optical waveguide film.

Moreover, in order to achieve the above object, the present invention is directed to an optical waveguide assembly provided on an XY plane defined by X-Y coordinates, the optical waveguide assembly being made of a solidified product obtained by solidifying a material which undergoes shrinkage when being solidified, comprising:

a plurality of strip-shaped core portions arranged side by side in the Y-direction so as to extend along the X-direction, each of the core portions having side surfaces;

a plurality of strip-shaped cladding portions provided so as to adjoin to the side surfaces of each of the core portions; and cutter lanes parallel to the X-direction provided in the cladding portions, respectively, wherein the optical waveguide assembly is adapted to produce a plurality of optical waveguides by cutting at least one of the cladding portions provided with the cutter lanes along the X-direction, and wherein the optical waveguide assembly has a varying area where widths of the cladding portions vary along the X-direction, and a ratio of lengths obtained by deducting widths of the cutter lanes from the widths of the cladding portions is kept constant in an arbitrary X-coordinate throughout the varying area of the optical waveguide assembly.

In the above optical waveguide assembly, it is preferred that the width of each of the cutter lanes is the same value.

In the above optical waveguide assembly, it is preferred that the width of each of the cutter lanes is larger than a cutting width of a cutting tool to be used in cutting the optical waveguide assembly.

In the above optical waveguide assembly, it is preferred that the width of each of the cutter lanes is kept constant along the X-direction.

In the above optical waveguide assembly, it is preferred that the cutter lanes are provided in all the cladding portions, or are intermittently provided in a part of the cladding portions in a certain cycle.

In the above optical waveguide assembly, it is preferred that alignment and shapes of the core portions are in a line-symmetric relationship with respect to the X-axis, wherein before the optical waveguide assembly is solidified, in one of the core portions positioned at a Y positive side higher than the X-axis, when the Y coordinates of a contour line of the core portion positioned at the X-axis side are represented by an X function $f_a(X)$ and the Y coordinates of a contour line of the core portion positioned at the opposite side from the X-axis are represented by an X function $f_b(X)$, the functions $f_a(X)$ and $f_b(X)$ satisfy the following equations (7) and (8), respectively:

$$f_a(X) > \{(N'-\tfrac{1}{2})P + N'W\}R\max \qquad (7); \text{and}$$

$$f_b(X) < \{(N'+\tfrac{1}{2})P + N'W\}R\min \qquad (8),$$

where in the equations (7) and (8), N' is an arrangement order of the core portion counted from the X-axis; when the number of the core portions is odd, the arrangement order N' is expressed by an integer reckoned from a central core portion (N'=0); when the number of the core portions is even, the arrangement order N' is expressed by a half-integer reckoned from a core portion closest to the X-axis (N'=0.5); P, W, Rmax and Rmin are the same values in each of the core portions; among them, P is a setting value of a width of each of the optical waveguides produced by cutting the optical waveguide film assembly; W is a cutting width of a cutting tool to be used in cutting the optical waveguide assembly; Rmax and Rmin are real numbers of 1 or more; and Rmax is greater than Rmin.

In the above optical waveguide assembly, it is preferred that the material of the optical waveguide assembly has individual variability in a shrinkage ratio which is a magnification ratio of a pre-solidification dimension to a post-solidification dimension, wherein in the equations (7) and (8), Rmax is a maximum of the shrinkage ratio within the individual variability and Rmin is a minimum of the shrinkage ratio within the individual variability.

In the above optical waveguide assembly, it is preferred that each of the functions $f_a(X)$ and $f_b(X)$ is a sine curve or a cosine curve.

In the above optical waveguide assembly, it is preferred that the functions $f_a(X)$ and $f_b(X)$ are defined by the following equations (9-1) and (10-1), respectively:

$$f_a(X) = A\cos(2\pi X/L) + B - C/2 \qquad (9\text{-}1); \text{and}$$

$$f_b(X) = A\cos(2\pi X/L) + B + C/2 \qquad (10\text{-}1),$$

where A, B and L are arbitrary real numbers, and C is an arbitrary positive real number in the equations (9-1) and (10-1).

In the above optical waveguide assembly, it is also preferred that the functions $f_a(X)$ and $f_b(X)$ are defined by the following equations (9-2) and (10-2), respectively:

$$f_a(X)=A\sin(2\pi X/L)+B-C/2 \quad (9\text{-}2); \text{ and}$$

$$f_b(X)=A\sin(2\pi X/L)+B+C/2 \quad (10\text{-}2),$$

where A, B and L are arbitrary real numbers, and C is an arbitrary positive real number in the equations (9-2) and (10-2).

In the above optical waveguide assembly, it is also preferred that in the equations (9-1), (9-2), (10-1) and (10-2) of each of the core portions, L and C are the same values, and A and B are different values.

In the above optical waveguide assembly, it is preferred that before the optical waveguide assembly is solidified, in the equations (9-1), (9-2), (10-1) and (10-2), A is represented by the following equation (11):

$$A=(R\max-R\min)(P+W)N'/2 \quad (11),$$

where N', P, W, Rmax and Rmin of the equation (11) are the same as N', P, W, Rmax and Rmin of the equations (7) and (8).

In the above optical waveguide assembly, it is also preferred that before the optical waveguide assembly is solidified, in the equations (9-1), (9-2), (10-1) and (10-2), B is represented by the following equation (12):

$$B=(R\max+R\min)(P+W)N'/2 \quad (12),$$

where N', P, W, Rmax and Rmin of the equation (12) are the same as N', P, W, Rmax and Rmin of the equations (7) and (8).

Further, it is preferred that the above optical waveguide assembly further comprises a plurality of alignment marks provided at an arbitrary interval along the X-axis.

In the above optical waveguide assembly, it is preferred that the alignment marks comprise first and second alignment mark groups provided at both outsides of a core portion bundle including the core portions, wherein the alignment marks included in the first alignment mark group and the alignment marks included in the second alignment mark group are provided through the core portion bundle in a paired relationship.

In the above optical waveguide assembly, it is preferred that the alignment marks are made of the same material as the core portions.

In the above optical waveguide assembly, it is preferred that each of the cladding portions provided with the cutter lanes further includes an alignment line formed so as to extend along a center line interconnecting middle points of the cladding portion in the width direction thereof.

In the above optical waveguide assembly, it is preferred that each of the core portions is formed of a first norbornene-based material as a major component thereof and each of the cladding portions is formed of a second norbornene-based material having a refractive index lower than that of the first norbornene-based material as a major component thereof.

Further, in order to achieve the above object, the present invention is directed to an optical wiring line, comprising:
an optical waveguide obtained by cutting the above optical waveguide assembly along the strip-shaped cladding portions provided with the cutter lanes.

In order to achieve the above object, the present invention is also directed to an optical wiring line, comprising:
the above optical waveguide.

Furthermore, in order to achieve the above object, the present invention is directed to an optical/electrical combination substrate, comprising:

a substrate;
an electrical wiring line mounted on the substrate;
the above optical wiring line provided on the substrate.

Moreover, in order to achieve the above object, the present invention is directed to an electronic device, comprising:
the above optical waveguide.

In order to achieve the above object, the present invention is also directed to an electronic device, comprising:
the above optical/electrical combination substrate.

BEST MODE FOR CARRYING OUT THE INVENTION

Hereinafter, an optical waveguide film, a laminated type optical waveguide film, an optical waveguide, an optical waveguide assembly, an optical wiring line, an optical/electrical combination substrate and an electronic device according to the present invention will be described in detail based on certain preferred embodiments shown in the accompanying drawings.

<First Embodiment of Optical Waveguide Film>

First, description will be made on a first embodiment of an optical waveguide film and a laminated type optical waveguide film according to the present invention.

(Structure of Optical Waveguide Film)

Figure 1:
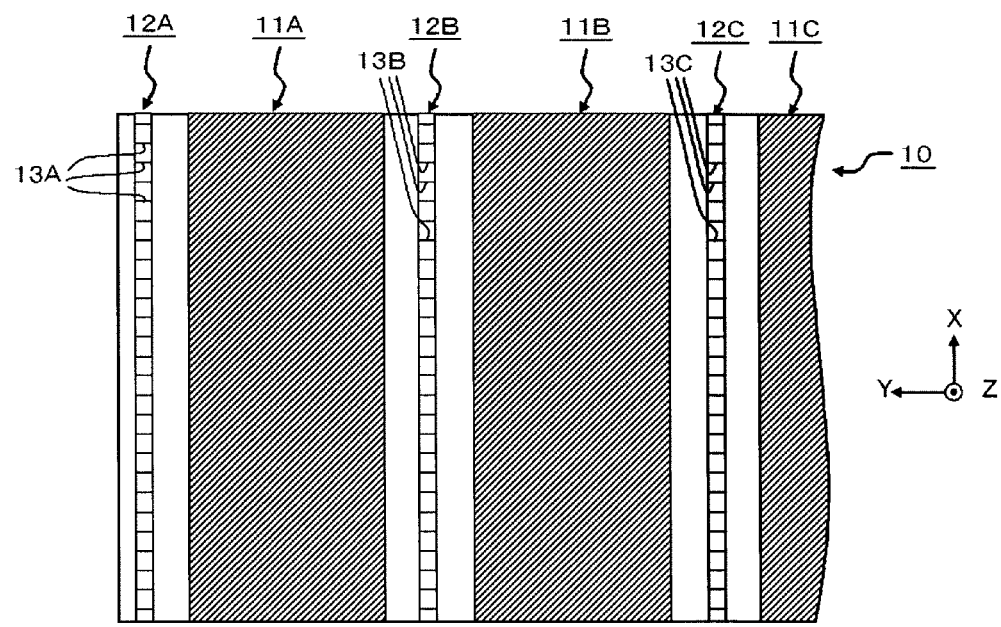
FIG. 1 is a schematic view showing an upper surface of an optical waveguide film according to a first embodiment of the present invention.

FIG. 1 is a schematic view showing an upper surface of an optical waveguide film 10 according to the first embodiment of the present invention. The optical waveguide film 10 includes a plurality of optical waveguide areas 11A, 11B and 11C and a plurality of alignment patterns 12A, 12B and 12C formed along the optical waveguide areas 11A, 11B and 11C.

Each of the optical waveguide areas 11A, 11B and 11C includes a plurality of core portions arranged side by side within the same layer so as to extend along an X-direction and a plurality of cladding portions provided so as to cover side surfaces of each of the core portions. Each of the cladding portions is made of a resin having an optical refractive index smaller than that of each of the core portions.

In each of the optical waveguide areas 11A, 11B and 11C, gaps between the respective adjoining core portions in a Y-direction orthogonal to the X-direction are designed so that sizes of the gaps vary along the X-direction in at least a part of each of the optical waveguide areas 11A, 11B and 11C.

If each of the optical waveguide areas 11A, 11B and 11C includes M core portions (where M is an integer of 3 or more), gaps between the M core portions adjoining to each other in the Y-direction orthogonal to the X-direction are M−1 in number. A ratio of sizes of the M−1 gaps is constant in an entire of each of the optical waveguide areas 11A, 11B and 11C. Moreover, the optical waveguide areas 11A, 11B and 11C are designed so that the sizes of the M−1 gaps vary along the X-direction in at least a part of each of the optical waveguide areas 11A, 11B and 11C.

For example, as set forth below, the core portions can be arranged in each of the optical waveguide areas 11A, 11B and 11C at an equal interval along the Y-direction orthogonal to the X-direction. By designing the Y-direction coordinates of each of the adjoining core portions so as to have, e.g., values of a continuous function with respect to the X-direction coordinates thereof, it is possible to relatively easily arrange the core portions at the equal interval.

In this regard, it is to be noted that examples of the continuous function include a trigonometric function, a polynomial function and a spline function.

The alignment patterns 12A, 12B and 12C are arranged so as to divide the optical waveguide areas 11A, 11B and 11C and are used as reference lines when severing the optical waveguide areas 11A, 11B and 11C through a cutting work. The optical waveguide areas 11A, 11B and 11C are severed by cutting the optical waveguide film 10 along the alignment patterns 12A, 12B and 12C. Each of the optical waveguide areas 11A, 11B and 11C thus severed can be used as an optical waveguide to be connected to a multi-core optical connector (not shown).

Further, the alignment patterns 12A, 12B and 12C are provided with alignment marks 13A, 13B and 13C, respectively. The alignment marks 13A, 13B and 13C are used as reference marks when the optical waveguide areas 11A, 11B and 11C are cut in the Y-direction in conformity with a size of a gap between optical fiber cores (not shown) of the multi-core optical connector.

Figure 2:
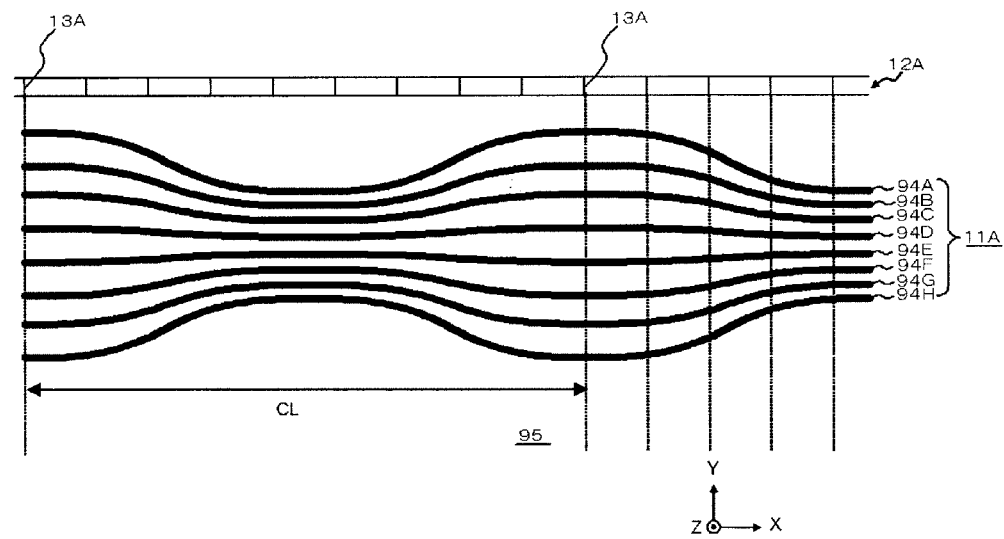
FIG. 2 is a top view showing one example of an optical waveguide pattern formed in an optical waveguide area.

FIG. 2 is a top view showing one example of an optical waveguide pattern formed in the optical waveguide area 11A. As shown in FIG. 2, the optical waveguide area 11A includes a plurality of core portions 94A, 94B, 94C, 94D, 94E, 94F, 94G and 94H arranged side by side so as to extend along the X-direction.

Side surfaces of each of the core portions 94A to 94H are covered with cladding portions 95 each made of a resin having an optical refractive index smaller than that of each of the core portions 94A to 94H. In the following description, one of the core portions 94A to 94H will be referred to as "core portion 94" on occasion.

The core portions 94A to 94H are arranged at an equal interval of several ten μm to several hundred μm in the Y-direction orthogonal to the X-direction. A size of a Y-direction gap (hereinafter referred to as "waveguide gap") between two mutually-adjoining arbitrary core portions among the core portions 94A to 94H is designed so as to cyclically vary with a cycle CL along the X-direction.

Further, an inclination angle of an optical path of each of the core portions 94A to 94H with respect to the X-direction is designed so as to continuously vary along the X-direction. By designing the inclination angle so as to continuously vary along the X-direction, each of the core portions 94A to 94H has no curved part having sharp curvature. This makes it possible to reduce light propagation loss in each of the core portions 94A to 94H.

The alignment pattern 12A includes a plurality of alignment marks 13A arranged along the X-direction. The alignment marks 13A enable a user to grasp the size of the gap between the core portions in positions of the alignment marks 13A. In order to accurately match the size of the gap between the core portions and the positions of the alignment marks 13A, it is desirable that the alignment marks 13A are formed within the same layer as the core portions 94A to 94H and made of the same resin material as the core portions 94A to 94H.

Figure 3:
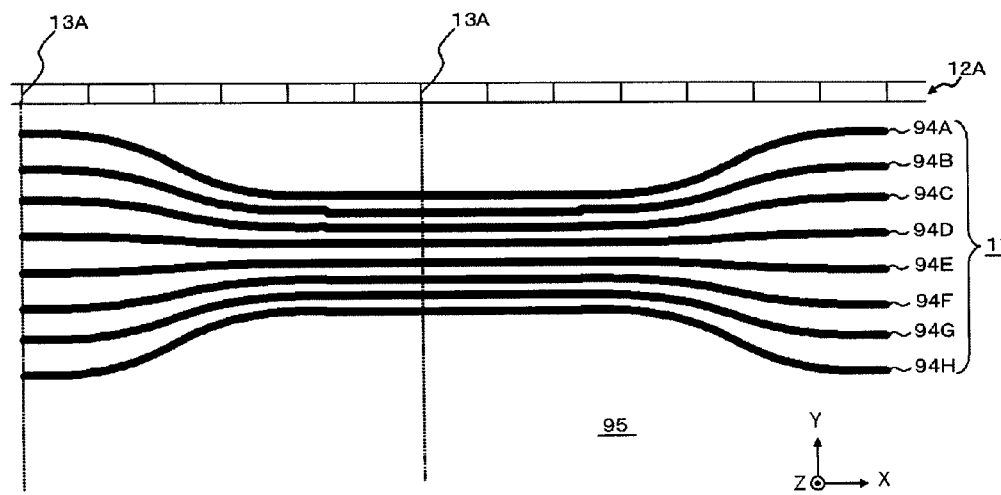
FIG. 3 is a view showing another example of an optical waveguide pattern formed in an optical waveguide area.

FIG. 3 is a view showing another example of an optical waveguide pattern formed in the optical waveguide area 11A. The optical waveguide area 11A shown in FIG. 3 includes a plurality of core portions 94A, 94B, 94C, 94D, 94E, 94F, 94G and 94H arranged side by side so as to extend along the X-direction. Side surfaces of each of the core portions 94A to 94H are covered with cladding portions 95 each made of a resin having an optical refractive index smaller than that of each of the core portions 94A to 94H.

The core portions 94A to 94H shown in FIG. 3 are arranged at an equal interval of several ten µm to several hundred µm in the Y-direction orthogonal to the X-direction. A size of a Y-direction gap (waveguide gap) between two mutually-adjoining arbitrary core portions among the core portions 94A to 94H is constant near an X-direction medial portion. In contrast, the size of the waveguide gap is designed so as to increase toward X-direction opposite end portions.

Further, as inclination angle of an optical path of each of the core portions 94A to 94H with respect to the X-direction is designed so as to continuously vary along the X-direction near the X-direction opposite end portions. This makes it possible to minimize light propagation loss in each of the core portions 94A to 94H.

Just like the alignment pattern 12A shown in FIG. 2, an alignment pattern 12A shown in FIG. 3 includes a plurality of alignment marks 13A arranged along the X-direction. The alignment marks 13A shown in FIG. 3 enable a user to grasp a size of a gap between the core portions in positions corresponding to the alignment marks 13A. A light incoming end surface or a light outgoing end surface having a waveguide gap with a desired size can be formed by cutting the optical waveguide area 11A in the Y-direction based on the positions of the alignment marks 13A.

From the viewpoint of reduction of optical connection loss between the light incoming end surface or the light outgoing end surface and a multi-core optical connector, the inclination angle of the optical path of each of the core portions 94A to 94H with respect to the X-direction (X-axis) is set preferably to 1° or less, more preferably in the range of 0 to 0.8°, and even more preferably in the range of 0.01 to 0.5°. This holds true in the case of the inclination angle of the optical path of each of the core portions 94A to 94H shown in FIG. 2.

FIGS. 4(A) to 4(C) are views each showing a relationship between the core portions 94A to 94H and the alignment marks 13A and 13B. FIG. 4(C) partially shows an upper surface of a core layer 93 of the optical waveguide film 10. FIG. 4(A) is a section view of the optical waveguide film 10 taken along the line A1-A2 in FIG. 4(C). FIG. 4(B) is a section view of the optical waveguide film 10 taken along the line B1-B2 in FIG. 4(C).

As shown in FIG. 4(A), the optical waveguide film 10 includes a lower cladding layer 91, an upper cladding layer 92 and a core layer 93 interposed between the lower cladding layer 91 and the upper cladding layer 92. The core layer 93 includes the core portions 94A to 94H each serving as a channel. Each of the core portions 94A to 94H is horizontally confined by cladding portions 95 and 95.

Further, a pair of dicing lines (linear patterns) 121A and 122A extending in the X-direction are formed in the core layer 93 to make up the alignment pattern 12A. In addition, a pair of dicing lines (linear patterns) 121B and 122B extending in the X-direction are also formed in the core layer 93 to make up the alignment pattern 12B. The dicing lines 121A, 122A, 121B and 122B are made of the same resin material as the core portions 94A to 94H and are formed through the same production process as the core portions 94A to 94H.

The plurality of alignment marks 13A arranged in the Y-direction are formed between the dicing lines 121A and 122A. Likewise, the plurality of alignment marks 13B arranged in the Y-direction are formed between the dicing lines 121B and 122B. The alignment marks 13A and 13B are made of the same resin material as the core portions 94A to 94H and are formed through the same production process as the core portions 94A to 94H.

As shown in FIGS. 4(B) and 4(C), the alignment marks 13A are separated from the dicing lines 121A and 122A and the alignment marks 13B are separated from the dicing lines 121B and 122B. However, the present invention is not limited thereto. The alignment marks 13A may be continuously formed with either or both of the dicing lines 121A and 122A and the alignment marks 13B may be continuously formed with either or both of the dicing lines 121B and 122B.

A position corresponding to the size of the waveguide gap substantially coincident with the size of the gap between the optical fiber cores of the multi-core optical connector is found through visual estimation based on the positions of the alignment marks 13A, 13B and 13C. In the position thus found, the optical waveguide areas 11A, 11B and 11C are cut along the Y-direction, thereby forming a light incoming end surface or a light outgoing end surface having a waveguide gap (a gap between centers of the mutually adjoining core portions) with a desired size.

In this regard, it is not always necessary to cut the optical waveguide film 10 based on the positions of the three alignment marks 13A, 13B and 13C. The optical waveguide film 10 may be cut based on the position or positions of one or two of the alignment marks 13A, 13B and 13C.

Alternatively, the positions of the alignment patterns 12A, 12B and 12C shown in FIG. 3 are measured visually or automatically using a measuring instrument. A Y-direction shrinkage ratio of the optical waveguide film 10 can be calculated according to the measurement result. This shrinkage ratio may be regarded as an X-direction shrinkage ratio of the optical waveguide film 10.

If a user wishes to accurately calculate the X-direction shrinkage ratio of the optical waveguide film 10, the X-direction shrinkage ratio can be calculated according to the measurement result on the positions of the alignment marks 13A, 13B and 13C.

A user or a dicing device also can determine positions of the alignment marks 13A, 13B and 13C coincident with the size of the gap between the optical fiber cores of the multi-core optical connector according to the shrinkage ratio thus calculated. In these positions, the optical waveguide areas 11A, 11B and 11C can be cut along the Y-direction.

As set forth above, the optical waveguide pattern of the core portions of the optical waveguide film 10 according to the present embodiment has a structure with which a light incoming end surface or a light outgoing end surface having a waveguide gap with a desired size can be formed by cutting the optical waveguide areas 11A, 11B and 11C in desired positions along the Y-direction in conformity with the size of the gap between the optical fiber cores of the multi-core optical connector.

Therefore, even if the optical waveguide film 10 is shrunken, it is possible to easily produce an optical waveguide having a reduced optical connection loss when being connected to the multi-core optical connector.

In addition, the provision of the alignment marks 13A, 13B and 13C corresponding to the size of the gap between the core portions makes it possible to accurately grasp the shrinkage ratio of the optical waveguide film 10. Accordingly, it is possible to readily produce an optical waveguide coincident with the size of the gap between the optical fiber cores of the multi-core optical connector based on the positions of the alignment marks 13A, 13B and 13C.

With the present invention described above, the size of the waveguide gap continuously varies under a predetermined rule. Therefore, even if shrinkage occurs in the optical waveguide film, dimension on the cut end surface can be kept accurate by selecting a position where the size of the waveguide gap of the optical waveguide and the size of the waveguide gap of the connection counterpart (connector) are coincident with each other and cutting the optical waveguide film in this position.

This makes it possible to enhance connectivity with the connection counterpart (to reduce the optical connection loss). This provides an optical waveguide film which can produce an optical waveguide capable of making optical communication with high quality.

In other words, the present invention can provide an optical waveguide film which can produce an optical waveguide having a structure capable of reducing optical connection loss when being connected to a multi-core optical connector.

Next, description will be made on various kinds of production methods of the optical waveguide film 10. The production methods to be described below are substantially the same as those disclosed in JP-A 2006-323318.

(Production Method of Optical Waveguide Film)

A production method of the optical waveguide film 10 described above will be described with reference to FIGS. 5(A) and 5(B), FIG. 6, FIG. 7, FIG. 8 and FIGS. 9(A) and 9(B). FIGS. 5(A) and 5(B), FIG. 6, FIG. 7, FIG. 8 and FIGS. 9(A) and 9(B) are section views each schematically showing a step of the production method of the optical waveguide film 10.

Figure 5:
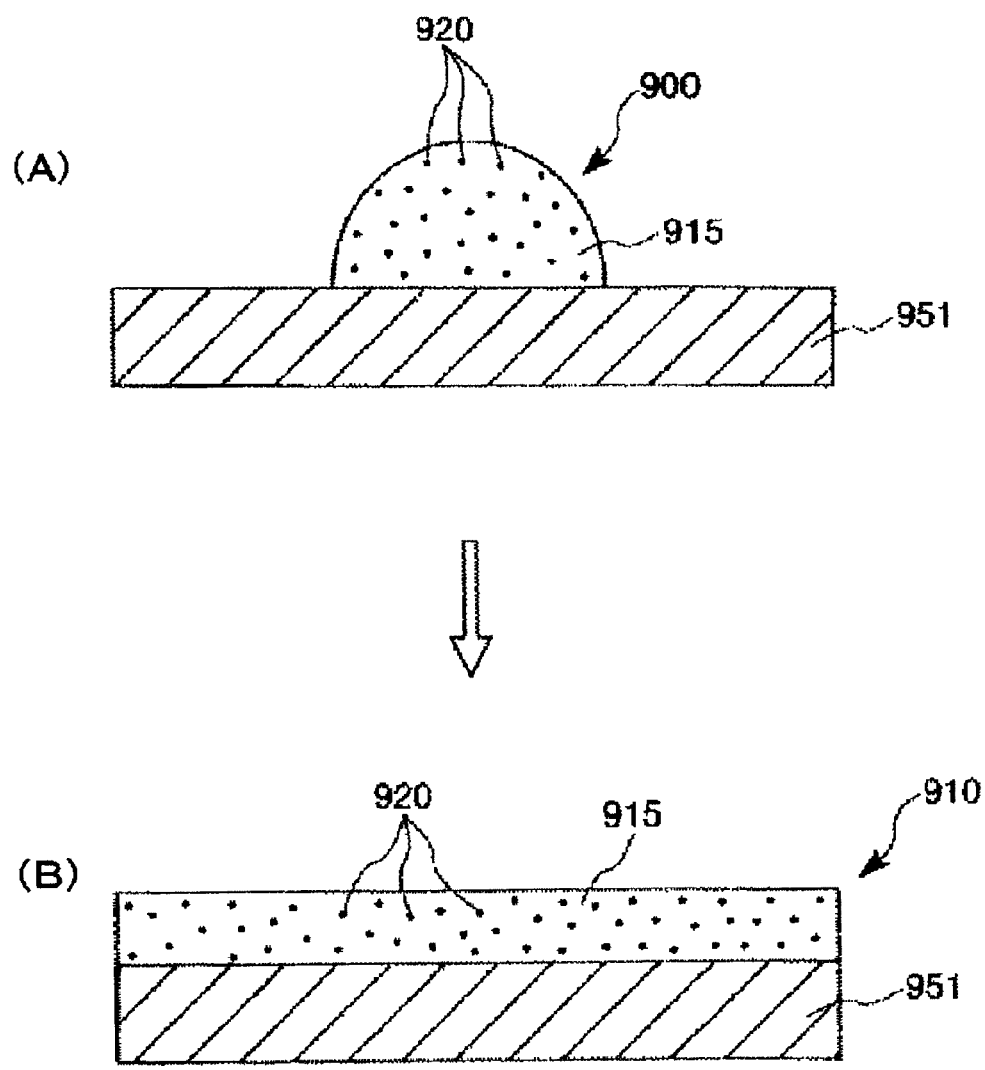
FIGS. 5(A) and 5(B) are section views each schematically showing a step of a production method of the optical waveguide film.

As shown in FIGS. 5(A) and 5(B), first, a layer 910 is formed on a supporting substrate 951. The layer 910 can be formed by applying a core layer forming material (varnish) 900 onto the supporting substrate 951, and then curing (hardening) the same.

Specifically, the layer 910 can be formed by applying the core layer forming material 900 onto the supporting substrate 951 to form a liquid coating thereon, and then placing the supporting substrate 951 on which the liquid coating has been formed on a level table under a ventilatory state to thereby evaporate (desolvate) a solvent contained in the liquid coating therefrom while leveling uneven portions existing on a surface thereof. Such a layer 910 will be brought into the core layer 93 which serves as a base of the optical waveguide film 10.

In the case where the layer 910 is formed using an application method, examples of the application method include a doctor blade method, a spin coating method, a dipping method, a table coating method, a spraying method, an applicator method, a curtain coating method, a die coating method and the like. However, the application method is not limited thereto.

As the supporting substrate 951, a silicon substrate, a silicon dioxide substrate, a glass substrate, a quartz substrate, a polyethylene terephthalate (PET) film and the like can be used.

The core layer forming material 900 is a material containing a photo-induced thermally developable material (hereinafter, referred to as "PITDM") formed of a polymer (resin component) 915 and an additive 920 (including at least a monomer, a cocatalyst and a procatalyst, in the present embodiment). When the material is irradiated by actinic radiation and heating, reaction of molecules of the monomer occur in the polymer 915.

In the obtained layer 910, molecules of the polymer (matrix) 915 are substantially uniformly distributed in a random order, and in the polymer 915, molecules (or compounds) of the additive 920 are substantially uniformly dispersed in a random order. As a result, in the layer 910, the molecules of the additive 920 are substantially uniformly dispersed in a random order.

Since an average thickness of such a layer 910 is appropriately set depending on a thickness of the core layer 93 to be formed, it is not limited to a specific value, but is preferably in the range of about 5 to 200 µm, more preferably in the range of about 10 to 100 µm, and even more preferably in the range of about 15 to 65 µm.

It is preferable to use a polymer 915 having sufficiently high transparency (being transparent and colorless) and compatibility with the monomer which will be described below. In addition, it is also preferable to use a polymer 915 in which the molecules of the monomer can be reacted (polymerized or cross-linked) as described below, the polymer 915 that can maintain the sufficiently high transparency even after the molecules of the monomer are reacted.

In this regard, the expression "having compatibility" means that the monomer can be at least blended with the polymer 915 so as to cause no phase separation between the monomer and the polymer 915 in the core layer forming material 900 and the layer 910.

Examples of such a polymer 915 include a cyclic olefin-based resin such as a norbornene-based resin or a benzo cyclobutene-based resin, an acryl-based resin, a methacryl-based resin, polycarbonate, polystyrene, epoxy resin, polyamide, polyimide, polybenzoxazole and the like, and one or more of which may be used independently or in combination (e.g., a polymer alloy, a polymer blended body (mixture), a copolymer or the like).

Among them, it is especially preferred that the polymer 915 contains the norbornene-based resin (norbornene-based polymer) as a major component thereof. By using the polymer 915 containing the norbornene-based polymer as the major component thereof, it is possible to obtain a core layer 93 having an excellent optical transmission property and superior heat resistance.

Further, since the norbornene-based polymer has a high hydrophobic property, it is possible to obtain a core layer whose dimensional change hardly occurs due to water absorption thereof.

The norbornene-based polymer may be either a homopolymer composed of molecules including single repeating units or a copolymer composed of molecules including two or more kinds of repeating units.

Examples of such a norbornene-based polymer include addition-type polymers such as (1) an addition-type (co)polymer composed of molecules each obtained by addition (co) polymerization reaction between molecules of a norbornene-based monomer, (2) an addition-type copolymer composed of molecules each obtained by addition copolymerization reaction between the molecules of the norbornene-based monomer and molecules of ethylene or α-olefin, and (3) an addition-type copolymer composed of molecules each obtained by addition copolymerization reaction between the molecules of the norbornene-based monomer, molecules of non-conjugated diene, and, if needed, molecules of another monomer; and ring opening-type polymers such as (4) a ring opening-type norbornene-based (co)polymer or a (co)polymer obtained by hydrogenating, if needed, the ring opening-type norbornene-based (co)polymer, (5) a ring opening-type norbornene-based copolymer composed of molecules each obtained by ring opening copolymerization reaction between the molecules of the norbornene-based monomer and the molecules of the ethylene or α-olefin or a copolymer obtained by hydrogenating, if needed, the ring opening-type norbornene-based copolymer, and (6) a ring opening-type norbornene-based copolymer composed of molecules each obtained by ring opening copolymerization reaction between the molecules of the norbornene-based monomer and the molecules of the non-conjugated diene or another monomer or a copolymer obtained by hydrogenating, if needed, the ring opening-type norbornene-based copolymer.

In this regard, examples of these copolymers include a random copolymer, a block copolymer, an alternating copolymer and the like.

These norbornene-based polymers can be obtained using various kinds of well known polymerizations such as ring opening metathesis polymerization (ROMP), a combination of ROMP and hydrogenation, polymerization via radicals or cations, polymerization using a cationic palladium polymerization initiator and polymerization using another polymerization initiator (e.g., a nickel polymerization initiator or another transition metal polymerization initiator).

As a polymer 915 having a relatively high refractive index, a norbornene-based polymer composed of molecules each including aralkyl norbornene repeating units is preferably used. Such a norbornene-based polymer has an especially high refractive index.

Examples of an aralkyl group (aryl alkyl group) included in each of the aralkyl norbornene repeating units include a benzyl group, a phenyl ethyl group, a phenyl propyl group, a phenyl butyl group, a naphthyl ethyl group, a naphthyl propyl group, a fluorenyl ethyl group, a fluorenyl propyl group and the like. Among them, it is especially preferred that the aralkyl group is the benzyl group or the phenyl ethyl group.

This is because the norbornene-based polymer including composed of the molecules each including such repeating units has a extremely high refractive index.

Further, a norbornene-based polymer composed of molecules each including alkyl norbornene repeating units is also preferably used. Since the norbornene-based polymer composed of the molecules each including the alkyl norbornene repeating units has high plasticity, use of such a norbornene-based polymer makes it possible to impart high flexibility to the optical waveguide film 10 (that is, an optical waveguide 9 finally obtained as described below).

Examples of an alkyl group included in each of the alkyl norbornene repeating units include a propyl group, a butyl group, a pentyl group, a hexyl group, a heptyl group, an octyl group, a nonyl group, a decyl group and the like. Among them, it is especially preferred that the alkyl group is the hexyl group. In this regard, it is to be noted that these alkyl groups may be either a linear type or a branched type.

In the case where the norbornene-based polymer is composed of the molecules each including the hexyl norbornene repeating units, it can maintain the high plasticity thereof while preventing the refractive index thereof from being lowered.

In this regard, the optical waveguide 9 is preferably used in a data communication utilizing a light having a wavelength region of about 600 to 1,550 nm. Therefore, since such a norbornene-based polymer composed of the molecules each including the hexyl norbornene repeating units has excellent permeability for the above light having the wavelength region (especially, near 850 nm), it is preferably used.

The norbornene-based polymer is not limited to a specific kind, but preferred examples of the norbornene-based polymer include a hexyl norbornene homopolymer, a phenyl ethyl norbornene homopolymer, a benzyl norbornene homopolymer, a hexyl norbornene/phenyl ethyl norbornene copolymer, a hexyl norbornene/benzyl norbornene copolymer and the like.

The core layer forming material 900 of the present embodiment contains a monomer, a cocatalyst (first substance) and a procatalyst (second substance) as the additive 920.

As described below, when the layer 910 is irradiated with actinic radiation, molecules of the monomer are reacted to produce a reaction product within irradiated regions of the layer 910 which is irradiated with the actinic radiation. As a result, a refractive index difference between the irradiated regions of the layer 910 and non-irradiated regions thereof which is not irradiated with the actinic radiation is caused due to existence of the reaction product.

In this regard, the reaction product contains at least one kind selected from the group comprising a polymer composed of polymeric molecules each obtained by polymerizing the molecules of the monomer in the polymer (matrix) 915, cross-linking chemical structures each cross-linking molecules of the polymer 915, and branching chemical structures each branching from the molecules of the polymer which are obtained by bonding the molecules of the monomer thereto. Examples of the branching chemical structures include branch polymers and side chains (pendant groups).

In the case where it is required that the refractive index of each of the irradiated regions of the layer 910 becomes high, a polymer 915 having a relatively low refractive index is used in combination with a monomer each having a refractive index higher than that of the polymer 915. On the other hand, in the case where it is required that the refractive index of each of the irradiated regions of the layer 910 becomes low, a polymer 915 each having a relatively high refractive index is used in combination with a monomer each having a refractive index lower than that of the polymer 915.

In this regard, it is to be noted that the term "high" or "low" for the refractive index does not mean an absolute value of the refractive index, but means a relative relation between refractive indexes of two certain materials.

In the case where the refractive index of each of the irradiated regions of the layer 910 is lowered due to reaction of the molecules of the monomer (production of the reaction product), each of the irradiated regions becomes the cladding portion 95. On the other hand, in the case where the refractive index of each of the irradiated regions of the layer 910 is increased due to the reaction of the molecules of the monomer, each of the irradiated regions becomes the core portion 94.

Such a monomer is not limited to a specific kind, as long as it contains compounds each having polymerizable chemical structure(s). Examples of the monomer include a norbornene-based monomer, an acrylic acid (methacrylic acid)-based monomer, a styrene-based monomer, an epoxy-based monomer and a cyclic ether-based monomer such as an oxetanebased monomer, and one or more of which may be used independently or in combination.

For example, in the case where the acrylic acid (methacrylic acid)-based monomer, the cyclic ether-based monomer or the epoxy-based monomer is used as the monomer, the addition of the procatalyst (second substance) may be omitted.

Among them, it is preferred that the norbornene-based monomer is used as the monomer. Use of the norbornene-based monomer makes it possible to obtain a core layer 93 having an excellent optical transmission property and superior heat resistance and flexibility.

As the monomer, a cross-linkable monomer (cross-linking agent) also can be used instead of the above-mentioned monomer or in combination with the above-mentioned monomer. The cross-linkable monomer is composed of molecules (compounds) which can be cross-linked in the presence of the procatalyst described below.

By using the cross-linkable monomer, the following advantages can be obtained. Namely, since the molecules of the cross-linkable monomer can be polymerized more rapidly, a required time for forming the core layer 93 can be shortened. Further, since the cross-linkable monomer is hard to be evaporated even if it is heated, increase of a vapor pressure thereof can be suppressed. In addition, since the cross-linkable monomer has excellent heat resistances, it is possible to improve the heat resistance of the core layer 93.

As the cross-linkable norbornene-based monomer, there are a fused multicyclic ring systems compound and a linked multicyclic ring systems compound.

Among various kinds of the cross-linkable norbornene-based monomers, dimethyl bis(norbornene methoxy) silane (SiX) is especially preferable. The SiX has a sufficient low refractive index with respect to the norbornene-based polymer composed of molecules each including the alkyl norbornene repeating units and/or the aralkyl norbornene repeating units.

Therefore, when the layer 910 is irradiated with the actinic radiation described below, the refractive index of each of the irradiated regions thereof can be reliably lowered so that each of them becomes the cladding portion 95. Further, a refractive index difference between the core portions 94 and the cladding portions 95 can be enhanced. This makes it possible to improve properties such as the optical transmission property of the core layer 93.

In this regard, it is to be noted that the above monomers may be used independently or in arbitrary combination.

The procatalyst (second substance) is a substance that can initiate reaction (e.g., polymerization reaction, cross-linking reaction or the like) of the molecules of the monomer, the substance whose activation temperature is changed under the action of an activated cocatalyst (first substance) by being irradiated with the actinic radiation described below.

Any substance whose activation temperature is changed (raised or lowered) according to the irradiation of the actinic radiation can be used as the procatalyst, but a substance whose activation temperature is lowered according to the irradiation of the actinic radiation is especially preferably used.

In the case where such a substance is used as the procatalyst, it is possible to form the core layer 93 by carrying out a heat treatment at a relatively low temperature. This makes it possible to prevent layers other than the core layer 93 from being heated unnecessarily. As a result, lowering of the properties such as the optical transmission property of the optical waveguide 9 can be prevented.

Further, in a state that the activation temperature of the procatalyst is lowered (an active but latent state of the procatalyst), a difference between the lowered activation temperature and an original activation temperature thereof is preferably in the range of about 10 to 80° C., and more preferably in the range of about 10 to 50° C. This makes it possible to reliably cause the refractive index difference between the core portions 94 and the cladding portions 95.

It is preferable to use the procatalyst containing (mainly composed of) at least one kind of compounds each represented by $Pd(OAc)_2(P(i-Pr)_3)_2$ and compounds each represented by $Pd(OAc)_2(P(Cy)_3)_2$. Hereinafter, on occasion, the $Pd(OAc)_2(P(i-Pr)_3)_2$ will be abbreviated as "Pd545" and the $Pd(OAc)_2(P(Cy)_3)_2$ will be abbreviated as "Pd785".

The cocatalyst (first substance) is a substance that is activated by being irradiated with the actinic radiation and can change the activation temperature of the procatalyst (that is, a polymerization initiation temperature of the molecules of the monomer).

As such a cocatalyst, any substance can be used as long as it is activated due to change (reaction or cleavage) of a chemical structure thereof by being irradiated with the actinic radiation. A cocatalyst (photoinitiator) containing (mainly composed of) compounds that are cleaved by being irradiated with actinic radiation having a predetermined wavelength so that they produce cations such as protons or other positive ions and weakly coordinating anions (hereinafter, referred to as "WCA"s) can be preferably used. In this regard, each of the weakly coordinating anions can substitute for a cleavable group included in the compounds of the procatalyst.

Examples of the weakly coordinating anion include a tetrakis(pentafluorophenyl) boric acid ion (hereinafter, referred to as "$FABA^-$"), a hexafluoro antimonic acid ion (hereinafter, referred to as "$SbF_6^-$") and the like.

Examples of the cocatalyst (photo acid generator or photo base generator) include tetrakis(pentafluorophenyl) gallate, aluminates, antimonates, other borates, other gallates, other carboranes and other halocarboranes in addition to tetrakis (pentafluorophenyl) borates and hexafluoro antimonate.

Further, the core layer forming material 900 may contain a sensitizing agent, if needed. The sensitizing agent has a function of reducing a time and energy required for the activation (reaction or cleavage) of the cocatalyst by enhancing sensitivity thereof for the actinic radiation and/or a function of changing the wavelength of the actinic radiation to a wavelength suitable for the activation of the cocatalyst.

Such a sensitizing agent is not limited to a specific type because it is appropriately selected depending on the sensitivity of the cocatalyst, a peak wavelength which the sensitizing agent can absorb and the like. Examples of the sensitizing agent include anthracenes such as 9,10-dibutoxy anthracene (CAS 76275-14-4), xanthones, anthraquinones, phenanthrenes, chrysenes, benzpyrenes, fluoranthenes, rubrenes, pyrenes, indanthrenes, thioxanthen-9-ones, and one of them may be singly used and mixtures thereof may be used.

Concrete examples of the sensitizing agent include 2-isopropyl-9H-thioxanthen-9-one, 4-isopropyl-9H-thioxanthen-9-one, 1-chloro-4-propoxy thioxanthone, phenothiazine, and mixtures thereof.

An amount of the sensitizing agent contained in the core layer forming material 900 is not limited to a specific value, but is preferably 0.01 wt % or more, more preferably 0.5 wt % or more, and even more preferably 1 wt % or more. On the other hand, an upper limit value of the amount of the sensitizing agent contained in the core layer forming material 900 is preferably 5 wt % or less.

Furthermore, the core layer forming material 900 may contain an anti-oxidizing agent. This makes it possible to prevent generation of undesirable free radicals and/or natural oxidation of the polymer 915. As a result, it is possible to improve properties of the obtained core layer 93.

Examples of a solvent to be used for preparing the core layer forming material 900 include various kinds of organic solvents such as an ether-based solvent (e.g., diethyl ether, diisopropyl ether, 1,2-dimethoxyethane (DME), 1,4-dioxane, tetrahydrofuran (THF), tetrahydropyran (THP), anisole, diethylene glycol dimethyl ether (diglyme) or diethylene glycol ethyl ether (carbitol)), a cellosolve-based solvent (e.g., methyl cellosolve, ethyl cellosolve or phenyl cellosolve), an aliphatic hydrocarbon-based solvent (e.g., hexane, pentane, heptane or cyclohexane), an aromatic hydrocarbon-based solvent (e.g., toluene, xylene, benzene or mesitylene), a heteroaromatic ring compound-based solvent (e.g., pyridine, pyrazine, furan, pyrrole, thiophene or methylpyrrolidone), an amide-based solvent (e.g., N,N-dimethyl formamide (DMF) or N,N-dimethyl acetamide (DMA)), a halogen compound-based solvent (e.g., dichloromethane, chloroform or 1,2-dichloroethane), an ester-based solvent (e.g., ethyl acetate, methyl acetate or ethyl formate), an sulfur compound-based solvent (dimethyl sulfoxide (DMSO) or sulfolane), mixture solvents thereof and the like.

In the meanwhile, examples of a method of removing (desolvating) the solvent from the liquid coating formed on the supporting substrate 951 include a natural drying method, a forced drying method such as a method of placing the liquid coating under a heating or reduced pressure condition or a method of blowing inert gas to the liquid coating, and the like.

In this way, the layer 910 formed from a film-like solidified product (or a film-like cured product) of the core layer forming material 900 is formed on the supporting substrate 951. At this time, the layer (dried film of the PITDM) 910 has a first refractive index (R1). This first refractive index is obtained under the actions of the polymer 915 and the monomer each dispersed (distributed) uniformly in the layer 910.

Figure 6:
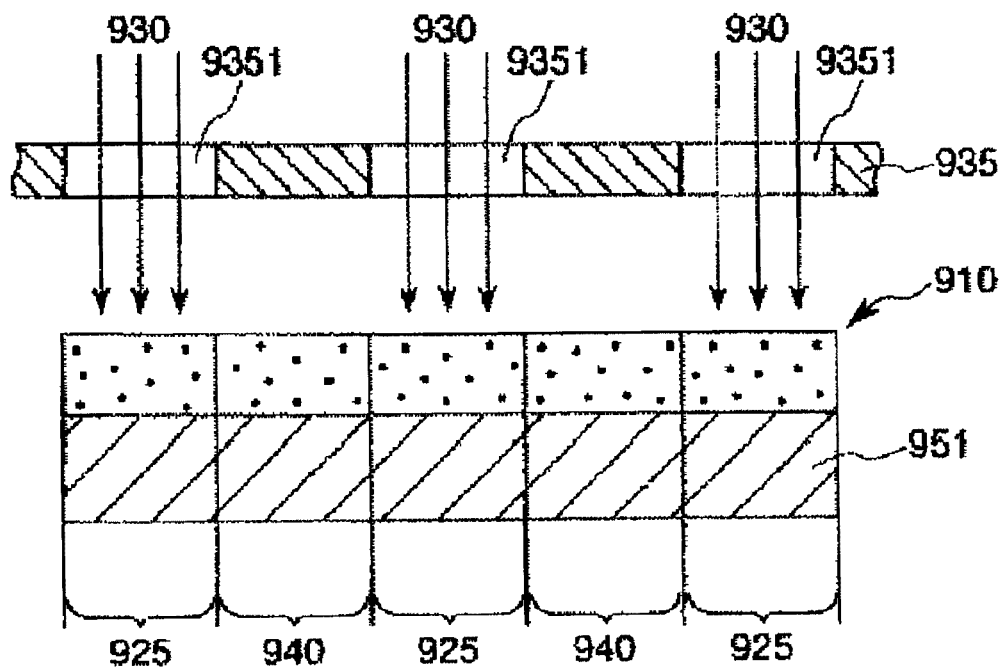
FIG. 6 is a section view schematically showing a step of the production method of the optical waveguide film.

Next, as shown in FIG. 6, a mask (masking) 935 provided with openings (windows) 9351 is prepared, and then the layer 910 is irradiated with the actinic radiation (activated energy beam) 930 through the mask 935.

Hereinafter, description will be made on a case that monomer having a refractive index lower than that of the polymer 915 and a procatalyst whose activation temperature is lowered by being irradiated with the actinic radiation 930 are used. Namely, in this case, the irradiated regions 925 which have been irradiated with the actinic radiation 930 become the cladding portions 95.

Therefore, in this case, the mask 935 has openings (windows) 9351 each having a pattern corresponding to that of each of the cladding portions 95 to be formed. Each of these openings 9351 defines a transmission portion through which the actinic radiation 930 to be used for irradiating is passed.

The mask 935 may be either a mask which has been made in advance (independently) such as a mask having a plate shape or a mask which is formed on the layer 910 using, for example, a vapor phase deposition method or an application method.

Preferred examples of the mask 935 include a photo mask made of quartz glass, PET or the like, a stencil mask, a metal thin film formed using the vapor phase deposition method (e.g., an evaporation method, a sputtering method or the like), and the like. Among them, the photo mask or the stencil mask is particularly preferably used. This is because cladding portions 95 (or core portions 94) each having a fine pattern can be formed with high accuracy. Further, since handling of such a mask is easy, it is of advantage to improve productivity of the core layer 93.

Further, in FIG. 6, the openings (windows) 9351 each having the pattern corresponding to that of each of the cladding portions 95 to be formed are formed by partially removing a base substrate so as to allow portions corresponding to the non-irradiated regions 940 which is not irradiated with the actinic radiation 930 to remain.

Alternatively, in the case where the base substrate is made of quartz glass, PET or the like, the mask can be obtained by forming shielding portions made of a shielding material composed of metal such as chromium on the base substrate. In such a mask, portions of the base substrate on which the shielding portions are not formed serve as the openings (transmission portions) 9351.

The actinic radiation 930 to be used has only to be able to cause optical reaction (change) of the cocatalyst. For example, an electron ray, an X ray or the like can be used in addition to a visible light, an UV light, an infrared light and a laser beam.

Such an actinic radiation 930 is not limited to a specific type, because it is appropriately selected depending on kinds of the cocatalyst, kinds of the sensitizing agent (in the case where it is contained) and the like. It is preferred that the actinic radiation 930 has a peak wavelength in the range of 200 to 450 nm. This makes it possible to activate the cocatalyst relatively easily.

Further, an exposure dose of the actinic radiation 930 is preferably in the range of about 0.1 to 9 $J/cm^2$, more preferably in the range of about 0.2 to 6 $J/cm^2$, and even more preferably in the range of about 0.2 to 3 $J/cm^2$. This makes it possible to reliably activate the cocatalyst.

A constituent material of the mask 935 is selected depending on kinds of the actinic radiation 930 to be used for irradiating. Specifically, as the constituent material of the mask 935, a material which does not allow the actinic radiation 930 to pass can be preferably used. In this regard, any well known material can be used as the constituent material of the mask 935, as long as it has the above effect.

When the layer 910 is irradiated with the actinic radiation 930 through the mask 935, the compounds of the cocatalyst (first substance) existing within each of the irradiated regions 925 which have been irradiated with the actinic radiation 930 are reacted (bonded) or cleaved under the action of the actinic radiation 930, to thereby extricate (produce) the cations (protons or other positive ions) and the weakly coordinating anions (WCAs).

At this time, the cations or the weakly coordinating anions change (cleave) chemical structures of the compounds of the procatalyst (second substrate) existing within each of the irradiated regions 925. As a result, the procatalyst is brought into the active but latent state (latent active state).

In this regard, in the active but latent state (latent active state), although the procatalyst has the activation temperature lower than the original activation temperature, it cannot allow the molecules of the monomer to be reacted without temperature rise, that is, at room temperature.

Therefore, even after the layer 910 is irradiated with the actinic radiation 930, in the case where the layer 910 is stored at a temperature of, for example, about −40° C., it can maintain a state that the molecules of the monomer are not reacted in the layer 910. For this reason, the core layers 930 can be obtained at a time by preparing a plurality of the layers 910 which have been irradiated with the actinic radiation 930, and then subjecting the layers 910 to a heat treatment. This process is of high utility value.

In this regard, it is to be noted that in the case where a light having high directivity such as the laser beam is used as the actinic radiation 930, the use of the mask 935 may be omitted. A wavelength of the laser beam is not limited to a specific value, but is preferably 1.3 μm or less, and more preferably in the range of 800 to 1,000 nm.

Next, the layer 910 is subjected to a heat treatment (first heat treatment). At this time, the procatalyst in the active but latent state is activated (brought into an active state) within each of the irradiated regions 925, as a result of which the molecules of the monomer are reacted (polymerized or cross-linked) due to the activation of the procatalyst.

When the reaction of the molecules of the monomer progresses within each of the irradiated regions 925, a concentration of the monomer therein is gradually lowered. In this way, a difference between the concentration of the monomer in each of the irradiated regions 925 and a concentration of the monomer in each of the non-irradiated regions 940 is caused. In order to eliminate the difference, the monomer contained in each of the non-irradiated regions 940 is diffused and assembled to each of the irradiated regions 925. This phenomenon is referred to as "monomer diffusion".

As a result, the molecules of the monomer and/or a reaction product thereof (polymeric molecules, cross-linking chemical structures or branching chemical structures) are increased within each of the irradiated regions 925. Chemical structures each derived from the molecules of the monomer remarkably have an effect on the refractive index of each of the irradiated regions 925 so that it is lowered up to a second refractive index lower than the first refractive index. In this case, addition-type (co)polymeric molecules are mainly produced as the polymeric molecules.

On the other hand, since the monomer is diffused from each of the non-irradiated regions 940 to each of the irradiated regions 925, an amount of the molecules of the monomer contained in each of the non-irradiated regions 940 is lowered. The molecules of the polymer 915 remarkably have an effect on the refractive index of each of the non-irradiated regions 940 so that it is increased up to a third refractive index higher than the first refractive index.

Figure 7:
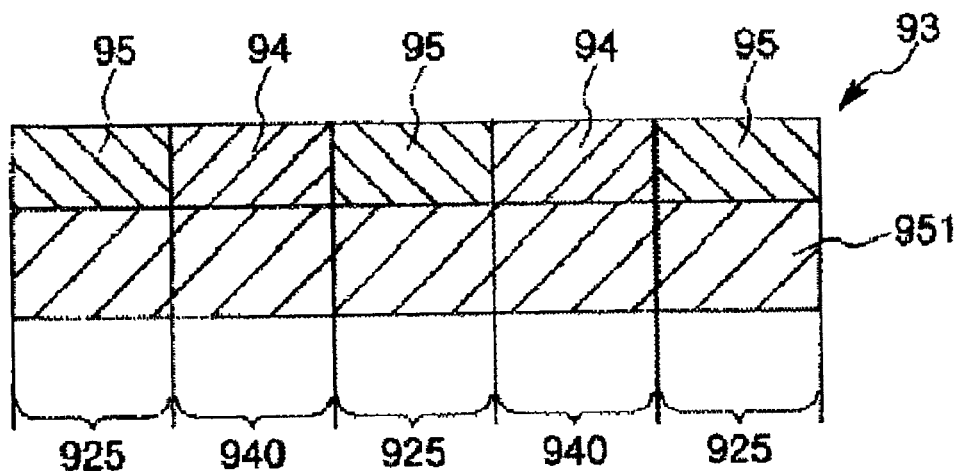
FIG. 7 is a section view schematically showing a step of the production method of the optical waveguide film.

In this way, a refractive index difference between the irradiated regions 925 and the non-irradiated regions 940 (second refractive index<third refractive index) is caused. As a result, the core portions 94 (corresponding to the non-irradiated regions 940) and the cladding portions 95 (corresponding to the irradiated regions 925) are formed as shown in FIG. 7.

A heating temperature in the heat treatment is not limited to a specific value, but is preferably in the range of about 30 to 80° C., and more preferably in the range of about 40 to 60° C.

Further, a heating time in the heat treatment is preferably set so as to substantially complete the reaction of the molecules of the monomer existing in each of the irradiated regions 925. Specifically, the heating time is preferably in the range of about 0.1 to 2 hours, and more preferably in the range of about 0.1 to 1 hour.

In the present embodiment, a mask having openings (windows) 9351 corresponding to the shapes of the plurality of cladding portions 95 (irradiated regions 925) to be formed within the core layer 93 is used as the mask 935. By using such a mask, the non-irradiated regions 940 of the layer 910 are not irradiated with the actinic radiation 930 so that the non-irradiated regions 940 become the core portions 94.

In this regard, in the case where the layer 910 is represented by X-Y coordinates, the Y-direction coordinates of each of the non-irradiated regions 940 are desired so as to have values of the above-mentioned continuous function with respect to the X-direction coordinates thereof. By doing so, the core portions 94 having the predetermined shapes and arrangement can be formed. This makes it possible to obtain an optical waveguide film 10 in which sizes of gaps between respective adjoining core portions 94 (widths of cladding portions 95) continuously vary along the X-direction.

In this regard, as shown in FIG. 6, each of the core portions 94 is formed so as to have a cross-sectional shape being a quadrangular shape such as a square shape or a rectangular shape. Each of a width and height of the cross-sectional shape 94 is not limited to a specific value, but is preferably in the range of about 1 to 200 μm, more preferably in the range of about 5 to 100 μm, and even more preferably in the range of about 10 to 60 μm.

Next, the layer 910 is subjected to a second heat treatment (step [i]). By doing so, the procatalyst remaining in each of the irradiated regions 925 and each of the non-irradiated regions 940 is activated (brought into the active state) directly or via the activation of the cocatalyst. As a result, the molecules of the monomer remaining in each of the irradiated and non-irradiated regions 925 and 940 are reacted.

In this way, by reacting the molecules of the monomer remaining in each of the irradiated and non-irradiated regions 925 and 940, it is possible to stabilize the obtained core portions 94 and cladding portions 95.

A heating temperature in the second heat treatment is not limited to a specific value as long as it is a temperature at which the procatalyst and the cocatalyst can be activated, but is preferably in the range of about 70 to 100° C., and more preferably in the range of about 80 to 90° C.

Further, a heating time in the second heat treatment is preferably in the range of about 0.5 to 2 hours, and more preferably in the range of about 0.5 to 1 hour.

Next, the layer 910 is subjected to a third heat treatment (step [ii]). This makes it possible to reduce internal stress which would occur in the obtained core layer 93 and to further stabilize the core portions 94 and cladding portions 95.

It is preferred that a heating temperature in the third heat treatment is over 20° C. higher than the heating temperature in the second heat treatment. Specifically, the heating temperature in the third heat is preferably in the range of about 90 to 180° C., and more preferably in the range of about 120 to 160° C.

Further, a heating time in the third heat treatment is preferably in the range of about 0.5 to 2 hours, and more preferably in the range of about 0.5 to 1 hour.

Through the above steps, the core layer 93 is obtained.

In this regard, it is to be noted that in the case where the refractive index difference between the core portions 94 and the cladding portions 95 is sufficiently caused before the layer 910 is subjected to the second heat treatment and/or the third heat treatment, this step [ii] and/or the above step [i] may be omitted.

Figure 8:
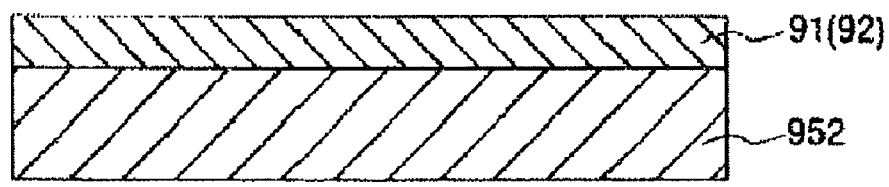
FIG. 8 is a section view schematically showing a step of the production method of the optical waveguide film.

Next, as shown in FIG. 8, the cladding layer 91 (92) is formed on a supporting substrate 952 (step [iii]).

Examples of a forming method of the cladding layer 91 (92) include various methods such as a method in which a vanish containing a clad material (cladding layer forming material) is applied onto the supporting substrate 952 and the same is cured (hardened) and a method in which a monomer composition having a curing property is applied onto the supporting substrate 952 and the same is cured (hardened).

In the case where the cladding layer 91 (92) is formed using an application method, examples of the application method include a spin coating method, a dipping method, a table coating method, a spraying method, an applicator method, a curtain coating method, a die coating method and the like.

As the supporting substrate 952, the same one as the supporting substrate 951 can be used.

Examples of a constituent material of the cladding layer 91 (92) include an acryl-based resin, a methacryl-based resin, polycarbonate, polystyrene, epoxy resin, polyamide, polyimide, polybenzoxazole, a cyclic olefin-based resin such as a benzo cyclobutene-based resin or a norbornene-based resin and the like, and one or more of which may be used independently or in combination (e.g., a polymer alloy, a polymer blended body (mixture), a copolymer, a complex (laminated body) or the like).

Among them, from the viewpoint from higher heat resistance, as the constituent material of the cladding layer 91 (92), the epoxy resin, the polyimide, the polybenzoxazole, the cyclic olefin-based resin such as the benzo cyclobutene-based resin or the norbornene-based resin, or a material containing (mainly composed of) at least one of these resins is preferably used, and a material containing the norbornene-based resin (norbornene-based polymer) as a major component thereof is more preferably used.

The norbornene-based polymer has excellent heat resistance. Therefore, by manufacturing the optical waveguide 9 using the norbornene-based polymer as a constituent material of the cladding layer 91 (92), even if the optical waveguide 9 is heated when a conductor layer is formed thereon, when the conductor layer is processed to form wirings, when optical elements are mounted on the optical waveguide 9, or the like, it is possible to prevent deformation of the optical waveguide 9 due to softening of the cladding layer 91 (92).

Further, since the norbornene-based polymer has a high hydrophobic property, it is possible to obtain a cladding layer 91 (92) in which dimensional change or the like is hard to occur due to moisture absorption thereof.

Furthermore, since the norbornene-based polymer and a norbornene-based monomer which is a raw material of the norbornene-based polymer are relatively inexpensive and accessible, they are preferably used.

Moreover, in the case where the material containing the norbornene-based polymer as the major component thereof is used as the constituent material of the cladding layer 91 (92), the cladding layer 91 (92) can have resistance properties with respect to deformations such as bending. Therefore, even if the optical waveguide 9 is repeatedly deformed or bent, delamination between the cladding layer 91 or 92 and the core layer 93 hardly occurs, and occurrence of micro-cracks within the cladding layer 91 (92) also can be prevented.

Further, in this case, the constituent material of the cladding layer 91 (92) becomes the same kind as the material to be preferably used as the constituent material of the core layer 93. Therefore, adhesion between the cladding layer 91 (92) and the core layer 93 is further improved so that the delamination therebetween can be further prevented. For this reason, it is possible to obtain an optical waveguide 9 maintaining an optical transmission property and having excellent durability.

Examples of such a norbornene-based polymer include addition-type polymers such as (1) an addition-type (co)polymer composed of molecules each obtained by addition (co) polymerization reaction between molecules of a norbornene-based monomer, (2) an addition-type copolymer composed of molecules each obtained by addition copolymerization reaction between the molecules of the norbornene-based monomer and molecules of ethylene or α-olefin, and (3) an addition-type copolymer composed of molecules each obtained by addition copolymerization reaction between the molecules of the norbornene-based monomer, molecules of non-conjugated diene, and, if needed, molecules of another monomer; and ring opening-type polymers such as (4) a ring opening-type norbornene-based (co)polymer or a (co)polymer obtained by hydrogenating, if needed, the ring opening-type norbornene-based (co)polymer, (5) a ring opening-type norbornene-based copolymer composed of molecules each obtained by ring opening copolymerization reaction between the molecules of the norbornene-based monomer and the molecules of the ethylene or α-olefin or a copolymer obtained by hydrogenating, if needed, the ring opening-type norbornene-based copolymer, and (6) a ring opening-type norbornene-based copolymer composed of molecules each obtained by ring opening copolymerization reaction between the molecules of the norbornene-based monomer and the molecules of the non-conjugated diene or another monomer or a copolymer obtained by hydrogenating, if needed, the ring opening-type norbornene-based copolymer.

In this regard, examples of these copolymers include a random copolymer, a block copolymer, an alternating copolymer and the like.

These norbornene-based polymers can be obtained using various kinds of well known polymerizations such as ring opening metathesis polymerization (ROMP), a combination of ROMP and hydrogenation, polymerization via radicals or cations, polymerization using a cationic palladium polymerization initiator and polymerization using another polymerization initiator (e.g., a nickel polymerization initiator or another transition metal polymerization initiator).

Among them, it is preferable to use the addition-type norbornene-based (co)polymer. This is because the norbornene-based (co)polymer abounds in transparency, heat resistance and plasticity.

It is preferred that the norbornene-based polymer is composed of molecules each including norbornene repeating units with substituent groups containing polymerizable groups or molecules each including norbornene repeating units with substituent groups containing aryl groups.

In the case where the norbornene-based polymer composed of molecules each including norbornene repeating units with substituent groups containing polymerizable groups is used, it is possible to cross-link the polymerizable groups of at least a part of the molecules of the norbornene-based polymer directly or via compounds of a cross-linking agent within the cladding layer 91 (92).

Further, the molecules of the norbornene-based polymer and the molecules of the polymer 915 used for forming the core layer 93 can be cross-linked depending on kinds of the polymerizable group, kinds of the cross-linking agent, kinds of the polymer 915 used for forming the core layer 93 or the like.

In other words, it is preferred that at least a part of the molecules of the norbornene-based polymer are cross-linked via the polymerizable groups.

As a result, it is possible to improve strength of the cladding layer 91 (92) itself and to further improve the adhesion (bonding strength) between the cladding layer 91 (92) and the core layer 93.

As the norbornene repeating units with substituent groups containing polymerizable groups, at least one kind of norbornene repeating units with substituent groups containing epoxy groups, norbornene repeating units with substituent groups containing (meth)acryl groups and norbornene repeating units with substituent groups containing alkoxysilyl groups is preferable. This is because these polymerizable groups have high reactivity among various kinds of the polymerizable groups.

In the case where the norbornene-based polymer is composed of molecules each including two or more kinds of the above norbornene repeating units with substituent groups containing polymerizable groups, it is possible to further increase a cross-linking density of the molecules of the norbornene-based polymer, thereby remarkably exhibiting the above effects.

On the other hand, in the case where the norbornene-based polymer composed of molecules each including norbornene repeating units with substituent groups containing aryl groups is used, it is possible to more reliably prevent the dimensional change or the like of the cladding layer 91 (92) due to the moisture absorption thereof. This is because the aryl groups have excellent hydrophobic properties.

Further, since the aryl groups also have superior lipid solubility (lipophilicity), such a norbornene-based polymer exhibits compatibility with respect to the polymer used for forming the core layer 93. This makes it possible to prevent the delamination between the cladding layer 91 (92) and the core layer 93 more reliably. As a result, it is possible to obtain an optical waveguide 9 having more excellent durability.

Furthermore, it is preferred that each of the molecules of the norbornene-based polymer further includes alkyl norbornene repeating units. In this regard, it is to be noted that the alkyl group may be a linear type or a branched type.

In the case where each of the molecules of the norbornene-based polymer includes the alkyl norbornene repeating units, the molecules of the norbornene-based polymer can have high plasticity. Therefore, use of such a norbornene-based polymer makes it possible to impart high flexibility (bendability) to the cladding layer 91 or 92.

Since the norbornene-based polymer composed of the molecules each including the alkyl norbornene repeating units has excellent permeability for a light having a wavelength within the above-mentioned long wavelength region (especially, near 850 nm), it is preferably used.

Although it is preferred that the norbornene-based polymer to be used for forming the cladding layer 91(92) has a relatively low refractive index, if each of the molecules of the norbornene-based polymer includes the norbornene repeating units with substituent groups containing aryl groups, the norbornene-based polymer generally tends to have a higher refractive index.

However, in the case where each molecule the norbornene-based polymer further includes the alkyl norbornene repeating units in addition to the norbornene repeating units with substituent groups containing aryl groups, it is possible to prevent increase of the refractive index of the norbornene-based polymer.

Such a norbornene-based polymer has a relatively low refractive index in addition to the above properties. By forming the cladding layer 91 (92) using a material containing the norbornene-based polymer as a major component thereof, it is possible to further improve the optical transmission property of the optical waveguide 9.

In the case where each of the molecules of the norbornene-based polymer includes the norbornene repeating units with substituent groups containing (meth)acryl groups, the (meth) acryl groups can be cross-linked (polymerized) relatively easily by being heated. If a radical generator is added to the cladding layer forming material, the cross-linking reaction of the (meth)acryl groups can be enhanced.

As the radical generator, it is preferable to use 2,2-dimethoxy-1,2-diphenyl ethane-1-one, 1,1-bis(t-butyl peroxy)-3,3,5-trimethyl cyclohexane or the like.

Further, In the case where each of the molecules of the norbornene-based polymer includes the norbornene repeating units with substituent groups containing epoxy groups or the norbornene repeating units with substituent groups containing alkoxysilyl groups, it is preferred that the same substance as the above cocatalyst (photo acid generator or photo base generator) is added to the cladding layer forming material.

This makes it possible to cross-link the polymerizable groups such as the epoxy groups or the alkoxysilyl groups directly due to the action of the substance.

On the other hand, in order to cross-link the epoxy groups, the epoxy groups or the alkoxysilyl groups via the compounds of the cross-linking agent, it is preferred that, as the compounds of the cross-linking agent, compounds each including at least one polymerizable group corresponding to each polymerizable group of the molecules of the norbornene-based polymer are added to the cladding layer forming material.

As compounds of the cross-linking agent each including an epoxy group, it is preferable to use, for example, 3-glycidoxy propyl trimethoxy silane (γ-GPS), silicone epoxy resin or the like.

As compounds of the cross-linking agent each including a (meth)acryl group, it is preferable to use, for example, 3-methacryloxypropyl trimethoxysilane, tricyclo[5.2.1.02,6] decane dimethanol diacrylate, tripropylene glycol diacrylate or the like.

As compounds of the cross-linking agent each including an alkoxysilyl group, it is preferable to use a coupling agent such as 3-glycidoxy propyl trimethoxy silane or 3-aminopropyl trimethoxy silane.

A cross-linking reaction of these polymerizable groups may be performed at a final stage of this step [iii] or after the optical waveguide 9 has been obtained in the following step [iv].

Further, various kinds of additive may be added to (mixed with) the cladding layer forming material.

For example, as the additive, the monomer, the procatalyst and the cocatalyst each described in the core layer forming material may be mixed with the cladding layer forming material. This makes it possible to allow the molecules of the monomer to be reacted in the same manner as described above within the cladding layer 91 (92) to thereby change a refractive index thereof.

Especially, by using a cross-linkable monomer as the monomer, it is possible to cross-link at least a part of the molecules of the norbornene-based polymer via compounds of the cross-linkable monomer within the cladding layer 91 (92). Further, the molecules of the norbornene-based polymer and the molecules of the polymer 915 used for forming the core layer also can be cross-linked depending on kinds of the cross-linkable monomer, kinds of the polymer 915 used for forming the core layer 93 or the like.

In this case, since it is not required that a refractive index difference between portions of the cladding layer 91 (92) is caused, a procatalyst to be easily activated by being heated may be used without using the above cocatalyst.

Examples of such a procatalyst include $[Pd(PCy_3)_2(O_2CCH_3)(NCCH_3)]$tetrakis(pentafluorophenyl)borate, [2-methallyl $Pd(PCy_3)_2$]tetrakis(pentafluorophenyl)borate, $[Pd\ (PCy_3)_2H(NCCH_3)]$tetrakis(pentafluorophenyl)borate, $[Pd(P(iPr)_3)_2(OCOCH_3)(NCCH_3)]$tetrakis(pentafluorophenyl))borate, and the like.

Examples of another additive include the above-mentioned anti-oxidizing agent. By mixing the anti-oxidizing agent with the cladding layer forming material, it is possible to prevent deterioration of the clad material (the norbornene-based polymer) due to oxidation thereof.

In this way, the cladding layer 91 (92) is formed on the supporting substrate 952.

An average thickness of each of the cladding layers 91 and 92 is preferably in the range of about 0.1 to 1.5 times an average thickness of the core layer 93, and more preferably in the range of about 0.3 to 1.25 times the average thickness of the core layer 93.

Specifically, the average thickness of each of the cladding layers 91 and 92 is not limited to a specific value, but, in general, is preferably in the range of about 1 to 200 μm, more preferably in the range of about 5 to 100 μm, and even more preferably in the range of about 10 to 60 μm.

This makes it possible for each of the cladding layers 91 and 92 to appropriately exhibit a function as a cladding layer while preventing a size (thickness) of the optical waveguide 9 from becoming unnecessarily large (thick).

Figure 9:
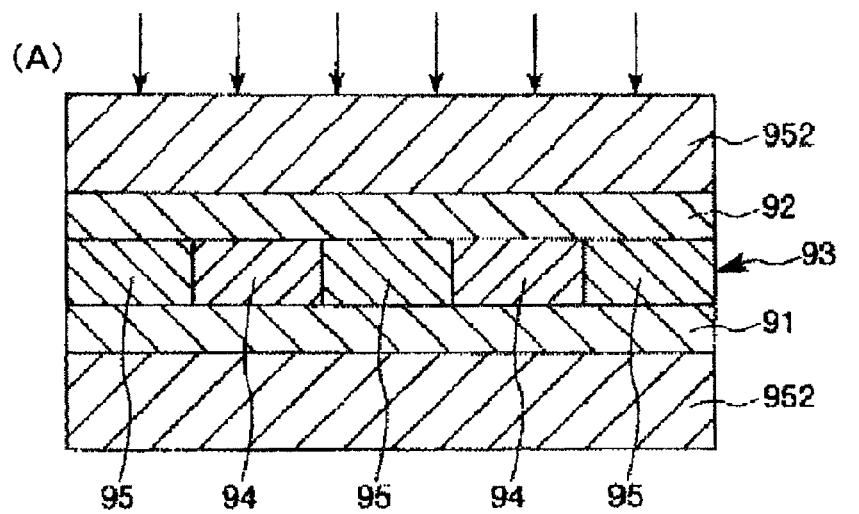
FIGS. 9(A) and 9(B) are section views each schematically showing a step of the production method of the optical waveguide film.
Figure 9:
Figure 9:
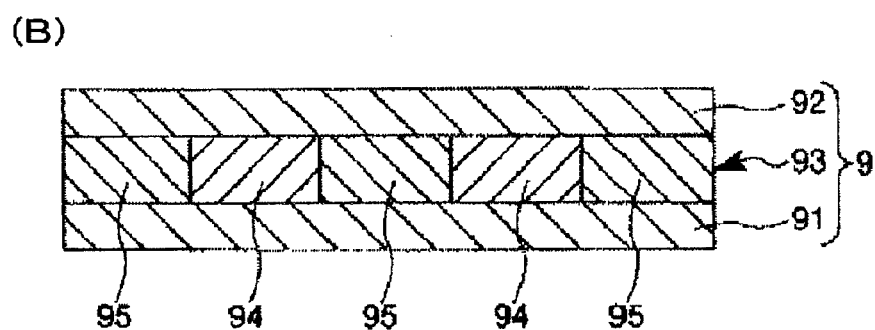

Next, as shown in FIG. 9, the core layer 93 is peeled off from the supporting substrate 951, and then it is put between the cladding layer 91 formed on the supporting substrate 952 and the cladding layer 92 formed on the supporting substrate 952 (step [iv]).

Thereafter, as shown using an arrow in FIG. 9, the supporting substrate 952 is compressed from an upper surface side thereof so that the cladding layers 91 and 92 and the core layer 93 are bonded together. In this way, the cladding layers 91 and 92 and the core layer 93 are unified.

It is preferred that this compressing operation is carried out with being heated. A heating temperature is appropriately selected depending on the constitute materials of the cladding layers 91 and 92 and the core layer 93 or the like, but is, in general, preferably in the range of about 80 to 200° C., and more preferably in the range of about 120 to 180° C.

Next, the supporting substrates 952 are peeled off and removed from the cladding layers 91 and 92, respectively. In this way, the optical waveguide film 10 including the optical waveguide areas 11A, 11B and 11C to be finally brought into optical waveguides 9 is obtained.

In preferred example of such an optical waveguide 9, in the core layer 93, each of the core portions 94 is formed of a first norbornene-based material as a major component thereof and each of the cladding portions 95 is formed of a second norbornene-based material having a refractive index lower than that of the first norbornene-based material as a major component thereof, and each of the cladding layers 91 and 92 is formed of a norbornene-based polymer having a refractive index lower than that of the first norbornene-based material (each of the core portions 94 of the core layer 93) as a major component thereof.

In such a configuration, each of the first and second norbornene-based materials contains an identical norbornene-based polymer having a refractive index and a reaction product of molecules of a norbornene-based monomer having a refractive index different from that of the norbornene-based polymer. However, the refractive indexes of the first and second norbornene-based materials are different from each other due to a difference between amounts of the reaction products of the molecules of the norbornene-based monomer contained therein.

The norbornene-based polymer has high transparency. Therefore, the optical waveguide 9 with the above configuration can have a high optical transmission property.

Further, according to such a configuration, it is possible to obtain not only high adhesion between the core portions 94 and the cladding portions 95 but also high adhesion between the core layer 93 and the cladding layers 91 and 92. Therefore, even if the optical waveguide 9 is deformed (bent), peeling between the core portions 94 and the cladding portions 95 and delamination between the core layer 93 and the cladding layers 91 and 92 hardly occur, and occurrence of microcracks within the core portions 94 and the cladding portions 95 also can be prevented. As a result, the optical transmission property of the optical waveguide 9 can be maintained.

In addition, since the norbornene-based polymer has high heat resistance and hydrophobicity, the optical waveguide 9 having such a configuration can have excellent durability.

Further, since the optical waveguide 9 can have the high heat resistance and hydrophobicity, it is possible to reliably form the conductor layer thereon using the various kinds of methods described above while preventing the properties of the optical waveguide 9 from being lowered (deteriorated). Especially, even in the case where the conductor layer is formed on the optical waveguide 9 so as to overlap the core portions 94 which are important portions for transmitting light, alteration or deterioration of each of the core portions 94 can be prevented.

Furthermore, according to the above manufacturing method, it is possible to obtain an optical waveguide 9 provided with core portions 94 each having a predetermined shape and high dimensional accuracy by carrying out an easy treatment in a short period of time.

In this regard, even in the case where the cladding layer (lower cladding layer) 91 and the cladding layer (upper cladding layer) 92 are omitted from such an optical waveguide film 10, since air surrounding the core layer 93 serves as the cladding layers 91 and 92, the core layer 93 alone can exhibit the function as the optical waveguide 9.

However, in order to prevent dusts or the like from adhering to surfaces of the core layer 93, it is preferred that the cladding layers 91 and 92 are provided on the surfaces of the core layer 93. The provision of the cladding layers 91 and 92 makes it possible to suppress the optical loss of the optical waveguide 9.

(Structure of Laminated Type Optical Waveguide Film)

Figure 10:
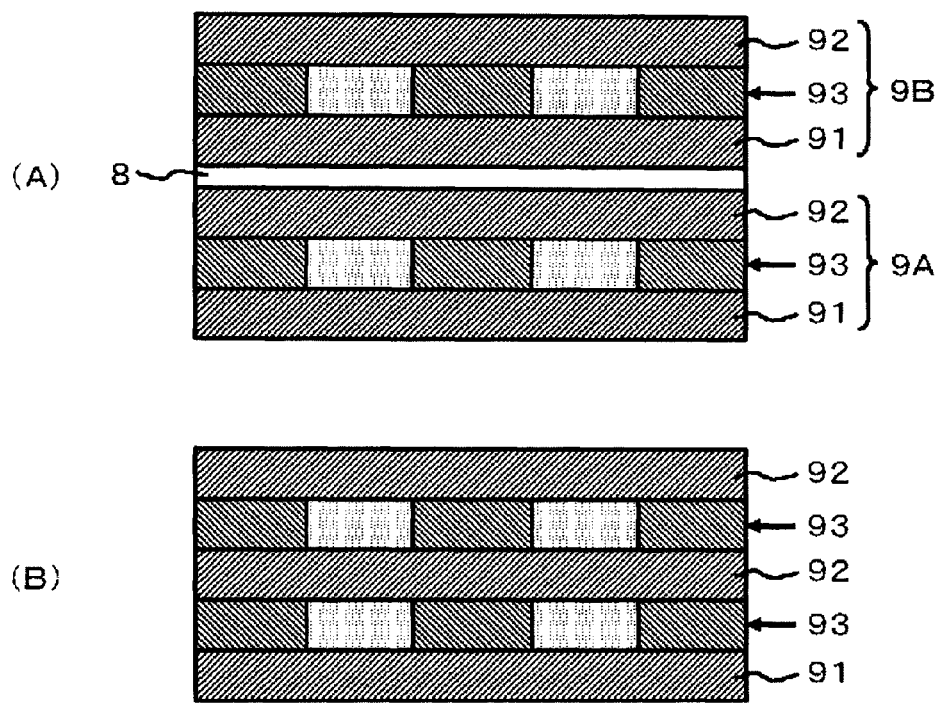
FIGS. 10(A) and 10(B) are section views each showing a schematic structure of a laminated type optical waveguide film.

FIGS. 10(A) and 10(B) are section views each showing a schematic structure of a laminated type optical waveguide film. The laminated type optical waveguide film shown in FIG. 10(A) has a structure in which first and second optical waveguides 9A and 9B each having the same structure as the optical waveguide 9 described above are laminated through an adhesive layer 8. A production method of each of the first and second optical waveguides 9A and 9B is the same as the production method of the optical waveguide 9 described above.

The laminated type optical waveguide film shown in FIG. 10(B) has a structure in which a cladding layer (lower cladding layer) 91, a core layer (lower core layer) 93, a cladding layer (middle cladding layer) 92, a core layer (upper core layer) 93 and a cladding layer (upper cladding layer) 92 are laminated one above another. This means that the laminated type optical waveguide film shown in FIG. 10(B) has a structure in which two optical waveguides are laminated one above the other.

A laminated structure including the lower cladding layer 91, the lower core layer 93 and the middle cladding layer 92 is formed in the same method as the production method of the optical waveguide 9 described above. Thereafter, the upper core layer 93 and the upper cladding layer 92 are formed on the laminated structure through the same steps as used for the formation of the core layer 93 and the cladding layer 92 of the optical waveguide 9 described above.

While one embodiment of the present invention has been described above with reference to the accompanying drawings, this is nothing more than one illustration of the invention. It will be possible to employ many different configurations other than the above.

Figure 4:
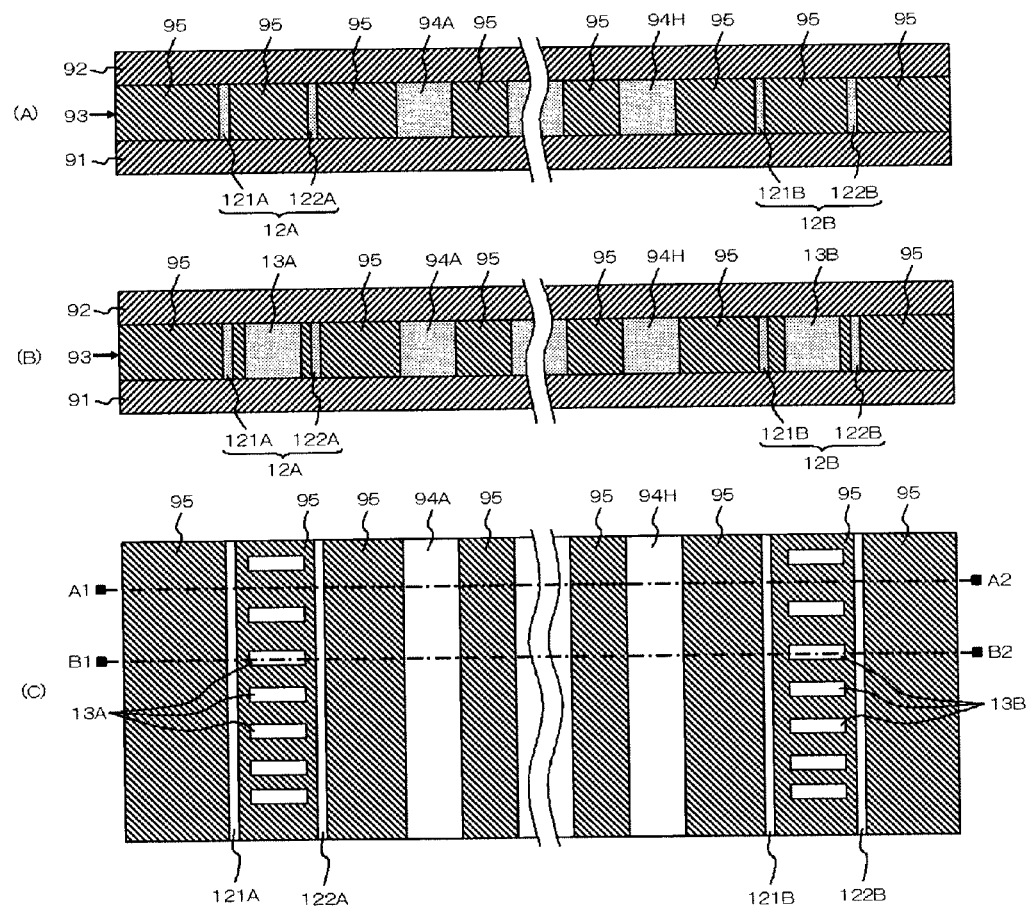
FIGS. 4(A), 4(B) and 4(C) are views each showing a relationship between core portions and alignment marks.

For example, although it is preferable to employ the structure in which the alignment marks 13A and 13A and the dicing lines 121A, and 122A make up the alignment pattern 12A as shown in FIG. 4, the present invention is not limited thereto. A pattern indicative of alignment marks may be completely separated from a pattern indicative of dicing lines.

While the optical waveguide patterns each having the same configuration are formed in the optical waveguide areas 11A, 11B and 11C shown in FIG. 1, the present invention is not limited thereto. Optical waveguide patterns each having different configurations may be formed in the optical waveguide areas 11A, 11B and 11C. The number of the optical waveguide areas 11A, 11B and 11C shown in FIG. 1 is not limited to three. Four or more optical waveguide areas may be formed.

While all the alignment patterns 12A, 12B and 12C shown in FIG. 1 have the same shape, the present invention is not limited thereto. In the case where optical waveguide patterns having different configurations are formed in the optical waveguide areas 11A, 11B and 11C, it may be necessary to form alignment patterns corresponding to these optical waveguide patterns.

While the optical waveguide film, the laminated type optical waveguide film and the optical waveguide according to the present invention have been described hereinabove based on the embodiment illustrated in the drawings, the present invention is not limited thereto. The configurations of the respective parts may be substituted by or added with other arbitrary configurations having the equivalent functions.

<Second Embodiment of Optical Waveguide Film>

Next, description will be made on a second embodiment of an optical waveguide film and a laminated type optical waveguide film according to the present invention.

(Structure of Optical Waveguide Film)

Figure 11:
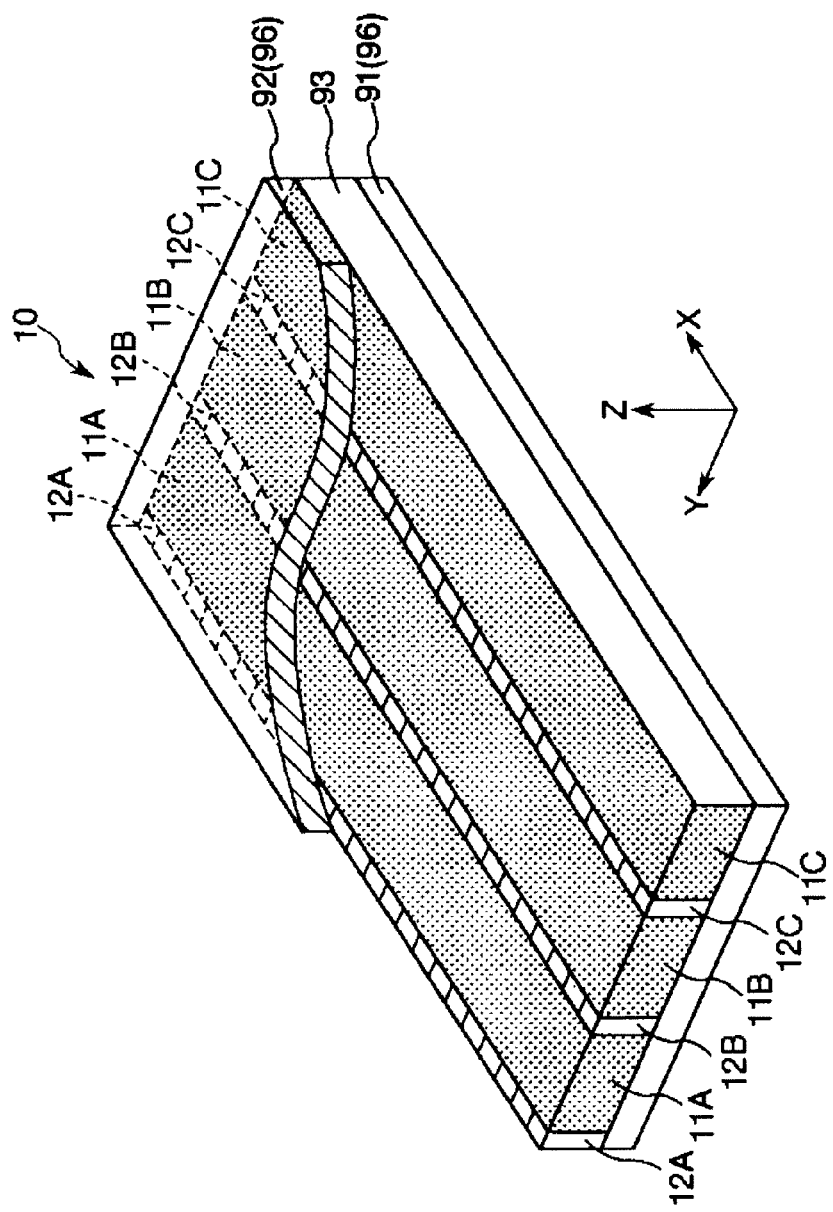
FIG. 11 is a partially cut-away perspective view showing a second embodiment of an optical waveguide film including the optical waveguides according to the present invention.
Figure 12:
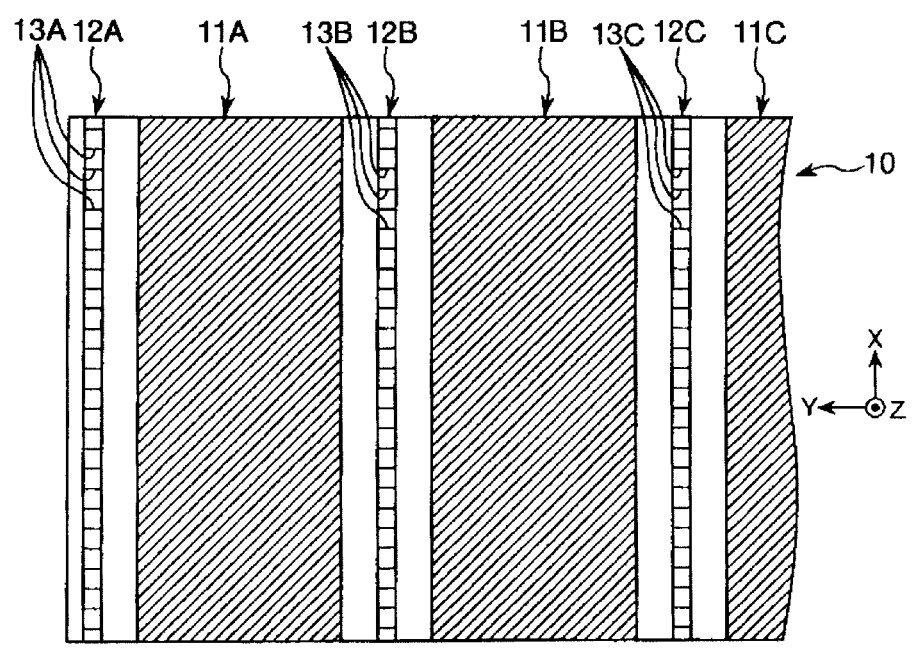
FIG. 12 is a schematic view showing a core layer of the optical waveguide film shown in FIG. 11.
Figure 13:
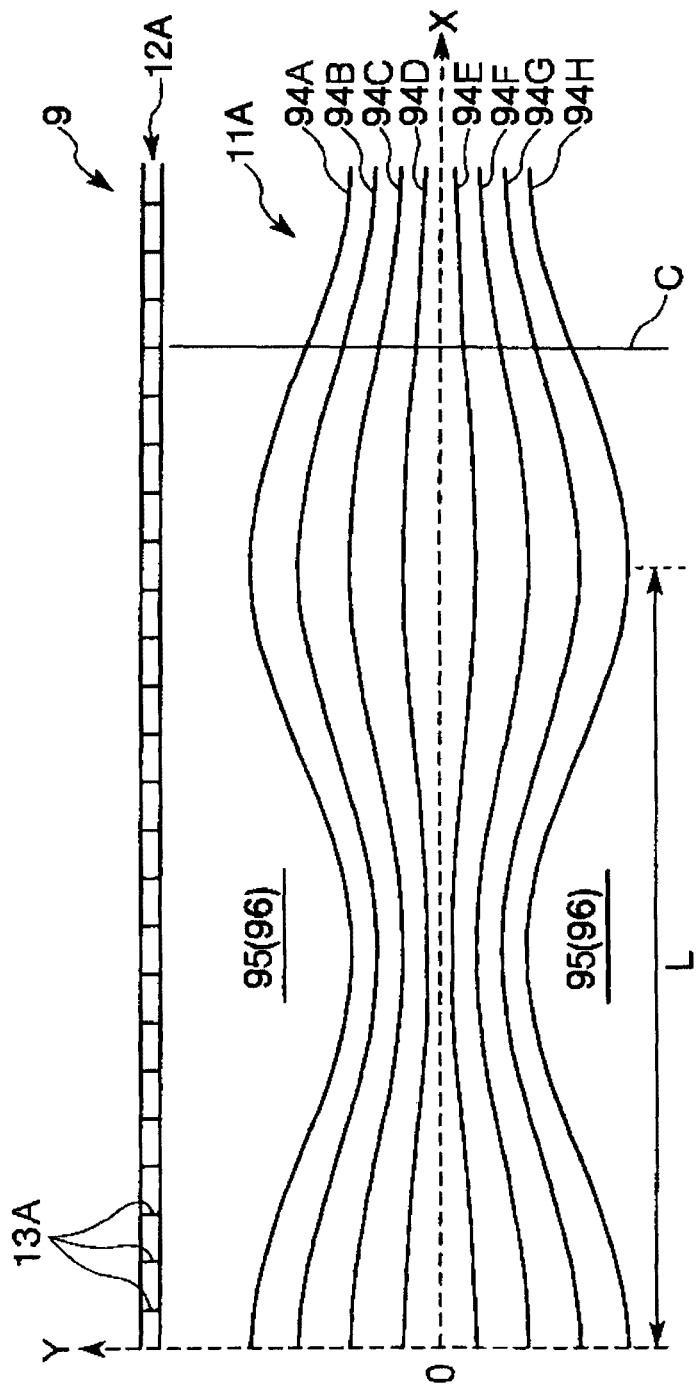
FIG. 13 is a plan view showing an embodiment of the optical waveguide included in the optical waveguide film.

FIG. 11 is a partially cut-away perspective view showing a second embodiment of an optical waveguide film including optical waveguides according to the present invention. FIG. 12 is a schematic view showing a core layer of the optical waveguide film shown in FIG. 11. FIG. 13 is a plan view showing the optical waveguides included in the optical waveguide film. For the sake of description, an X-axis, a Y-axis and a Z-axis are set in FIGS. 11 and 12 as indicated by arrows.

Hereinafter, the second embodiment will be described with emphasis placed on points differing from the first embodiment. No description will be made on the same points.

The present embodiment remains the same as the first embodiment except that a plan-view shape of each of the core portions is configured to describe a curve defined by a specified trigonometric function.

An optical waveguide film 10 shown in FIG. 11 has an elongated structure in which a cladding layer (cladding portion) 91, a core portion 93 and a cladding layer (cladding portion) 92 are laminated in this order from a negative side toward a positive side of the Z-axis in FIG. 11.

As shown in FIG. 12, the core layer 93 includes a plurality of optical waveguide areas 11A, 11B and 11C and a plurality of alignment patterns 12A, 12B and 12C formed in an adjoining relationship with the optical waveguide areas 11A, 11B and 11C.

As will be set forth below, each of the optical waveguide areas 11A, 11B and 11C includes a plurality of core portions arranged generally side by side within the same layer so as to extend along the X-axis and side cladding portions provided so as to cover side surfaces of each of the core portions. Further, each of the side cladding portions has a refractive index smaller than that of each of the core portions.

The respective optical waveguide areas 11A, 11B and 11C are finally separated from one another to provide optical waveguides 9.

Hereinafter, the optical waveguide areas 11A, 11B and 11C and the alignment patterns 12A, 12B and 12C will be described one after another.

First, description will be made on the optical waveguide areas 11A, 11B and 11C. Only the optical waveguide area 11A will be representatively described herein.

The optical waveguide area 11A shown in FIG. 13 includes a plurality of core portions 94A, 94B, 94C, 94D, 94E, 94F, 94G and 94H arranged side by side so as to extend along the X-axis. The side surfaces of each of the core portions 94A to 94H are covered with side cladding portions 95 each having a refractive index smaller than that of each of the core portions 94A to 94H.

In other words, each of the core portions 94A to 94H shown in FIG. 13 is surrounded by a cladding body 96 including the cladding layer 91 positioned at a lower side of the Z-axis, the cladding layer 92 positioned at an upper side of the Z-axis and the side cladding portions 95 positioned at lateral sides. In each of FIGS. 11 to 14, the cladding layer 92 is illustrated in a see-through view.

In the optical waveguide 9 shown in FIG. 13, light incident on one end surface of each of the core portions 94A to 94H is totally reflected by an interfacial surface of each of the core portions 94A to 94H and the cladding body 96 (cladding layers 91 and 92 and side cladding portions 95) and is propagated toward an outgoing side thereof. Thus, the light can be taken out from the other end surface of each of the core portions 94A to 94H.

In this regard, the core portions 94A to 94H are arranged at an equal interval in a Y-direction orthogonal to an X-direction. A size of a Y-direction gap (hereinafter referred to as "waveguide gap") between two mutually-adjoining arbitrary core portions among the core portions 94A to 94H is designed so as to cyclically vary with a cycle L along the X-direction.

Each of the core portions 94A to 94H has a plan-view shape describing a curve defined by the following function.

Specifically, if an X-direction position of each of the core portions 94A to 94H is assumed to be "X", a Y-direction position "Y" of each of the core portions 94A to 94H is represented by the following equation (1):

$$Y = A\cos(2\pi X/L) + B \quad (1),$$

where A, B and L are arbitrary real numbers, A denotes an amplitude, B signifies an offset amount and L stands for a cycle.

The origin serving as a reference point for the positions X and Y exists in a left end portion of the optical waveguide 9 as indicated by "0" in FIG. 13. The origin "0" is a center point of a width (Y-direction length) of the optical waveguide 9. Further, in FIG. 13, a shape of each of the core portions 94A to 94H is exaggerated in the Y-direction.

Coordinates through which each of the core portions 94A to 94H passes are determined by defining the positions X and Y using the equation (1). The shape of each of the core portions 94A to 94H is fixed by interconnecting the respective coordinates with a line. The shape of each of the core portions 94A to 94H defined by the equation (1) describes a so-called "cosine curve".

Further, the shape of each of the core portions 94A to 94D and the shape of each of the core portions 94E to 94H are in a line-symmetric relationship with respect to the X-axis. If the core portions 94A to 94H are line-symmetric with respect to the X-axis in this manner, a center of the optical waveguide 9 in a width direction thereof and a center of a core portion bundle including the core portions in a width direction thereof are kept coincident with each other, even when a resin material constituting the optical waveguide 9 undergoes shrinkage. This makes it possible to suppress occurrence of so-called "eccentricity", thereby enhancing connectivity of the optical waveguide 9 with a connection counterpart thereof.

In this regard, the cycle L is a parameter equivalent to a "wavelength" in the cosine curve. Although the cycle L may be a different value in each of the core portions 94A to 94H, it is preferred that the cycle L in each of the core portions 94A to 94H is set so as to have the same value as can be seen in FIG. 13.

Further, the cycle L is properly set depending on a length of the optical waveguide 9. For example, if the length of the optical waveguide 9 is about 200 mm, the cycle L is preferably in the range of about 5 to 100 mm, and more preferably in the range of about 10 to 50 mm.

On the other hand, the amplitude A and the offset amount B are parameters for defining a waveform of the cosine curve and a distance from the X-axis, respectively. It is preferred that the amplitude A and the offset amount B are set so as to have different values, respectively, in each of the core portions 94A to 94H.

If the respective parameters are set as above, the core portions 94A to 94H do not intersect one another and the size of the waveguide gap continuously varies along the X-direction. This ensures independence of lights propagating through the respective core portions 94A to 94H, thereby preventing occurrence of cross talk between the core portions 94A to 94H serving as channels. Owing to the continuous variation of the size of the waveguide gap, the optical waveguide of the present invention is capable of providing advantageous effects (e.g., improved connectivity) to be set forth below.

Among the parameters mentioned above, the amplitude A is a parameter equivalent to a "wave height" in the cosine curve. It is preferred that the amplitude A is a different value in each of the core portions 94A to 94H. The amplitude A is set based on the following equation (3):

$$A = \pm (Rmax - Rmin)(N-1)P/4 \quad (3),$$

where Rmax is a maximum magnification ratio, Rmin is a minimum magnification ratio, N is a core portion number (channel number), and P is the size of the waveguide gap in the above equation (3).

In this regard, the amplitude A according to each of the core portions 94A to 94D positioned above the X-axis (Y-axis positive side) has a positive sign (+). On the other hand, the amplitude A according to each of the core portions 94E to 94H positioned below the X-axis (Y-axis negative side) has a negative sign (−).

Further, the offset amount B is a parameter equivalent to the distance spaced apart from the X-axis of the cosine curve. The offset amount B is set so as to have a different value in each of the core portions 94A to 94H based on the following equation (4):

$$B = \pm (Rmax + Rmin)(N-1)P/4 \quad (4),$$

where Rmax is a maximum magnification ratio, Rmin is a minimum magnification ratio, N is a core portion number (channel number), and P is the size of the waveguide gap in the above equation (4).

In this regard, the offset amount B according to each of the core portions 94A to 94D positioned above the X-axis (Y-axis positive side) has a positive sign (+). On the other hand, the offset amount B according to each of the core portions 94E to 94H positioned below the X-axis (Y-axis negative side) has a negative sign (−).

The maximum magnification ratio Rmax and the minimum magnification ratio Rmin of the equations (3) and (4) are set to 1 or more, preferably in the range of 1 to 1.05, and more preferably in the range of about 1.01 to 1.03 depending on a shrinkage ratio of the optical waveguide 9 when solidifying a resin material constituting the optical waveguide 9. The shrinkage of the optical waveguide 9 will be described below.

Further, the maximum magnification ratio Rmax is set greater than the minimum magnification ratio Rmin, and a difference therebetween is preferably in the range of about 0.02 to 0.05.

Although the maximum magnification ratio Rmax may be a different value in each of the core portions 94A to 94H, it is set so as to have the same value in the present embodiment. Likewise, the minimum magnification ratio Rmin is set so as to have the same value in the present embodiment although it may be a different value in each of the core portions 94A to 94H.

This is because a shrinkage ratio of a resin material often remains substantially the same throughout the resin material. The afore-mentioned setting makes it possible for the gaps between the respective adjoining core portions 94A to 94H (waveguide gaps) to have values approximate to desired values in sizes.

Further, the maximum magnification ratio Rmax and the minimum magnification ratio Rmin can be calculated from the shrinkage ratio of the resin material (reduction ratio of dimension attributable to shrinkage). No particular restriction is imposed on a calculation method of the magnification ratios. If the shrinkage ratio of the resin material is assumed to be, e.g., 2%, a value obtained by adding 1 to the shrinkage ratio can be used as a basic magnification ratio.

The magnification ratio is increased or decreased depending on the kind of the resin material used, a production environment of the optical waveguide 9 and individual variability of the resin material. The maximum magnification ratio Rmax and the minimum magnification ratio Rmin can be defined by applying the increase or decrease ratio to the basic magnification ratio.

As set forth above, the magnification ratio set in light of variations of shrinkage ratio is applied to the amplitude A and the offset amount B in the equations (3) and (4). Therefore, even if a shrinkage ratio of a resin material is indefinite, an optical waveguide 9 having a waveguide gap with a desired size can be easily designed and produced by just selecting cutting positions of an optical waveguide film 10.

Further, N is a parameter signifying the core portion number (channel number). Depending on an arrangement order of the core portions 94A to 94H from an external side thereof, this parameter is represented by the following equation (5):

$$N = N_0 + 2 - 2n \quad (5),$$

where $N_0$ is the total number of the channels (the total number of the core portions 94A to 94H), and n is the arrangement order of the core portions 94A to 94H from the external side thereof in the above equation (5).

In the case of the configuration shown in FIG. 13, for example, the total number of the channels $N_0$ is eight and the arrangement order n of the core portion 94B from the external side thereof is second. Therefore, the channel number N of the core portion 94B is equal to 6, namely $N = 8 + 2 - (2 \times 2) = 6$.

In this regard, the total number of the channels $N_0$ may be appropriately set depending on the total number of channels of a connection counterpart. It is sometimes a case that the arrangement order n has two different values depending on an order counting direction. In this case, a smaller value is taken as the arrangement order n.

Further, if the total number of the channels $N_0$ is odd, it is preferred that a centrally positioned core portion among the respective core portions arranged side by side is located on the X-axis. In other words, if the total number of the channels $N_0$ of the optical waveguide 9 is assumed to be odd, it is preferred that a rectilinear core portion is positioned on the X-axis in FIG. 13.

Furthermore, the size of the waveguide gap P is defined to correspond to a size of a waveguide gap of the connection counterpart to which the optical waveguide 9 is to be connected. Although the sizes of the waveguide gaps P between the respective adjoining core portions 94A to 94H may be different from each other, they are set so as to have the same value in the present embodiment.

Thus, the size of the waveguide gap of the optical waveguide 9 as produced coincides with the size of the waveguide gap of the connection counterpart in a specific portion of the optical waveguide 9. Since a shrinkage ratio of a resin material is often substantially the same throughout the resin material, the afore-mentioned setting makes sure that the sizes of the waveguide gaps P between the respective adjoining core portions 94A to 94H has the same value.

For example, the size of the waveguide gap P is preferably 30 μm or greater, and more preferably 50 μm or greater. In this regard, an upper limit value of the size of the waveguide gap P is not limited to a specific value, but may be, e.g., about 500 μm.

Using the equations noted above, the plan-view shape of each of the core portions 94A to 94H can be determined in an unambiguous manner.

In this regard, in the case where the material for producing the optical waveguide 9 is a material which undergoes shrinkage when being solidified such as a resin material, the equations (3) and (4) each containing the maximum magnification ratio Rmax and the minimum magnification ratio Rmin as the parameters each reflecting the shrinkage ratio are equations for defining a pre-solidification shape of each of the core portions 94A to 94H in a strict meaning.

Since change in a shape of the optical waveguide 9 caused by the shrinkage of the resin material is quite insignificant, it can be deemed that a shape of each of the core portions 94A to 94H after solidification of the resin material is substantially the same as the pre-solidification shape thereof. In other words, the shape of each of the core portions 94A to 94H after the solidification of the resin material also can be defined by the equations (3) and (4).

In each of the core portions 94A to 94H having the aforementioned shapes, an inclination angle of each of tangential lines passing arbitrary points of an optical path thereof with respect to the X-axis (hereinafter just referred to as "inclination angle") is designed so as to continuously (smoothly) vary with respect to the X-axis.

Thanks to this feature, each of the core portions 94A to 94H has no heavily curved part having sharp curvature. This makes it possible to suppress leakage of light which would otherwise occur in the curved part. As a result, each of the core portions 94A to 94H shows an enhanced light propagation property.

Specifically, the inclination angle is preferably 1° or smaller, more preferably in the range of 0 to 0.8°, and even more preferably in the range of 0.01 to 0.5°. Setting the inclination angle within the above-noted range makes it possible to minimize the leakage of light.

In addition, an incident angle of light on an incoming end surface and an exit angle of light on an outgoing end surface are prevented from becoming too small with respect to the X-axis. This makes it possible to improve connectivity between the optical waveguide 9 and the connection counterpart connected thereto, thereby reliably reducing optical connection loss therebetween.

In this regard, since the inclination angle depends on the above-mentioned parameters such as the cycle L and the amplitude A, it is preferred that these parameters are set depending on a desired range of the inclination angle.

In order to allow total reflection of light to occur on an interfacial surface between each of the core portions 94A to 94H and the cladding body 96, a refractive index difference therebetween needs to exist on the interfacial surface. The refractive index of each of the core portions 94A to 94H is greater than the refractive index of the cladding body 96.

The refractive index difference is not limited to a specific value, but is preferably 0.5% or more, and more preferably 0.8% or more. An upper limit value of the refractive index difference is not set to a specific value, but is preferably about 5.5%. If the refractive index difference is smaller than the lower limit value noted above, a light propagation effect is sometimes reduced. On the other hand, even if the refractive index difference is set greater than the upper limit value, the light propagation effect can no longer be expected to further increase.

In this regard, in the case where the refractive index of each of the core portions 94A to 94H is defined as $n_1$ and the refractive index of the cladding body 96 is defined as $n_2$, the refractive index difference is represented by the following equation (6):

$$\text{refractive index difference}(\%) = |n_1/n_2 - 1| \times 100 \qquad (6).$$

Further, a cross-sectional shape of each of the core portions 94A to 94H has a quadrangular shape such as a square shape or a rectangular shape.

Each of a width and height of the cross-sectional shape is not limited to a specific value, but is preferably in the range of about 1 to 200 μm, more preferably in the range of about 5 to 100 μm, and even more preferably in the range of about 10 to 60 μm.

Constituent materials of the core portions 94A to 94H and the cladding body 96 are not limited to specific kinds, as long as they can make the refractive index difference set forth above. Specifically, examples of the constituent materials include various kinds of resin materials such as an acryl-based resin, a methacryl-based resin, polycarbonate, polystyrene, epoxy resin, polyamide, polyimide, polybenzoxazole, polysilane, polysilazane and a cyclic olefin-based resin (e.g., a benzo cyclobutene-based resin or a norbornene-based resin), and the like.

In the present embodiment, the core portions 94A to 94H and the side cladding portions 95 of the core layer 93 are made of the same base material (base component). The refractive index difference between the core portions 94A to 94H and the side cladding portions 95 is developed by a difference between chemical structures of the constituent materials thereof.

In order to develop the refractive index difference due to the difference between chemical structures, it is preferred that a material whose refractive index is changed by being irradiated with an activated energy ray (actinic radiation) such as an ultraviolet ray or an electron ray (or by being additionally heated) is used as each of the constituent materials of the core portions 94A to 94H and the side cladding portions 95.

Examples of such a material with variable refractive index include a material whose chemical structures can be changed by breaking at least a part of bonds or removing at least a part of functional groups by being irradiated with the activated energy ray or heated.

Specifically, examples of a base resin of the material with variable refractive index include a silane-based resins such as polysilane (e.g., polymethyl phenyl silane) or polysilazane (e.g., perhydropolysilazane), the afore-mentioned resins (1) to (6) having functional groups in the side chains or the terminals of molecules.

Other examples of the base resin include an acryl-based resin and an epoxy-based resin, both of which can be obtained by polymerizing photo-curable monomers, and the like. In this regard, examples of such polymers include a random copolymer, a block copolymer, an alternating copolymer and the like.

It is particularly preferable to use norbornene-based polymers (resins) among them. These norbornene-based polymers can be obtained using various kinds of well known polymerizations such as ring opening metathesis polymerization (ROMP), a combination of ROMP and hydrogenation, polymerization via radicals or cations, polymerization using a cationic palladium polymerization initiator and polymerization using another polymerization initiator (e.g., a nickel polymerization initiator or another transition metal polymerization initiator).

On the other hand, the cladding layers 91 and 92 make up the cladding body 96 positioned below and above the core portions 94A to 94H. This configuration allows each of the core portions 94A to 94H to serve as a waveguide whose outer periphery is surrounded by the cladding body 96.

An average thickness of each of the cladding layers 91 and 92 is preferably in the range of about 0.1 to 1.5 times an average thickness of the core layer 93 (average height of the core portions 94A to 94H), and more preferably in the range of about 0.2 to 1.25 times the average thickness of the core layer 93.

Specifically, the average thickness of each of the cladding layers 91 and 92 is not limited to a specific value, but, in general, is preferably in the range of about 1 to 200 µm, more preferably in the range of about 5 to 100 µm, and even more preferably in the range of about 10 to 60 µm.

This enables each of the cladding layers 91 and 92 to reliably perform its function while preventing the optical waveguide 9 from being unnecessarily increased in a size (thickness).

Further, as a constituent material of each of the cladding layers 91 and 92, it is possible to use, for example, the same material as the constituent material of the core layer 93 described above. In particular, it is preferable to use a norbornene-based polymer.

In this regard, in the present embodiment, it is possible to appropriately select different materials in light of the refractive index difference between the cladding layers 91 and 92 and the core layer 93 and to use them as the constituent material of the cladding layers 91 and 92 and the constituent material of the core layer 93. It is desirable if the materials thus selected are capable of generating a refractive index difference great enough to totally reflect light in borders between the core layer 93 and cladding layers 91 and 92.

This makes it possible to obtain a great enough refractive index difference in a thickness direction of the optical waveguide 9, thereby restraining light from being leaked from each of the core portions 94A to 94H to the cladding layers 91 and 92. As a consequence, it is possible to suppress attenuation of light propagating through each of the core portions 94A to 94H.

From the viewpoint of the suppression of the light attenuation, it is preferable to enhance adhesion between the core layer 93 and the cladding layers 91 and 92. Therefore, the constituent material of each of the cladding layers 91 and 92 may be any material as long as it has a refractive index smaller than that of the constituent material of the core layer and provides enhanced adhesion with respect to the constituent material of the core layer 93.

While the optical waveguide area 11A has been representatively described hereinabove, the remaining optical waveguide areas 11B and 11C are also provided with a plurality of core portions and side cladding portions just like the optical waveguide area 11A.

Further, as described above, the alignment patterns 12A to 12C are formed in the optical waveguide film 10 in an adjoining relationship with outer edges of the optical waveguide areas 11A to 11C.

The alignment patterns 12A to 12C are arranged to divide the optical waveguide areas 11A to 11C and are used as reference lines when severing the optical waveguide areas 11A to 11C through a cutting work. The optical waveguide areas 11A to 11C are severed from one another by cutting the optical waveguide film 10 along the alignment patterns 12A to 12C. Each of the optical waveguide areas 11A to 11C thus severed can be used as the optical waveguide 9 to be connected to the connection counterpart.

As described above, the optical waveguide 9 is made of the resin material and, therefore, cannot avoid shrinkage when the resin material is solidified in a production process thereof.

In a conventional optical waveguide production process, a size of a gap between core portions (waveguide gap) is preliminarily designed in conformity with a size of a waveguide gap of a connection counterpart to which an optical waveguide is to be connected. With this design method, the size of the waveguide gap is changed together with shrinkage of a resin material. Thus, the size of the waveguide gap of the finally obtained optical waveguide does not match the size of the waveguide gap of the connection counterpart. This poses a problem of reducing optical connectivity between the optical waveguide and the connection counterpart.

In contrast, as described above, the optical waveguide 9 according to the present invention has such a shape that the size of the waveguide gap thereof varies cyclically along the X-direction. Therefore, if variation width of the size of the waveguide gap is generally set based on the shrinkage ratio of the resin material, it is possible to find a position where the size of the continuously varying waveguide gap of the optical waveguide 9 coincides with the size of the waveguide gap of the connection counterpart.

Figure 33:
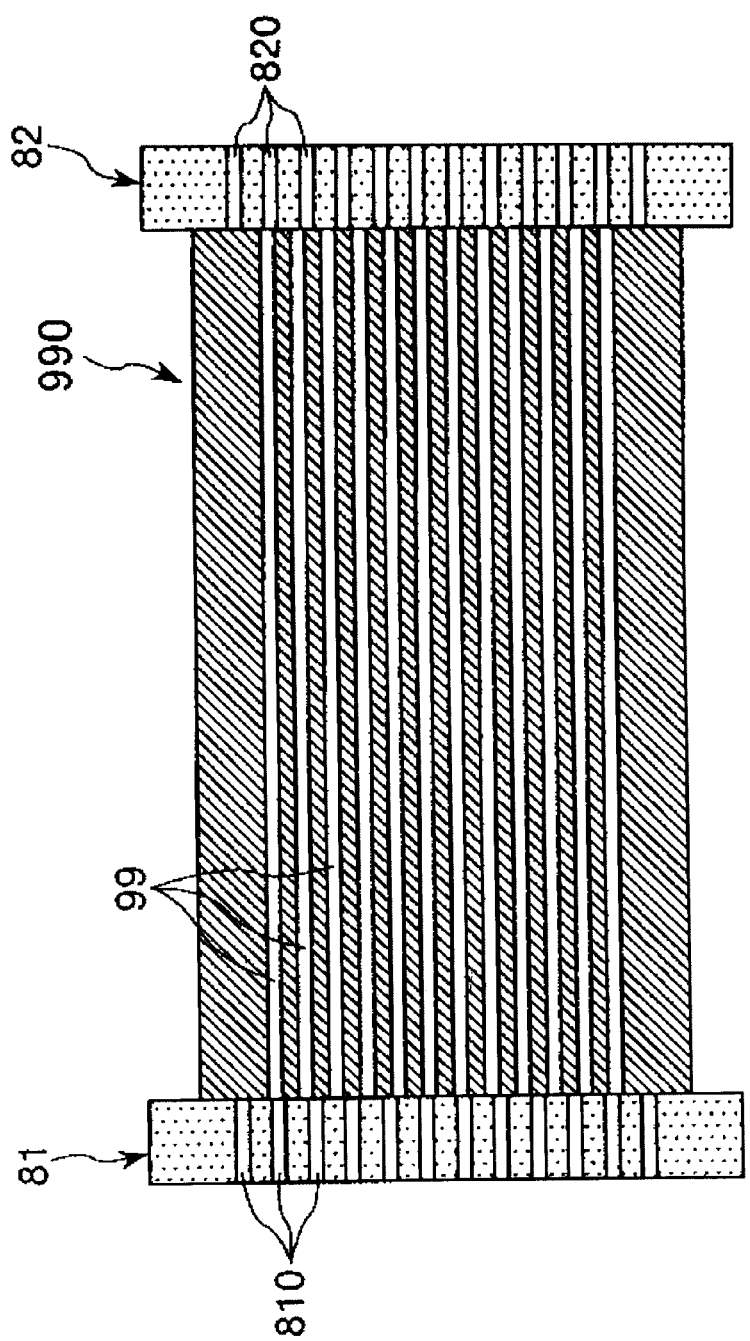
FIG. 33 is a view schematically showing a positional relationship between core portions of a conventional multichannel type optical waveguide and optical fiber cores of multi-core optical connectors as connection counterparts.
Figure 34:
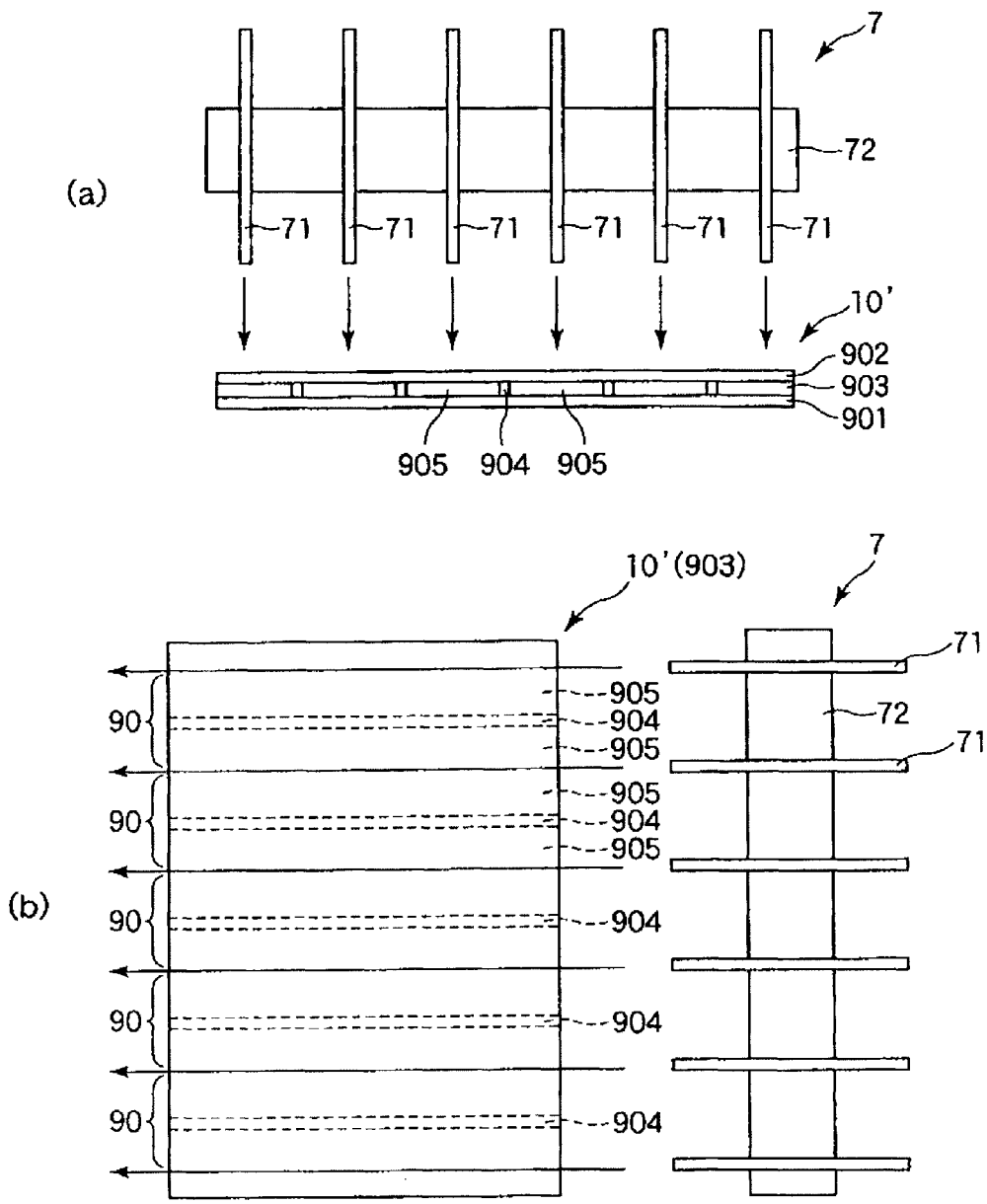
FIGS. 34(a) and 34(b) are views each explaining a method of cutting a conventional multichannel type optical waveguide film using a multi-blade saw.

Through visual estimation or measurement, the optical waveguide 9 produced as above is cut along the Y-direction in the position where the size of the waveguide gap of the optical waveguide 9 coincides with the size of the waveguide gap of the connection counterpart (e.g., a size of a gap between optical fiber cores 820 of a multi-core optical connector 82 shown in FIG. 33). Consequently, the size of the waveguide gap of the optical waveguide 9 and the size of the waveguide gap of the connection counterpart are coincident with each other in a cut surface of the optical waveguide 9. In this regard, a line C shown in FIG. 13 is one example of the cut surface.

In other words, a light incoming end surface or a light outgoing end surface having a waveguide gap with a desired size can be formed by cutting the optical waveguide 9 along the Y-direction in a specified position. Accordingly, the optical waveguide 9 shows good optical connectivity with respect to the connection counterpart regardless of the shrinkage ratio of the resin material.

Assuming an instance where there exist M core portions, the number of the waveguide gaps is M−1. If M is an integer of 2 or more, there exist one or more waveguide gaps. Thus, the sizes of the waveguide gaps in the optical waveguide 9 vary continuously and cyclically.

Further, if M is an integer of 3 or more, there exist two or more waveguide gaps. It is preferred that, despite the variation of the size of each of the waveguide gaps, a ratio between the sizes of the waveguide gaps is kept constant in any position along the X-axis. This is because the resin material is expected to be substantially uniformly shrunken over entire portions thereof.

In the case where the ratio between the sizes of the waveguide gaps is kept constant, only if the size of one of the waveguide gaps is coincident with the size of the gap of the connection counterpart, the sizes of all the remaining waveguide gaps necessarily coincide with the sizes of the waveguide gaps of the connection counterpart.

If the shape of each of the core portions 94A to 94H is defined by the cosine curve as mentioned above, the ratio between the sizes of the waveguide gaps becomes constant in a reliable manner regardless of the cutting position of the optical waveguide 9. In other words, it can be said that arrangement of the core portions 94A to 94H on the cut surface remains similar at all times no matter what position the optical waveguide 9 is cut.

With the present invention, therefore, it is possible to readily produce the optical waveguide 9 showing good connectivity with respect to the connection counterpart if the optical waveguide 9 is cut in the position where at least the size of one of the waveguide gaps coincides with the size of the waveguide gap of the connection counterpart. That is to say, the present invention makes it possible to easily design and produce the optical waveguide 9 whose waveguide gaps show increased versatility.

While the cutting position of the optical waveguide 9 is determined by the visual estimation or by the measurement using an arbitrary method, the optical waveguide 9 may be cut based on indicia preliminarily formed in the optical waveguide 9.

Specifically, the alignment patterns 12A, 12B and 12C are provided with alignment marks 13A, 13B and 13C, respectively. The alignment marks 13A, 13B and 13C are used as indicia (reference marks) when the optical waveguide 9 is cut along the Y-direction in conformity with the size of the waveguide gap of the connection counterpart.

Hereinafter, the alignment pattern 12A will be representatively described among the alignment patterns 12A, 12B and 12C.

The alignment pattern 12A includes a plurality of alignment marks 13A arranged along the X-direction. The alignment marks 13A enable a user to grasp the size of the waveguide gap in each of the positions of the alignment marks 13A. In other words, if the alignment marks 13A are formed within the same layer as the core portions 94A to 94H and made of the same resin material as the core portions 94A to 94H, it is possible to establish a specified relationship between each of the alignment marks 13A and the size of the waveguide gap.

This makes it possible to cut the optical waveguide 9 based on the alignment marks 13A and to obtain an end surface with a waveguide gap having a desired size without having to perform any visual estimation or measurement but by merely specifying the kind of the resin material.

FIGS. 16(A) and 16(B) are views (section views) each showing a relationship between the core portions 94A to 94H and the alignment patterns 12A and 12B. FIG. 16(C) shows a portion of an upper surface of the core layer 93 of the optical waveguide film 10. FIG. 16(A) shows a cross section of the optical waveguide film 10 taken along the line S1-S1 in FIG. 16(C). FIG. 16(B) shows a cross section of the optical waveguide film 10 taken along the line S2-S2 in FIG. 16(C).

In this regard, the alignment pattern 12A includes a pair of parallel dicing lines (linear patterns) 121A and 122A extending along the X-direction.

On the other hand, the alignment pattern 12B includes a pair of parallel dicing lines (linear patterns) 121B and 122B extending along the X-direction.

The dicing lines 121A, 122A, 121B and 122B can be formed though the same process as used for the formation of the core portions 94A to 94H.

A plurality of linear alignment marks 13A extending in the Y-direction are formed between the dicing lines 121A and 122A. The alignment marks 13A are arranged at an equal interval or specified intervals.

On the other hand, a plurality of linear alignment marks 13B extending in the Y-direction are formed between the dicing lines 121B and 122B. The alignment marks 13B are also arranged at an equal interval or specified intervals.

The alignment marks 13A and 13B can be formed though the same process as used for the formation of the core portions 94A to 94H.

Figure 16:
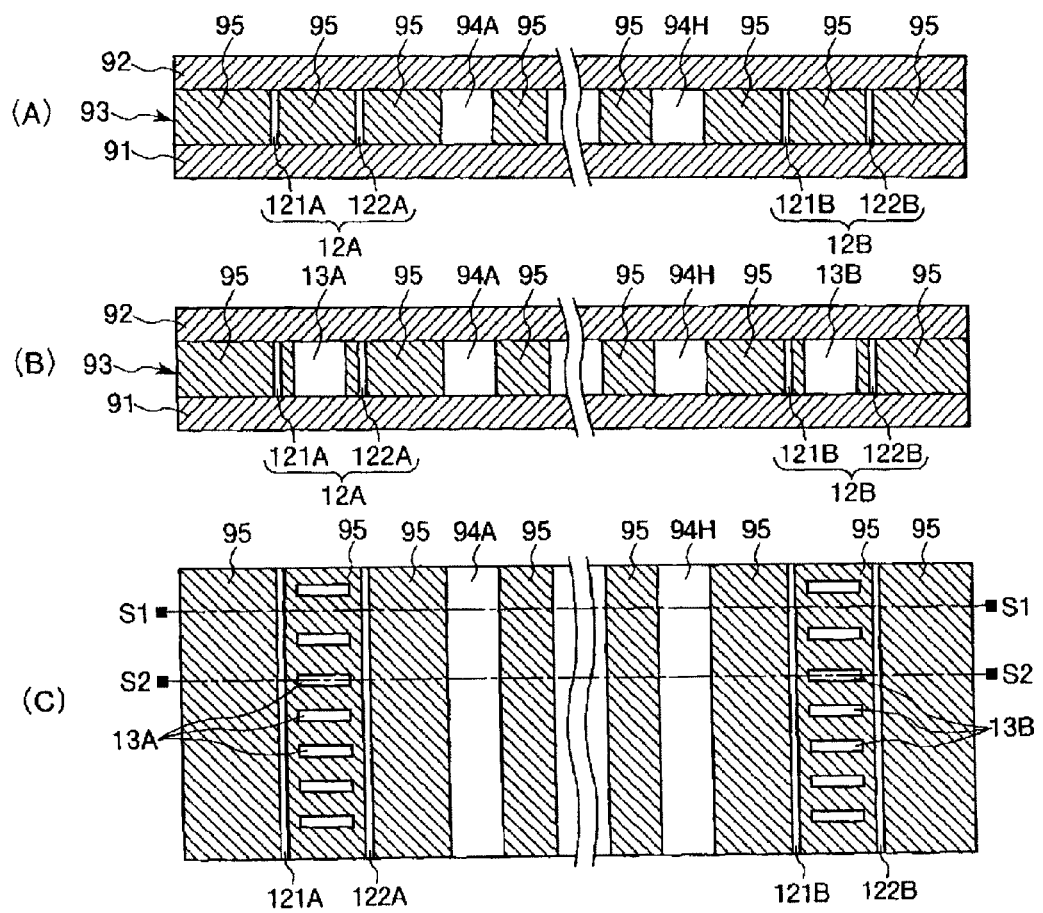
FIGS. 16(A) to 16(C) are views each showing a relationship between core portions and alignment patterns.

As shown in FIG. 16, each of the alignment marks 13A is separated from the dicing lines 121A and 122A and each of the alignment marks 13B is also separated from the dicing lines 121B and 122B. However, the present invention is not limited thereto. For example, each of the alignment marks 13A may be contiguous to one or both of the dicing lines 121A and 122A and each of the alignment marks 13B may be contiguous to one or both of the dicing lines 121B and 122B.

Further, shrinkage between the alignment patterns 12A and 12B is measured. Based on the measurement result, it is possible to calculate a Y-direction shrinkage ratio of the optical waveguide 9.

On the other hand, an X-direction shrinkage ratio of the optical waveguide 9 can be deemed to have the same value as the Y-direction shrinkage ratio thus calculated. Alternatively, shrinkage between the alignment marks 13A or shrinkage between the alignment marks 13B may be measured and the X-direction shrinkage ratio of the optical waveguide 9 may be calculated based on the measurement result.

In this manner, a user of the optical waveguide 9 preliminarily calculates a shrinkage ratio of each of resin materials. Based on this calculation, the user may set the maximum magnification ratio Rmax and the minimum magnification ratio Rmin in the equations (3) and (4) noted above.

Using the shrinkage ratios, a position and spacing of the alignment marks 13A and 13B are determined so that the size of the waveguide gap in the cut surface of the optical waveguide 9 can match the size of the waveguide gap of the connection counterpart. This makes it possible to easily produce the optical waveguide 9 having enhanced optical connectivity.

In this regard, while, the alignment marks 13A to 13C may be simple lines drawn along the Y-direction, numbers or symbols may be added thereto so that the user can identify the respective alignment marks 13A to 13C.

Figure 14:
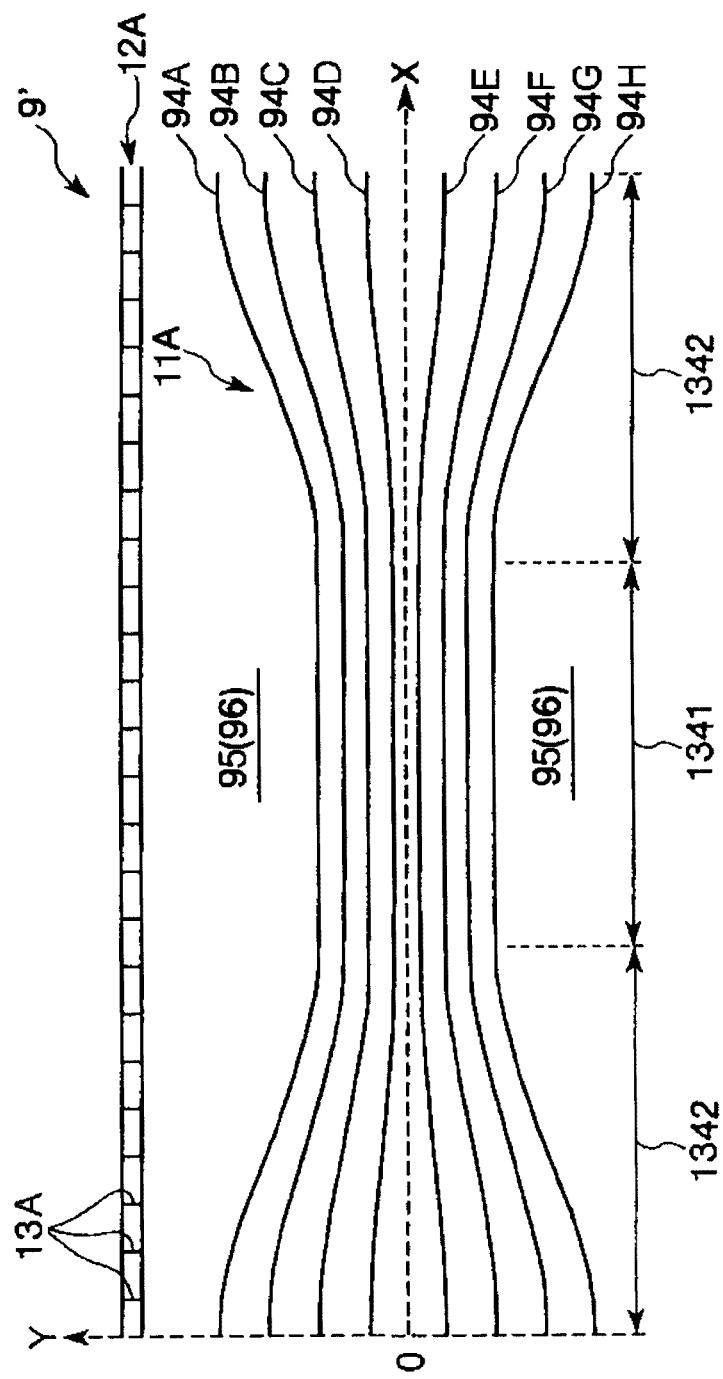
FIG. 14 is a view showing another configuration example of core portions that can be formed in the optical waveguide area.

FIG. 14 is a view showing another configuration example of the core portions 94A to 94H that can be formed in the optical waveguide area 11A. An optical waveguide 9' (or the optical waveguide film) shown in FIG. 14 is the same as the optical waveguide 9 (or the optical waveguide film) shown in FIG. 13, except a plan-view shape of each of the core portions 94A to 94H.

Each of the core portions 94A to 94H shown in FIG. 14 has a rectilinear longitudinal portion. In other words, each of the core portions 94A to 94H shown in FIG. 14 is divided into a rectilinear section 1341 and a pair of curved sections 1342 describing a cosine curve mentioned above.

The optical waveguide 9' having such a configuration can provide the same advantageous effects as provided by the above-described optical waveguide 9.

Further, it is preferred that the curved sections 1342 are formed in at least X-direction opposite portions of the optical waveguide 9'. With the optical waveguide 9' having such a configuration, it is possible for the curved sections 1342 to suppress the optical connection loss caused by the connection to the connection counterpart.

On the other hand, the rectilinear section 1341 having no curved part is capable of minimizing leakage of light to the cladding portion 96. As a result, the optical waveguide 9' can further enhance a quality of optical communication.

Figure 15:
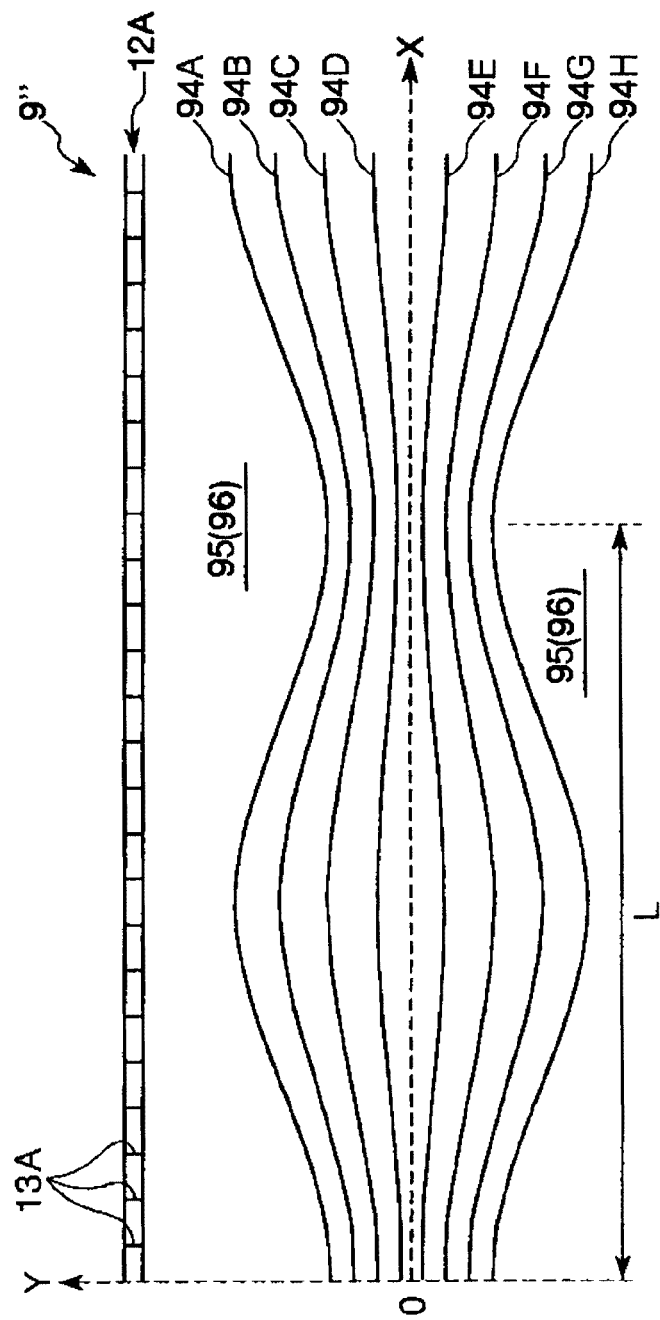
FIG. 15 is a view showing a further configuration example of core portions that can be formed in the optical waveguide area.

FIG. 15 is a view showing a further configuration example of the core portions 94A to 94H that can be formed in the optical waveguide area 11A. An optical waveguide 9" (or the optical waveguide film) shown in FIG. 15 is the same as the optical waveguide 9 (or the optical waveguide film) shown in FIG. 13, except a plan-view shape of each of the core portions 94A to 94H.

In the optical waveguide 9" shown in FIG. 15, a left end of each of the core portions 94A to 94H used as a starting point of the X-axis coincides with a point corresponding to a "valley bottom" of each of the curved sections. On the other hand, in the case of the optical waveguide 9 shown in FIG. 13, the left end of each of the core portions 94A to 94H used as the starting point of the X-axis coincides with a point corresponding to a "ridge top" of each of the curved sections. This is a differing point between the optical waveguide 9 and the optical waveguide 9".

In the optical waveguide 9" shown in FIG. 15, the plan-view shape of each of the core portions 94A to 94H is designed so as to describe a curve defined by the below-mentioned function.

Specifically, if an X-direction position of each of the core portions 94A to 94H is assumed to be "X", a Y-direction position "Y" of each of the core portions 94A to 94H is represented by the following equation (1a):

$$Y = -A \cos(2\pi X/L) + B \quad (1a),$$

where A, B and L are arbitrary real numbers, A denotes an amplitude, B signifies an offset amount and L stands for a cycle in the above equation (1a).

In this regard, the origin serving as a reference point for the positions X and Y exist in a left end portion of the optical waveguide 9" as indicated by "0" in FIG. 15. The origin "0" is a center point of a width (Y-direction length) of the optical waveguide 9".

Coordinates through which each of the core portions 94A to 94H passes are determined by defining the positions X and Y with the equation (1a). The shape of each of the core portions 94A to 94H is fixed by interconnecting the respective coordinates with a line.

While the optical waveguide 9, the optical waveguide 9' and the optical waveguide 9" have been described hereinabove, the shape of each of the core portions provided within the optical waveguide according to the present invention may be a so-called "sine curve" defined by the following equation (2):

$$Y = A \sin(2\pi X/L) + B \quad (2),$$

where A, B and L are arbitrary real numbers, A denotes an amplitude, B signifies an offset amount and L stands for a cycle in the above equation (2).

In this regard, the optical waveguide having the core portions each defined by the sine curve is substantially equivalent to parallel translation of the optical waveguide having the core portions each defined by the cosine curve, such as the optical waveguide 9, the optical waveguide 9' or the optical waveguide 9".

Accordingly, the optical waveguide having the core portions each defined by the equation (2) can provide the same advantageous effects as provided by the optical waveguide 9, the optical waveguide 9' and the optical waveguide 9".

The optical waveguide 9, the optical waveguide 9' and the optical waveguide 9" are capable of providing the same advantageous effects as mentioned in respect of the first embodiment.

(Production Method of Optical Waveguide Film)

The optical waveguide 9, the optical waveguide 9' and the optical waveguide 9" can be produced by the same method as used in the first embodiment.

(Structure of Laminated Type Optical Waveguide Film)

Figure 17:
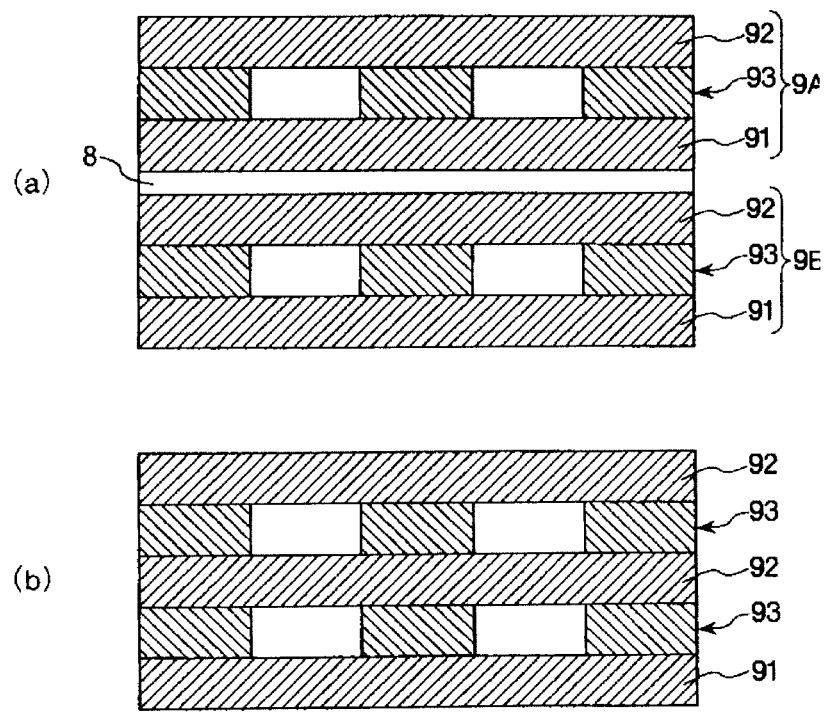
FIGS. 17(a) and 17(b) are section views each showing a schematic structure of a laminated type optical waveguide film.

FIGS. 17(*a*) and 17(*b*) are section views each showing a schematic structure of a laminated type optical waveguide film.

The laminated type optical waveguide film shown in FIG. 17(*a*) has a structure in which first and second optical waveguides 9A and 9B having the same structure as the optical waveguide 9 described above are laminated through an adhesive layer 8. A production method of the first and second optical waveguides 9A and 9B is the same as the production method of the optical waveguide 9 described above.

Further, the laminated type optical waveguide film shown in FIG. 17(*b*) has a structure in which a cladding layer (lower cladding layer) 91, a core layer (lower core layer) 93, a cladding layer (middle cladding layer) 92, a core layer (upper core layer) 93 and a cladding layer (upper cladding layer) 92 are laminated one above another. This means that the laminated type optical waveguide film shown in FIG. 17(*b*) has a structure in which two optical waveguides are laminated one above the other.

A laminated structure including the lower cladding layer 91, the lower core layer 93 and the middle cladding layer 92 is formed in the same method as the production method of the optical waveguide 9 described above. Thereafter, the upper core layer 93 and the upper cladding layer 92 are formed on the laminated structure through the same process as used for the formation of the core layer 93 and the cladding layer 92 of the optical waveguide 9 described above.

While the optical waveguide film, the laminated type optical waveguide film and the optical waveguide according to the present invention have been described hereinabove based on the embodiment illustrated in the drawings, the present invention is not limited thereto. The configurations of the respective parts may be substituted by or added with other arbitrary configurations having the equivalent functions.

For example, while the alignment pattern 12A is composed of the alignment marks 13A and the dicing lines 121A and 122A in the present embodiment, the present invention is not limited thereto. A pattern indicative of alignment marks may be completely separated from a pattern indicative of dicing lines.

Further, while the core portions having the same shape are formed in the optical waveguide areas 11A, 11B and 11C, core portions having different shapes may be formed in the optical waveguide areas 11A, 11B and 11C.

Furthermore, the number of the optical waveguide areas 11A, 11B and 11C is not limited to three. Four or more optical waveguide areas may be formed.

Moreover, while all the alignment patterns 12A, 12B and 12C shown in FIG. 12 have the same shape, the present invention is not limited thereto. In the case where optical waveguides having different shapes are formed in the optical waveguide areas 11A, 11B and 11C, it may be necessary to form alignment patterns having different shapes corresponding to the shapes of the core portions thus formed.

<Third Embodiment of Optical Waveguide Film>

Next, description will be made on a third embodiment of an optical waveguide film and an optical waveguide according to the present invention.

(Structure of Optical Waveguide Film)

First, the optical waveguide film will be described in detail with reference to preferred drawings.

Figure 18:
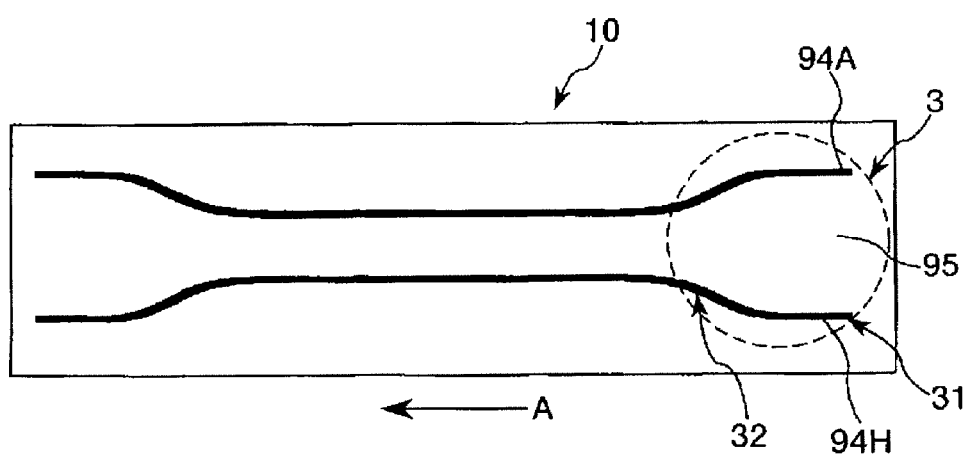
FIG. 18 is a top view schematically showing one example (third embodiment) of an optical waveguide film according to the present invention.
Figure 19:
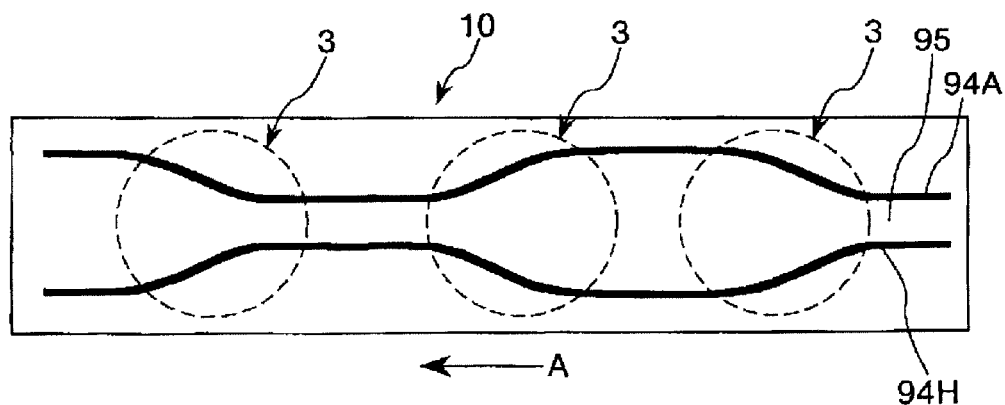
FIG. 19 is a top view schematically showing one example (third embodiment) of an optical waveguide film according to the present invention.
Figure 20:
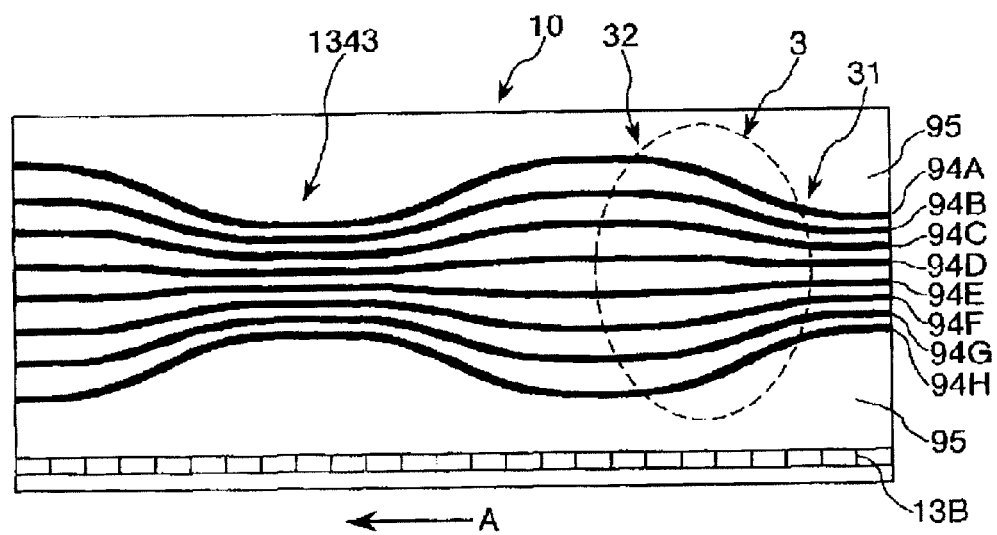
FIG. 20 is a top view schematically showing one example (third embodiment) of an optical waveguide film according to the present invention.

FIGS. 18 to 20 are top views each schematically showing one example (third embodiment) of the optical waveguide film according to the present invention.

Hereinafter, the third embodiment will be described with emphasis placed on points differing from the first and second embodiments. No description will be made on the same points.

The present embodiment remains the same as the first embodiment except that a width of a cladding portion positioned between adjoining core portions continuously varies at one and the other longitudinal end sides of an expected cutting area where the optical waveguide film is to be cut.

In other words, the optical waveguide film according to the present embodiment is characterized by including: a cladding portion extending along a longitudinal direction of the optical waveguide film; and a plurality of core portions extending along the longitudinal direction of the optical waveguide film and adjoining to each other with the cladding portion interposed therebetween, the optical waveguide film being cut in a direction orthogonal to the longitudinal direction when in use, wherein the width of the cladding portion positioned between the adjoining core portions continuously varies at one and the other longitudinal end sides of an expected cutting area where the optical waveguide film is to be cut.

Further, the present invention provides an optical waveguide characterized by being obtained using the above optical waveguide film.

Furthermore, the present invention provides an optical wiring line characterized by including the optical waveguide.

Moreover, the present invention provides an optical/electrical combination substrate characterized by including an electrical wiring line and the optical wiring line.

In addition, the present invention provides an electronic device characterized by including the optical waveguide.

The optical waveguide film 10 has a strip shape and includes a cladding portion 95 extending along the longitudinal direction of the optical waveguide film 10 (indicated by arrow A) and a plurality of core portions 94A and 94H extending along the longitudinal direction of the optical waveguide film 10 and adjoining to each other with the cladding portion 95 interposed therebetween.

Opposite side surfaces of the core portions 94A and 94H are contiguous to the cladding portion 95 having a refractive index smaller than that of each of the core portions 94A and 94H, while upper and lower surfaces of the core portions 94A and 94H make contact with air having a refractive index smaller than that of each of the core portions 94A and 94H. Thus, light introduced into each of the core portions 94A and 94H can propagate through each of the core portions 94A and 94H while undergoing total reflection.

While the upper and lower layers of the optical waveguide film 10 are formed of the air in the present embodiment, one or both of the upper and lower layers of the optical waveguide film 10 may be a cladding layer (or cladding layers) having a refractive index smaller than that of each of the core portions 94A and 94H.

The optical waveguide film 10 is cut in the direction orthogonal to the longitudinal direction when in use. The width of the cladding portion 95 positioned between the adjoining core portions 94A and 94H continuously varies at one and the other longitudinal end sides 31 and 32 of an expected cutting area 3 where the optical waveguide film 10 is to be cut. This makes it possible to suppress occurrence of positional deviation when inserting the optical waveguide into a connector.

As mentioned above, the optical waveguide film 10 is cut in the direction orthogonal to the longitudinal direction when in use, to thereby bring into an optical waveguide. A cut end portion thereof is inserted into a connector or the like not shown in the drawings.

It is sometimes a case that the optical waveguide film 10 undergoes a dimensional change due to its shrinkage or expansion caused by a heat treatment and so forth. If the dimensional change occurs in the optical waveguide film 10, a connection position between the optical waveguide and the connector is deviated. This often poses a problem of increasing light loss.

In the optical waveguide film 10 of the present embodiment, as a solution to the problem noted above, the core portions 94A and 94H for propagating light and the cladding portion 95 are configured so as to extend along the longitudinal direction of the strip-shaped optical waveguide film 10. The width of the cladding portion 95 positioned between the adjoining core portions 94A and 94H continuously varies at one and the other longitudinal end sides 31 and 32 of the expected cutting area 3.

Such continuous variation of the width of the cladding portion 95 makes it possible to select a cutting position matching a size of a waveguide gap of a connector (connection counterpart) even when the shrinkage occurs in the optical waveguide film 10. Consequently, it is possible to accurately connect the optical waveguide to the connector, thereby reducing the light loss.

In this regard, the cutting position of the optical waveguide film 10 can be determined by, for example, a method of determining the cutting position through width measurement made with a microscope or a method of determining the cutting position through use of alignment marks 13B preliminarily formed in the optical waveguide film 10, the latter method of which is preferred. This makes it possible to easily determine the cutting position depending on a shrinkage ratio of the optical waveguide film 10.

The width of the cladding portion 95 in the expected cutting area 3 is not particularly limited, but it preferably increased from one longitudinal end side 31 toward the other longitudinal end side 32 in a gradual manner. This makes it possible to determine the cutting position depending on the dimensional change of the optical waveguide film 10 and to readily reduce the light loss caused by the connection of the optical waveguide to a connector or the like.

A ratio of a minimum value (w1) and a maximum value (W2) of the width of the cladding portion 95 in the expected cutting area 3 (W2/W1) is not limited to a specific value, but is preferably in the range of 1.01 to 1.1. This makes it possible to cope with most of the dimensional changes of the optical waveguide film 10.

In particular, it is preferred that the ratio (W2/W1) is in the range of 1.02 to 1.05. In addition to the advantageous effect mentioned just above, this provides an advantageous effect of suppressing an increase in light loss (caused by flexural deformation). Moreover, this makes it possible to reduce a cut-away margin (a distance from the core portion 94A or 94H to one edge of the optical waveguide film 10).

In an optical waveguide film 10 shown in FIG. 19, expected cutting areas 3 intermittently exist along a longitudinal direction thereof (indicated by arrow A). This makes it possible to obtain a plurality of optical waveguides using a single optical waveguide film 10. Since the optical waveguide film 10 is constituted from the plurality of optical waveguides connected to each other, it is possible to use the material with no waste.

It is preferred that the optical waveguide film 10, in which the width of the cladding portion 95 continuously varies in the expected cutting area 3, include a plurality of core portions 94A, 94B, 94C, 94D, 94E, 94F, 94G and 94H as shown in FIG. 20. This makes it possible to obtain a multichannel optical waveguide.

As shown in FIG. 20, a plurality of cladding portions 95 are arranged between the respective core portions 94A to 94H of the optical waveguide film 10.

The core portions 94A to 94H are arranged at an equal interval of several ten μm to several hundred μm in a direction perpendicular to the direction of arrow A. Each of the cladding portions 95 arranged between the respective core portions 94A to 94H has a refractive index smaller than that of each of the core portions 94A to 94H.

Further, alignment marks 13B for defining the cutting position are formed in the optical waveguide film 10. This makes it possible to cut the optical waveguide film 10 with ease in light of a shrinkage ratio of the optical waveguide film 10.

The alignment marks 133 are provided within the same layer as the core portions 94A to 94H and formed in a section of the cladding portion 95 adjoining to an outermost one of the core portions 94A to 94H.

In this manner, a user of the optical waveguide film 10 preliminarily calculates the shrinkage ratios of the resin materials. Based on the shrinkage ratios, a shape of the expected cutting area 3 and/or a position and spacing of the alignment marks 13B are determined so that the size of the waveguide gap in a cut surface of the optical waveguide film 10 can match the size of the waveguide gap of the connection counterpart. Use of such an optical waveguide film 10 makes it possible to easily produce an optical waveguide having enhanced optical connectivity.

A size of a gap between the two adjoining core portions 94A to 94H in the direction perpendicular to the direction of arrow A (waveguide gap) remains constant in a central region 1343 of the optical waveguide film 10, but continuously varies toward the direction of arrow A in the expected cutting area 3.

A variation percentage of a width of each of the cladding portions 95 is not particularly limited, but is preferably kept constant. This means that the widths of the respective cladding portions 95 vary at the same percentage.

Especially, if waveguides of a connector to be connected with the core portions are arranged at an equal interval, it is preferred that the widths of the cladding portions 95 are kept uniform in a specific expected cutting position. This makes it possible to easily prevent occurrence of positional deviation with respect to the waveguides (connection counterpart) when the core portions 94A to 94H are inserted into the connector, thereby further reducing the light loss.

As shown in FIGS. 18 to 20, the optical waveguide film 10 of the present embodiment is characterized in that the width of each of the cladding portions 95 existing between the core portions 94A to 94H continuously varies in one and the other longitudinal end sides 31 and 32 of the expected cutting area 3. However, a method of changing the width of each of the cladding portions 95 is not particularly limited.

Specifically, in the case where the optical waveguide film 10 is represented by X-Y coordinates, the Y-direction coordinates of each of the core portions 94A to 94H each adjoining the cladding portions 95 are desired so as to have values of a continuous function with respect to the X-direction coordinates thereof. By doing so, since the shape of each of the core portions 94A to 94H continuously changes, the width of each of the cladding portions arranged between the respective core portions 94A to 94H also varies in a continuous manner.

Examples of the method of continuously changing the shape of each of the core portions 94A to 94H by the use of the above-mentioned continuous function include use of a trigonometric function, use of a polynomial function and use of a spline function.

More specifically, it is preferred that the shape of each of the core portions 94A to 94H describes a curve defined by the following equation (1) or (2):

$$Y = +A\cos(2\pi X/L) + B \quad (1); \text{ or}$$

$$Y = +A\sin(2\pi X/L) + B \quad (2),$$

where A, B and L are arbitrary real numbers, A denotes an amplitude, B signifies an offset amount, and L stands for a cycle in the above equations (1) and (2).

Coordinates through which each of the core portions 94A to 94H passes are determined by defining the positions X and Y with the equation (1) or (2). The shape of each of the core portions 94A to 94H is fixed by interconnecting the respective coordinates with a line.

In this regard, the cycle L is a parameter equivalent to a "wavelength" in the cosine curve. Although the cycle L may be a different value in each of the core portions, it is preferred that the cycle L in each of the core portions is set so as to have the same value.

Further, the cycle L is properly set depending on a length of the optical waveguide 9. For example, if the length of the optical waveguide 9 is about 200 mm, the cycle L is preferably in the range of about 5 to 100 mm, and more preferably in the range of about 10 to 50 mm.

In contrast, the amplitude A and the offset amount B are parameters for defining a waveform of the cosine curve or a distance from an X-axis, respectively. It is preferred that the amplitude A and the offset amount B are set so as to have different values, respectively, in each of the core portions.

If the respective parameters are set as above, the core portions do not intersect one another and the size of the gap between the core portions (waveguide gap) continuously varies along an X-direction. This ensures independence of light propagating through each of the core portions, thereby preventing occurrence of cross talk between the core portions serving as channels.

Owing to the continuous variation of the size of the waveguide gap, the optical waveguide of the present invention is capable of providing advantageous effects (e.g., improved connectivity) to be set forth below.

In the case where the optical waveguide film 10 includes the plurality of core portions 94A to 94H as shown in FIG. 20, the amplitude A is a parameter equivalent to a "wave height" in the cosine curve. It is preferred that the amplitude A is set so as to have a different value in each of the core portions 94A to 94H.

The amplitude A is set based on the following equation (3):

$$A=+(R\max-R\min)(N-1)P/4 \quad (3),$$

where Rmax is a maximum magnification ratio, Rmin is a minimum magnification ratio, N is a core portion number (channel number), and P is the size of the waveguide gap in the above equation (3).

Further, the offset amount B is a parameter equivalent to the distance spaced apart from the X-axis of the cosine curve. The offset amount B is set so as to have a different value in each of the core portions 94A to 94H based on the following equation (4):

$$B=+(R\max+R\min)(N-1)P/4 \quad (4),$$

where Rmax is the maximum magnification ratio, Rmin is the minimum magnification ratio, N is a core portion number (channel number), and P is the size of the waveguide gap in the above equation (4).

In this regard, the amplitude A and the offset amount B have a positive sign (+) with respect to each of the core portions 94A to 94D positioned above the X-axis (Y-axis positive side), but have a negative sign (−) with respect to each of the core portions 94E to 94H positioned below the X-axis (Y-axis negative side).

The maximum magnification ratio Rmax and the minimum magnification ratio Rmin of the equations (3) and (4) are set to 1 or more, preferably in the range of 1 to 1.05, and more preferably in the range of about 1.01 to 1.03 depending on a shrinkage ratio when a resin material constituting the optical waveguide is solidified. Further, the maximum magnification ratio Rmax is set greater than the minimum magnification ratio Rmin, and a difference therebetween is preferably in the range of about 0.02 to 0.05.

Although the maximum magnification ratio Rmax may be a different value in each of the core portions 94A to 94H, it is set so as to have the same value in the present embodiment. Likewise, the minimum magnification ratio Rmin is set so as to have the same value in the present embodiment although it may be a different value in each of the core portions 94A to 94H.

In this regard, the maximum magnification ratio Rmax and the minimum magnification ratio Rmin can be calculated from the shrinkage ratio of the resin material (reduction ratio of dimension attributable to shrinkage). No particular restriction is imposed on a calculation method of the magnification ratios. If the shrinkage ratio of the resin material is assumed to be, e.g., 2%, a value obtained by adding 1 to the shrinkage ratio can be used as a basic magnification ratio.

The magnification ratio is increased or decreased depending on the kind of the resin material used, a production environment and individual variability. The maximum magnification ratio Rmax and the minimum magnification ratio Rmin can be defined by applying the increase or decrease ratio to the basic magnification ratio.

Further, N is a parameter signifying the core portion number (channel number). Depending on an arrangement order of the core portions 94A to 94H from an external side thereof, this parameter is represented by the following equation (5):

$$N=N_0+2-2n \quad (5),$$

where $N_0$ is the total number of the channels (the total number of the core portions), and n is the arrangement order of the core portions from the external side thereof in the above equation (5).

In this regard, the total number of the channels $N_0$ may be appropriately set depending on the total number of channels of the connection counterpart. Further, it is sometimes a case that the arrangement order n has two different values depending on an order counting direction. In this case, a smaller value is taken as the arrangement order n.

Further, if the total number of the channels $N_0$ is odd, it is preferred that a centrally positioned core portion among the respective core portions arranged side by side is located on the X-axis. In other words, if the total number of the channels $N_0$ of the optical waveguide is assumed to be odd, it is preferred that a rectilinear core portion is positioned on the X-axis in FIG. 20.

Furthermore, the size of the waveguide gap P is defined to correspond to the size of the waveguide gap of the connection counterpart to which the optical waveguide is to be connected. Although the sizes of the waveguide gaps P between the respective adjoining core portions 94A to 94H may be different from each other, they are set so as to have the same value in the present embodiment.

For example, the size of the waveguide gap P is preferably 30 μm or greater, and more preferably 50 μm or greater. In this regard, an upper limit value of the size of the waveguide gap P is not limited to a specific value, but may be, e.g., about 500 μm.

Using the equations noted above, a plan-view shape of each of the core portions 94A to 94H can be determined in an unambiguous manner.

In this regard, in the case where the material for the producing the optical waveguide is a material which undergoes shrinkage when being solidified such as a resin material, the equations (3) and (4) each containing the maximum magnification ratio Rmax and the minimum magnification ratio Rmin as the parameters each reflecting the shrinkage ratio are equations for defining a pre-solidification shape of each of the core portions 94A to 94H in a strict meaning.

Since change in a shape of the optical waveguide caused by the shrinkage of the resin material is quite insignificant, it can be deemed that a shape of each of the core portions after solidification of the resin material is substantially the same as the pre-solidification shape thereof. In other words, the shape of each of the core portions 94A to 94H after the solidification of the resin material also can be defined by the equations (3) and (4).

In each of the core portions 94A to 94H having the aforementioned shapes, an inclination angle of each of tangential lines passing arbitrary points of an optical path thereof with respect to the X-axis (hereinafter just referred to as "inclination angle") is designed so as to continuously (smoothly) vary with respect to the X-axis.

Thanks to this feature, each of the core portions 94A to 94H has no heavily curved part having sharp curvature. This makes it possible to suppress leakage of light which would otherwise occur in the curved part. As a result, each of the core portions 94A to 94H shows an enhanced light propagation property.

Specifically, the inclination angle is preferably 1° or smaller, more preferably in the range of 0 to 0.8°, and even more preferably in the range of 0.01 to 0.5°. Setting the inclination angle within the above-noted range makes it possible to minimize the leakage of light.

In addition, an incident angle of light on an incoming end surface and an exit angle of light on an outgoing end surface are prevented from becoming too small with respect to the X-axis. This makes it possible to improve connectivity between the optical waveguide and the connection counterpart connected thereto, thereby reliably suppressing optical connection loss therebetween.

In this regard, since the inclination angle depends on the above-mentioned parameters such as the cycle L and the amplitude A, it is preferred that these parameters are set depending on a desired range of the inclination angle.

The optical waveguide film of the present embodiment can provide the same advantageous effects as provided by the first embodiment.

(Production Method of Optical Waveguide Film)

The optical waveguide film of the present embodiment can be produced by the same method as used in the first embodiment.

While the optical waveguide film, the laminated type optical waveguide film and the optical waveguide according to the present invention have been described hereinabove based on the embodiment illustrated in the drawings, the present invention is not limited thereto. The configurations of the respective parts may be substituted by or added with other arbitrary configurations having the equivalent functions.

Further, the optical waveguide film of the present invention may be a combination of two or more of the above-described embodiments.

<First Embodiment of Optical Waveguide Assembly>

Next, description will be made on a first embodiment of an optical waveguide assembly according to the present invention.

(Structure of Optical Waveguide Assembly)

Figure 21:
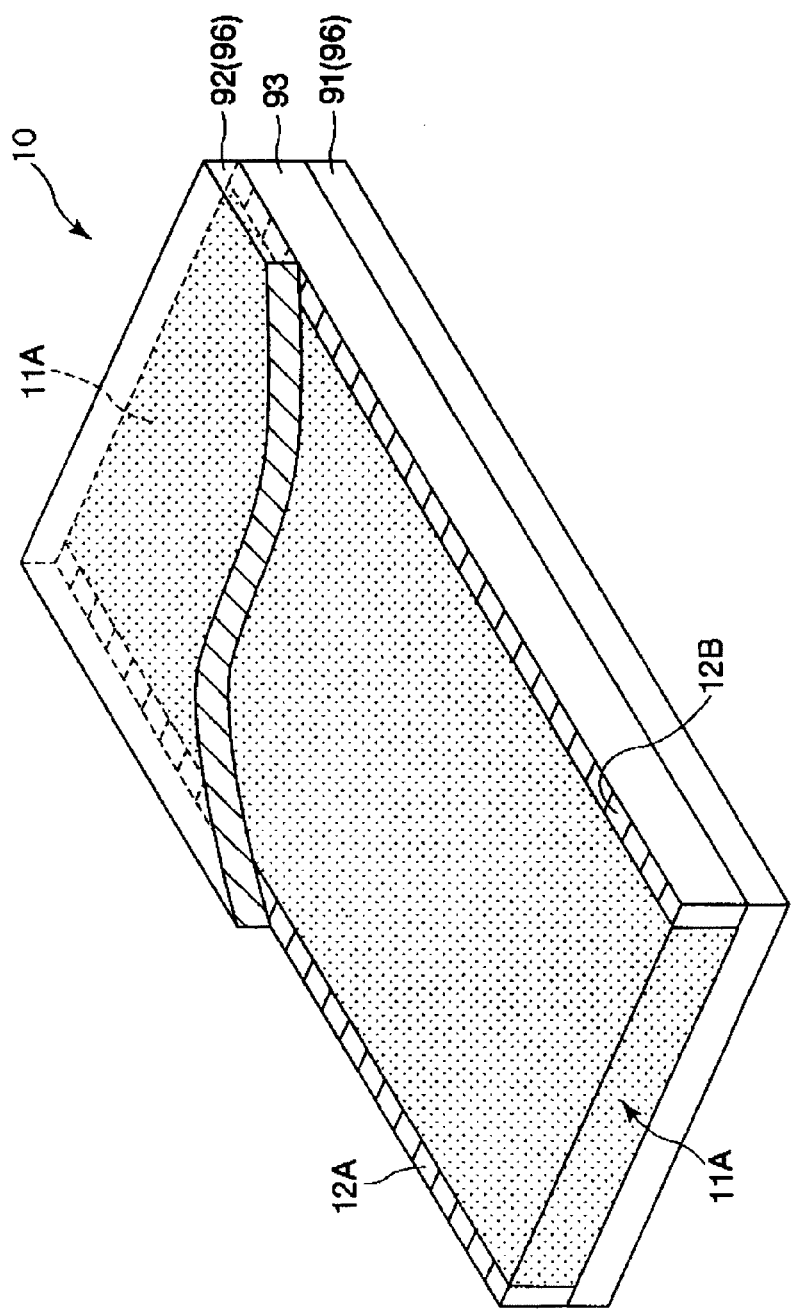
FIG. 21 is a partially cut-away perspective view showing an optical waveguide film to which a first embodiment of an optical waveguide assembly according to the present invention is applied.
Figure 22:
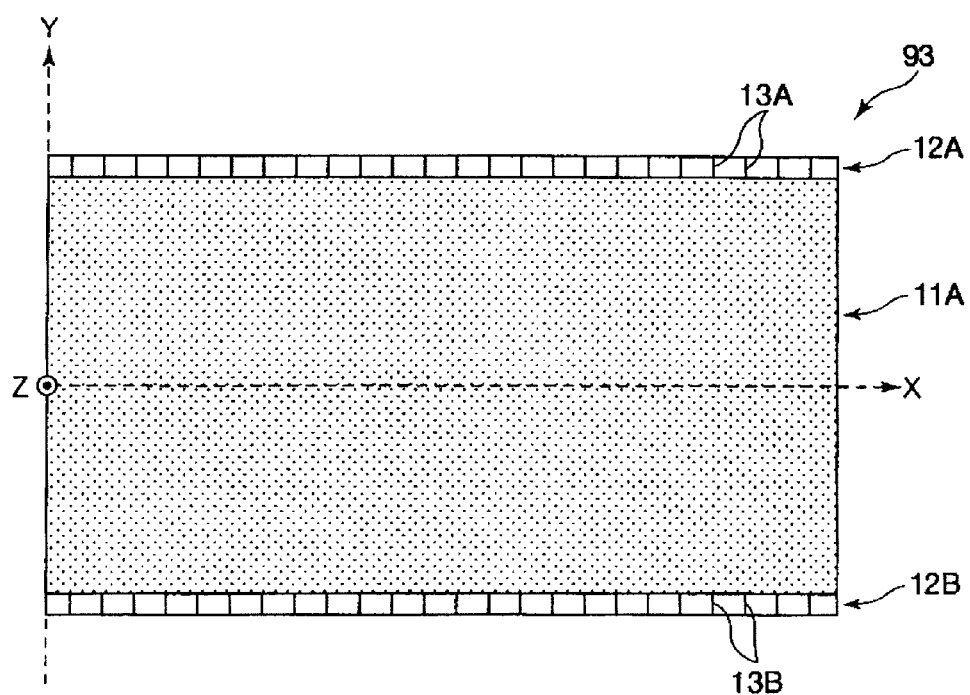
FIG. 22 is a schematic plan view showing a core layer of the optical waveguide film shown in FIG. 21.
Figure 23:
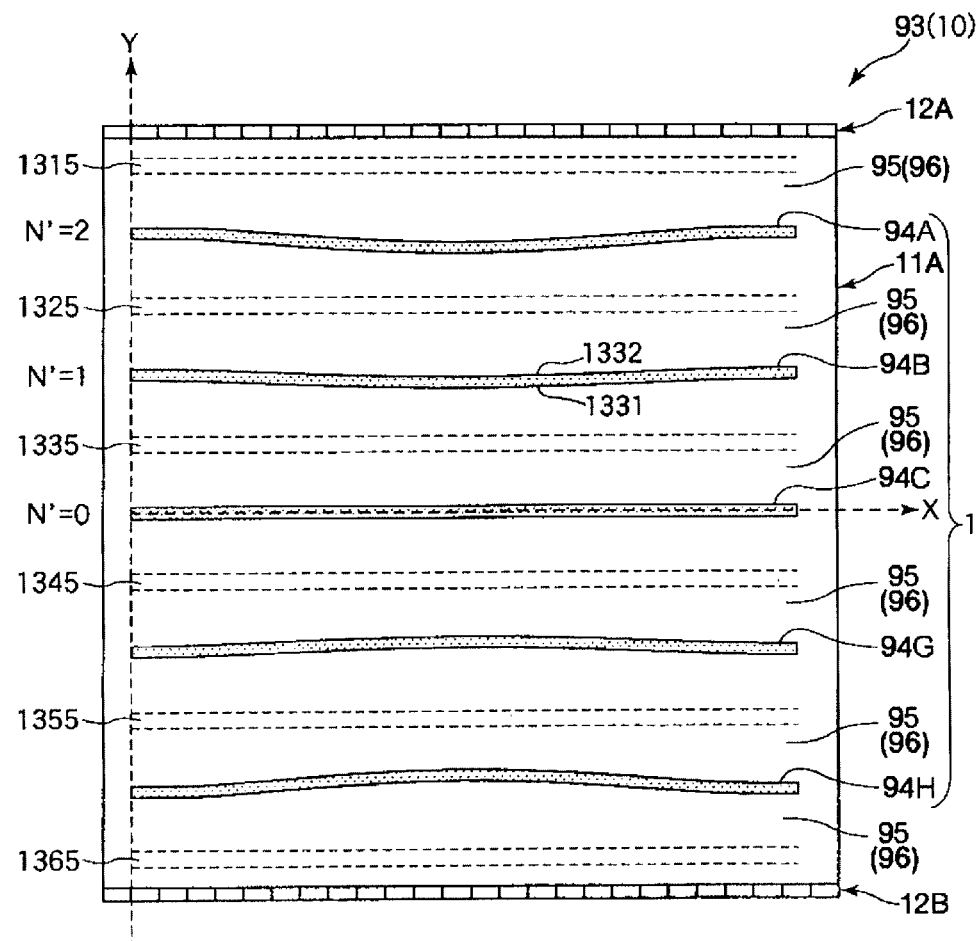
FIG. 23 is a schematic plan view of the core layer which is the first embodiment of the optical waveguide assembly according to the present invention.
Figure 25:
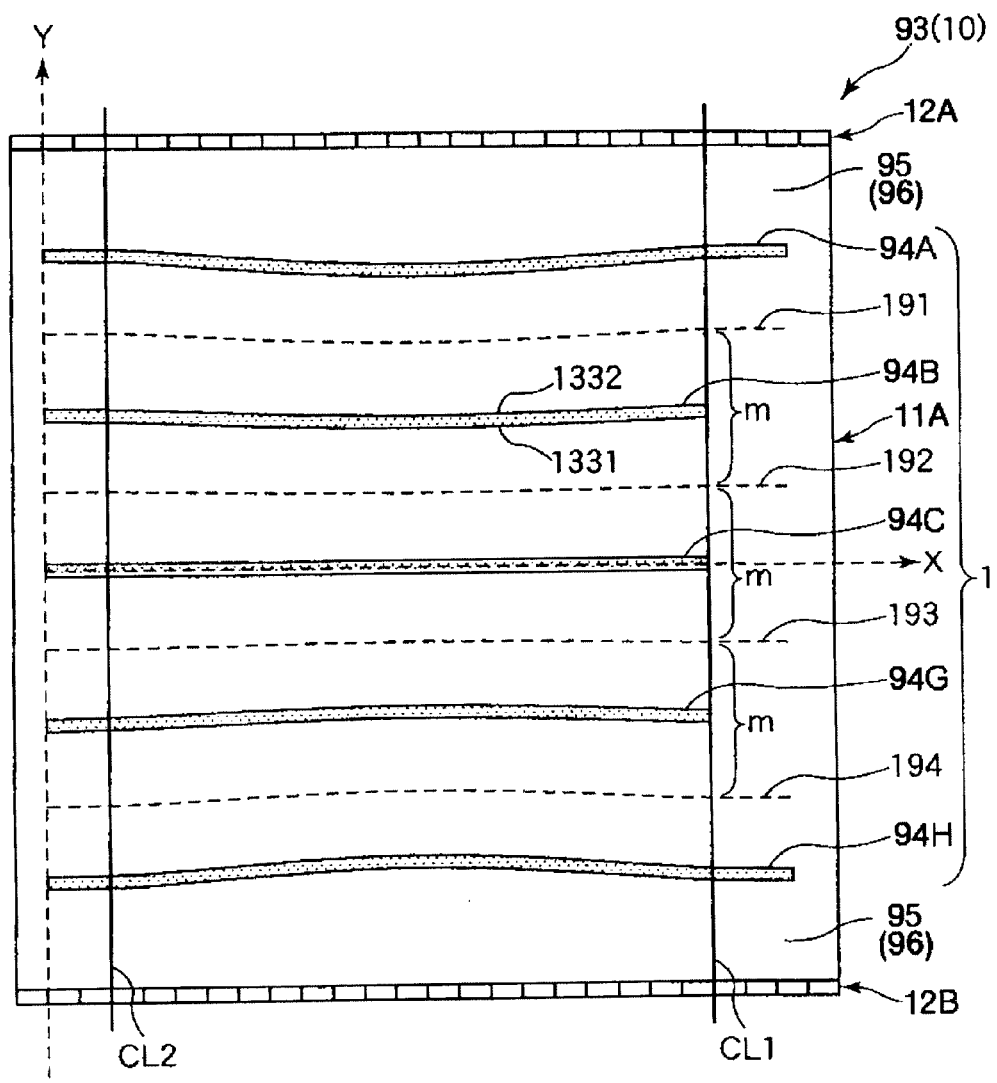
FIG. 25 is a schematic plan view of the core layer which is the first embodiment of the optical waveguide assembly according to the present invention.

FIG. 21 is a partially cut-away perspective view showing an optical waveguide film to which the first embodiment of the optical waveguide assembly according to the present invention is applied. FIG. 22 is a schematic plan view showing a core layer of the optical waveguide film shown in FIG. 21. FIGS. 23 and 25 are schematic plan views of the core layer which is the first embodiment of the optical waveguide assembly according to the present invention.

In this regard, in FIG. 22, an X-axis, a Y-axis and a Z-axis are set as indicated by arrows. In the following description, a Y-axis positive side in FIG. 22 will be referred to as "upper" and a Y-axis negative side in FIG. 22 will be referred to as "lower".

An optical waveguide film 10 shown in FIG. 21 has an elongated structure in which a cladding layer (cladding portion) 91, a core portion 93 and a cladding layer (cladding portion) 92 are laminated in the named order toward a Z-axis positive side (front side of paper sheet) in FIG. 21.

As shown in FIG. 22, the core layer 93 includes an optical waveguide area 11A and a pair of alignment patterns 12A and 12B adjoining opposite lateral sides of the optical waveguide area 11A. As will be set forth below, the optical waveguide area 11A includes a plurality of core portions arranged generally side by side within the same layer so as to extend along the X-axis and side cladding portions each covering side surfaces of each of the core portions and having a refractive index smaller than that of each of the core portions.

The optical waveguide film 10 is finally cut along the side cladding portions into a plurality of pieces which forms optical waveguides. In other words, the optical waveguide film 10 is composed of an optical waveguide assembly 1 having a plurality of optical waveguides arranged therein.

Hereinafter, configurations of respective parts of the optical waveguide film 10 will be described one after another.

First, description will be made on the optical waveguide area 11A.

The optical waveguide area 11A shown in FIG. 23 includes five core portions 94A, 94B, 94C, 94G and 94H arranged side by side so as to extend along the X-axis. The side surfaces of each of the core portions 94A to 94H are covered with side cladding portions 95 each having a refractive index smaller than that of each of the core portions 94A to 94H.

In other words, each of the core portions 94A to 94H shown in FIG. 23 is surrounded by a cladding body 96 including the cladding layer 91 positioned at a negative side of the Z-axis, the cladding layer 92 positioned at a positive side of the Z-axis and the side cladding portions 95 positioned at lateral sides. In FIG. 23, dots are given to each of the core portions 94A to 94H.

In the optical waveguide film 10, light incident on one end surface of each of the core portions 94A to 94H is totally reflected by an interfacial surface of each of the core portions 94A to 94H and the cladding body 96 and is propagated toward an outgoing side thereof. Thus, the light can be taken out from the other end surface of each of the core portions 94A to 94H.

In this regard, the core portions 94A to 94H are arranged at an equal interval in the Y-direction perpendicular to the X-direction. A size of a Y-direction gap (hereinafter referred to as "waveguide gap") between two mutually-adjoining arbitrary core portions among the core portions 94A to 94H, i.e., a width of the side cladding portion 95, is designed so as to vary with a specified cycle.

Further, a centrally positioned core portion 94C among the respective core portions 94A to 94H extends rectilinearly along the X-axis. Further, the core portions 94A, 94B, 94G and 94H other than the core portion 94C are in a line-symmetric relationship with respect to the X-axis.

Specifically, the core portions 94A and 94B are positioned above the X-axis. On the other hand, the core portion 94G corresponds to a mirror image of the core portion 94B obtained by inverting the core portion 94B downwards about the X-axis. Further, the core portion 94H corresponds to a mirror image of the core portion 94A obtained by inverting the core portion 94A downwards about the X-axis.

In the present embodiment, therefore, shapes of the core portions 94G and 94H as the mirror images of the core portions 94A and 94B are naturally defined upon defining shapes of the core portions 94A and 94B.

Hereinafter, the core portions 94A to 94H will be described in more detail. In some descriptions, the core portion 94B positioned above the X-axis (Y-axis positive side higher than X-axis) will be representatively described for the reasons mentioned above.

As will be set forth below, the optical waveguide film is made of a resin material. Therefore, the optical waveguide film 10 undergoes shrinkage when being solidified. A shape and dimension of the optical waveguide film 10 is slightly changed before and after shrinkage. Hereinafter, description will be made on a state that the core portions 94A to 94H are not shrunk.

The core portion 94B extends along the X-axis when seen in a plan view. The core portion 94B includes a contour line 1331 positioned at an X-axis side, a contour line 1332 positioned at an opposite side from the X-axis and a strip-shaped area interposed between the contour lines 1331 and 1332.

In this regard, if Y coordinates of the contour line 1331 are represented by an X function $f_a(X)$ and Y coordinates of the contour line 1332 are represented by an X function $f_b(X)$, the functions $f_a(X)$ and $f_b(X)$ satisfy the following equations (7) and (8), respectively:

$$f_a(X) > \{(N'-\tfrac{1}{2})P + N'W\}R\max \qquad (7); \text{ and}$$

$$f_b(X) < \{(N'+\tfrac{1}{2})P + N'W\}R\min \qquad (8).$$

In the equations (7) and (8), N' is an arrangement order of the core portion counted from the X-axis. When the number of the core portions 94A to 94H is odd, the arrangement order N' is expressed by an integer reckoned from a central core portion (N'=0). When the number of the core portions 94A to 94H is even, the arrangement order N' is expressed by a half-integer reckoned from a core portion closest to the X-axis (N'=0.5).

Further, P, W, Rmax and Rmin are the same values in each of the core portions. Among them, P is a setting value of a width of each of the optical waveguides produced by cutting the optical waveguide film 10. W is a cutting width of a cutting tool to be used in cutting the optical waveguide film 10. Rmax and Rmin are real numbers of 1 or more, and Rmax is greater than Rmin.

In the case where a plurality of optical waveguides are produced by severing the optical waveguide film 10 having the five core portions 94A to 94H, there is a need to cut the optical waveguide film 10 in such a manner that cutting traces (kerfs) do not deviate from the side cladding portions 95. Further, in order to obtain the optical waveguides having the outermost core portions 94A and 94H, external sides of the optical waveguide film 10 may be cut. In this case, the optical waveguide film 10 needs to be cut along six cutting lines in total in order to individually sever the core portions 94A to 94H.

When cutting the optical waveguide film 10, "cutter lanes" may be preliminarily formed along tracks of cutting tools. If cutter lanes each corresponding to a cutter width of a cutting tool are formed in advance, widths of the optical waveguides obtained do not fluctuate even when the cutting tool has an increased cutter width.

The optical waveguide film 10 (the optical waveguide assembly of the present invention) shown in FIG. 23 includes areas equivalent to the cutter lanes formed in positions of the six cutting lines. The purpose of forming the cutter lanes is to efficiently produce a plurality of optical waveguides each having an equal width with a reduced number of cutting times when the optical waveguide film 10 is cut to produce the optical waveguides.

The optical waveguide film 10 shown in FIG. 23 includes a cutter lane 1315 formed at an upper side of the core portion 94A, a cutter lane 1325 formed between the core portions 94A and 94B, a cutter lane 1335 formed between the core portions 94B and 94C, a cutter lane 1345 formed between the core portions 94C and 94G, a cutter lane 1355 formed between the core portions 94G and 94H and a cutter lane 1365 formed at a lower side of the core portion 94H.

In other words, all the cutter lanes 1315 to 1365 are formed in the side cladding portions 95. In this regard, due to the formation of each of the cutter lanes 1315 to 1365, the width of each of the side cladding portions 95 is increased in proportion to the width of each of the cutter lanes 1315 to 1365. However, an outward appearance of each of the side cladding portions 95 remains unchanged.

In the case where the cutter lanes 1315 to 1365 are made of the same material as the side cladding portions 95, borders between the cutter lanes 1315 to 1365 and the side cladding portions 95 may not be visually recognizable. Therefore, contour lines of the cutter lanes 1315 to 1365 indicated by dot lines in FIG. 23 are imaginary ones.

Figure 28:
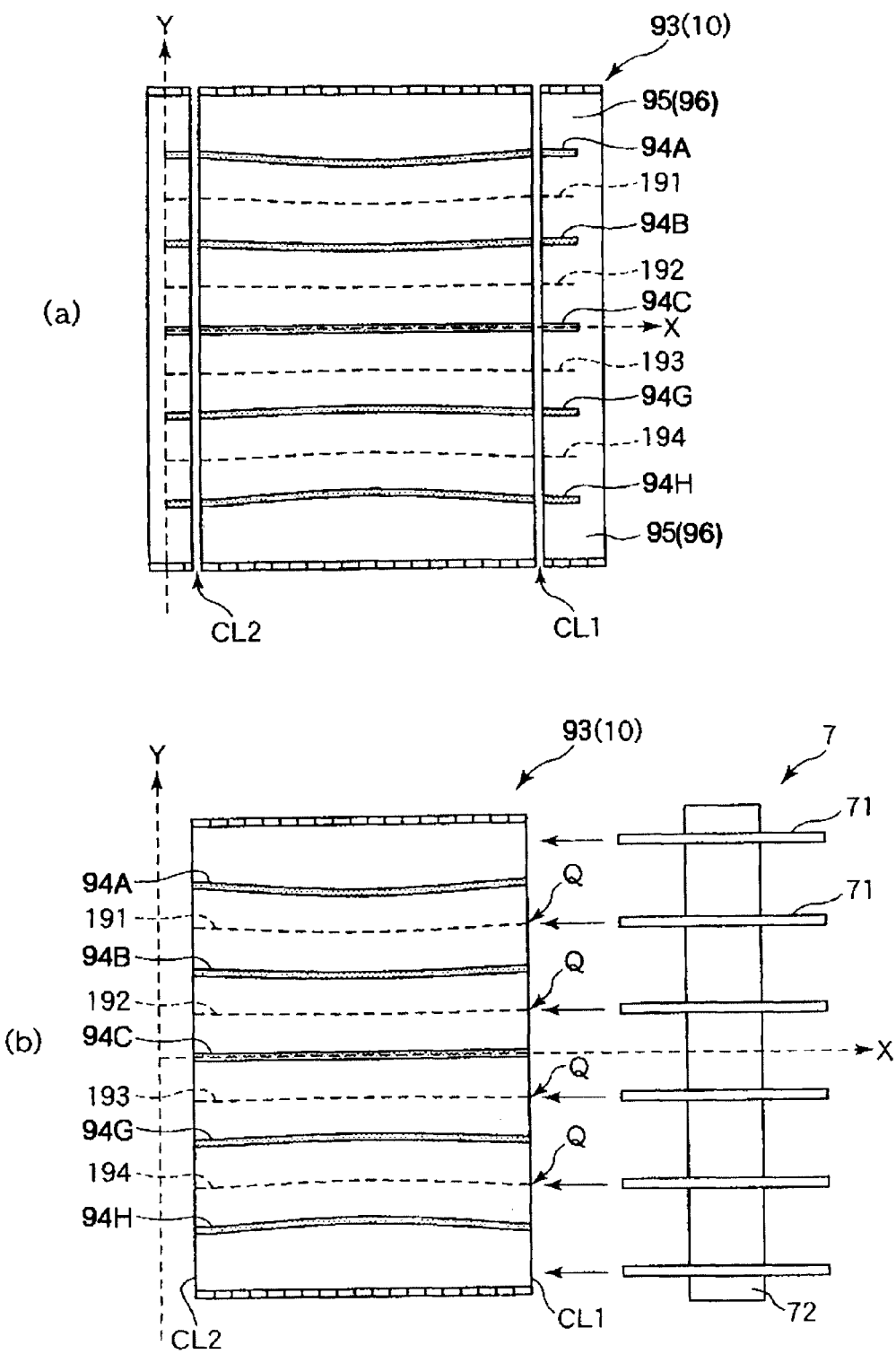
FIGS. 28(a) and 28(b) are views each illustrating a method of producing a plurality of optical waveguides by severing the optical waveguide film shown in FIG. 25.

The optical waveguide film 10 is usually cut using a multi-blade saw 7 as shown in FIG. 28. The multi-blade saw 7 includes a plurality of saw blades 71 arranged at an equal interval. The saw blades 71 pass the corresponding cutter lanes 1315 to 1365 so that the optical waveguide film 10 is cut. This makes it possible to efficiently sever the optical waveguide film 10 through a single cutting process.

Conventionally, work for severing an optical waveguide film constituted from a resin material using the multi-blade saw 7 is not easy to perform. This is because the process of cutting the optical waveguide film is performed after solidification (i.e., shrinkage) of the resin material, as a result of which the shrunken optical waveguide film has individual dimension variability due to variation in a shrinkage ratio of the resin material.

In other words, when the shrunken optical waveguide film is severed using the multi-blade saw 7, it is necessary to adjust a size of a gap between the saw blades 71 in light of the individual dimension variability. This results in sharp reduction of productivity of an optical waveguide.

On the other hand, in the case where one attempts to cut the optical waveguide film with no adjustment of the size of the gap between the saw blades 71 for the purpose of improving the productivity, a size of a waveguide gap of the optical waveguide film do not match the size of the gap between the saw blades 71. Thus, a core portion of the optical waveguide thus severed becomes eccentric. Use of this optical waveguide generates severe light loss in a connection portion, inevitably a reducing communication quality.

In the present invention, the shapes of the contour lines of each of the core portions 94A to 94H are defined by the functions $f_a(X)$ and $f_b(X)$, so that the sizes of the gaps between the respective core portions 94A to 94H, i.e., the widths (Y-direction lengths) of the side cladding portions 95 positioned between the respective core portions 94A to 94H, continuously vary along the X-direction.

As mentioned above, the functions $f_a(X)$ and $f_b(X)$ satisfy the condition that the widths of the side cladding portions 95 continuously vary along the X-direction and the condition that a ratio of lengths obtained by deducting the widths of the cutter lanes from the widths of the side cladding portions 95 is kept constant in an arbitrary X coordinate despite the variations of the widths.

Specifically, the functions $f_a(X)$ and $f_b(X)$ are those functions each containing a continuously varying curve, such as trigonometric functions, elliptical functions, quadratic functions, cubic functions, quartic functions, polynomial functions or spline functions.

If the optical waveguide film includes a varying area where the widths of the side cladding portions 95 vary continuously, the width of the optical waveguide to be cut (or the size of the gap between the saw blades 71) coincide with the size of the waveguide gap in any one position of the varying area (in an arbitrary X coordinate).

Therefore, if the optical waveguide film 10 is cut in that position along a direction orthogonal to the X-axis, the core portion is positioned at a center of the width of the optical waveguide in a resultant cut surface thereof, thereby restraining the core portion from becoming eccentric. As a result, it is possible to suppress occurrence of deviation of an optical axe and to produce an optical waveguide having reduced light loss.

Even if the optical waveguide film 10 has individual dimension variability, the individual variability can be absorbed by merely displacing the cutting position of the optical waveguide film 10 along the X-axis. In other words, a plurality of optical waveguides each having reduced light loss can be efficiently produced through a simple process even when the optical waveguide film 10 to be severed has individual dimension variability.

In this regard, assuming an instance where there exist M core portions in the optical waveguide film 10, the number of waveguide gaps is M−1. Accordingly, if M is an integer of 3 or more, there exist two or more waveguide gaps (side cladding portions 95). Thus, the optical waveguide film 10 can provide the advantageous effects mentioned above.

Further, in the case where two or more waveguide gaps exist, if the width of the optical waveguide to be cut coincides with one of the waveguide gaps, the same coincidence can be obtained with respect to the other waveguide gaps. This is because the resin material is substantially uniformly shrunken over entire portions thereof.

In other words, if it is confirmed that the size of at least one of the waveguide gaps coincides with the width of the optical waveguide to be severed from the optical waveguide film 10, the coincidence of the sizes of the other waveguide gaps with the width of the optical waveguide can be expected with high probability.

In the meantime, since the contour lines of each of the core portions 94A to 94H describe the curves defined by the functions mentioned above, there is a possibility that the contour lines may interfere with the cutting traces of the saw blades 71 depending on curvature of the curves. If this interference occurs, the side cladding portion of the optical waveguide obtained by cutting the optical waveguide film 10 is exposed to an outside thereof. Such an optical waveguide may possibly lower its functions.

In the present invention, the function $f_a(X)$ representing the Y coordinate of the contour line 1331 of the core portion 94B satisfies the afore-mentioned inequity expression (7), and the function $f_b(X)$ representing the Y coordinate of the contour line 1332 of the core portion 94B satisfies the afore-mentioned inequity expression (8). Thus, a position of each of the core portions on the XY plane is confined to a specified area defined by the afore-mentioned inequity expressions.

In this regard, both the right side of the equation (7) and the right side of the equation (8) are constant numbers. Therefore, the equations (7) and (8) mean that the area allotted to the core portion 94B is confined to a strip-shaped area parallel to the X-axis. As a result of this confinement, for example, the cutter lane 1325 and the cutter lane 1335 can be secured between the core portion 94B and the core portion 94A adjoining thereto and between the core portion 94B and the core portion 94C adjoining thereto.

Further, the cutter lanes 1325 and 1335 are strip-shaped areas parallel to the X-axis. Therefore, when the optical waveguide film 10 is severed using the multi-blade saw 7, interference of the cutting trace with the core portion 94B can be surely prevented by merely moving the multi-blade saw 7 relative to the optical waveguide film 10 in a direction parallel to the X-axis.

Furthermore, the widths of the cutter lanes 1325 and 1335 are set equal to or greater than a thickness of each of the saw blades 71 (namely, cutting width W mentioned above). The width of the cutter lane 1325 is equal to that of the cutter lane 1335. Such relationships remain the same in all the cutter lanes.

As set forth above, the ratio of the lengths obtained by deducting the thicknesses of the saw blades 71 (the widths of the cutter lanes) from the widths of the side cladding portions 95 is kept constant in an arbitrary X coordinate (in an entire of the optical waveguide film 10).

For this reason, when the optical waveguide film 10 is severed into the optical waveguides using the multi-blade saw 7, positions of the core portions are identical with each other on all the cut surfaces of the optical waveguides thus produced. Accordingly, use of the optical waveguide film 10 makes it possible to produce a plurality of optical waveguides each having an equal width at one time while restraining the core portions from becoming eccentric.

In this regard, each of the maximum magnification ratio Rmax and the minimum magnification ratio Rmin contained in the equations (7) and (8) is a magnification ratio of a pre-solidification dimension to a post-solidification dimension in a resin material constituting the optical waveguide film 10.

The magnification ratio can be calculated from a shrinkage ratio of the resin material (reduction ratio of dimension attributable to shrinkage). Although there are a number of shrinkage-ratio defining methods, no great difference in the shrinkage ratio exists between the shrinkage-ratio defining methods. Therefore, the shrinkage-ratio defining methods are not limitative.

In the present embodiment, the shrinkage ratio is, for example, defined by an equation: 1−(post-solidification dimension)/(pre-solidification dimension). If the pre-solidification dimension is assumed to be 100 and the post-solidification dimension is assumed to be 80, the shrinkage ratio is calculated by 1−(98/100) and is equal to 0.02 (2%). The magnification ratio of the pre-solidification dimension to the post-solidification dimension is 1.02, which value can be calculated by adding 1 to the shrinkage ratio.

As mentioned above, the shrinkage ratio of the resin material used in calculating the magnification ratio may possibly be increased or decreased depending on conditions such as the kind of the resin material, a production environment (temperature, humidity, etc.), a production time and a production quantity.

In reality, it is hard to artificially control the increase or decrease of the shrinkage ratio. Therefore, the respective optical waveguide films 10 must have individual dimension variability. In most cases, the dimensional variations caused by the individual variability should fall within a specified range. This range can be empirically or theoretically predicted with a certain degree of accuracy.

If upper and lower limit values of the magnification ratio are preliminarily set based on the prediction, it is possible to prevent the individual dimension variability from affecting qualities of the finally obtained optical waveguides even when the individual dimension variability of the optical waveguide film 10 occurs due to the increase or decrease of the shrinkage ratio.

In the equations (7) and (8), the maximum magnification ratio Rmax is used as the upper limit value of the magnification ratio and the minimum magnification ratio Rmin is used as the lower limit value of the magnification ratio. If the variations of the shrinkage ratio of the resin material is added thereto, all the core portions of each of the optical waveguides produced from the optical waveguide film 10 are surely prevented from becoming eccentric even when the optical waveguide film 10 has the individual dimension variability.

In this regard, the maximum magnification ratio Rmax and the minimum magnification ratio Rmin of the equations (7) and (8) are real numbers of 1 or more, but are set preferably in the range of 1 to 1.05, and more preferably in the range of about 1.01 to about 1.03. The maximum magnification ratio Rmax is set greater than the minimum magnification ratio Rmin, and a difference therebetween is preferably in the range of about 0.02 to 0.05.

Although the maximum magnification ratio Rmax may be a different value in each of the core portions 94A to 94H, it is set so as to have the same value in the present embodiment. Likewise, the minimum magnification ratio Rmin is set so as to have the same value in the present embodiment although it may be a different value in each of the core portions 94A to 94H.

In this regard, in the case where the material for the production of the optical waveguide film 10 is such a material as a resin material undergoing shrinkage when being solidified, the equations (7) and (8) each containing the maximum magnification ratio Rmax and the minimum magnification ratio Rmin are equations for defining a pre-solidification shape of each of the core portions 94A to 94H in a strict meaning.

Since change in a shape of the optical waveguide film 10 caused by the shrinkage of the resin material is quite insignificant, it can be deemed that a shape of each of the core portions 94A to 94H after solidification of the resin material is substantially the same as the pre-solidification shape thereof. In other words, the shape of each of the core portions 94A to 94H after solidification of the resin material can also be defined by the equations (7) and (8).

As mentioned above, the arrangement order N' in the equations (7) and (8) is an order of each of the core portions 94A to 94H arranged side by side so as to extend along the X-axis. Thus, the arrangement order N' has a different value in each of the core portions 94A to 94H.

Since the number of the core portions 94A to 94H is five in the present embodiment, the arrangement order N' of the core portion 94B is equal to an order reckoned from the core portion 94C whose arrangement order is zero. For example, the arrangement order N' of the core portion 94B becomes equal to 1 and the arrangement order N' of the core portion 94A gets equal to 2.

Further, the setting value P is a value equivalent to the width of each of the optical waveguides produced by severing the optical waveguide film 10 using the multi-blade saw 7. Therefore, the setting value P is a value equal to a distance between opposing surfaces of the mutually adjoining saw blades 71 of the multi-blade saw 7.

For example, the setting value P is in the range of about 200 to 10,000 μm. The cutting width W is a value equivalent to the cutting width of the cutting tool to be used in cutting the optical waveguide film 10, which is called "kerf". In the case where the multi-blade saw 7 is used as the cutting tool, the thickness of each of the saw blades 71 is equivalent to the cutting width W. For example, the cutting width W is in the range of about 10 to 500 μm.

Use of the equations (7) and (8) helps prevent an area occupied by each of the core portions 94A to 94H from interfering with an area occupied by each of the cutter lanes 1315 to 1365. This makes it possible to efficiently produce optical waveguides each having an equal width while restraining each of the core portions 94A to 94H from becoming eccentric.

In the equations (7) and (8), the shape of the contour line 1331 of the core portion 94B is represented by the function $f_a(X)$ and the shape of the contour line 1332 of the core portion 94B is represented by the function $f_b(X)$. The following description is directed to a case that the functions $f_a(X)$ and $f_b(X)$ are trigonometric functions.

In this case, the functions $f_a(X)$ and $f_b(X)$ are defined by the following equations (9-1) and (10-1):

$$f_a(X) = A \cos(2\pi X/L) + B - C/2 \quad (9\text{-}1); \text{ and}$$

$$f_b(X) = A \cos(2\pi X/L) + B + C/2 \quad (10\text{-}1),$$

where A, B, C and L are arbitrary real numbers, A denotes an amplitude, B signifies an offset amount, C refers to the width of the core portion 94B (core portion width), and L stands for a cycle in the above equations (9-1) and (10-1).

The shapes of the contour lines 1331 and 1332 of the core portion 94B are defined by the equations (9-1) and (10-1), respectively. Each of the contour lines 1331 and 1332 thus defined is shaped to describe a so-called "cosine curve". Further, A, B, C and L have the same values in the equations (9-1) and (10-1).

In this regard, the cycle L is a parameter equivalent to a "wavelength" in the cosine curve. Although the cycle L may be a different value in each of the core portions 94A to 94H, it is preferred that the cycle L of each of the core portions 94A to 94H is set so as to have the same value.

Further, the cycle L is properly set depending on a length of the optical waveguide assembly 1. For example, if the length of the optical waveguide assembly 1 is about 200 mm, the cycle L is preferably in the range if about 5 to 100 mm, and more preferably in the range of about 10 to 50 mm.

In contrast, the amplitude A and the offset amount B are parameters for defining a waveform of the cosine curve and a distance from the X-axis, respectively. The amplitude A and the offset amount B are set so as to have different values, respectively, in each of the core portions 94A to 94H.

The amplitude A is a parameter equivalent to a "wave height" in the cosine curve. The amplitude A is represented by the following equation (11):

$$A = (R_{max} - R_{min})(P+W)N'/2 \quad (11),$$

where N', P, W, Rmax and Rmin are the same as N', P, W, Rmax and Rmin of the equations (7) and (8).

The offset amount B is a parameter equivalent to the distance spaced apart from the X-axis of the cosine curve. The offset amount B is represented by the following equation (12):

$$B = (R_{max} + R_{min})(P+W)N'/2 \quad (12),$$

where N', P, W, Rmax and Rmin are the same as N', P, W, Rmax and Rmin of the equations (7) and (8).

Further, the core portion width C refers to the width of each of the core portions 94A to 94H. It is preferred that the core portion width C is set so as to have the same value in each of the core portions 94A to 94H. For example, the core portion width C is in the range of about 10 to 200 μm.

If the respective parameters are set as above, the core portions 94A to 94H do not interfere with one another, and the size of the waveguide gap (the width of the side cladding portion 95) continuously varies along the X-direction. This ensures independence of light propagating through each of the core portions 94A to 94H, thereby preventing occurrence of cross talk between the core portions 94A to 94H serving as channels.

Owing to the continuous variation of the size of the waveguide gap, the optical waveguide film 10 (the optical waveguide assembly of the present invention) can provide the advantageous effects set forth above.

In each of the core portions 94A to 94H having the aforementioned shapes, an inclination angle of each of tangential lines passing arbitrary points of an optical axis (path) thereof with respect to the X-axis (hereinafter just referred to as "inclination angle") is designed so as to continuously (smoothly) vary with respect to the X-axis.

Thanks to this feature, each of the core portions 94A to 94H has no heavily curved part having sharp (small) curvature. This makes it possible to suppress leakage of light which would otherwise occur in the curved part. As a result, each of the core portions 94A to 94H shows an enhanced light propagation property.

Specifically, the inclination angle is preferably 1° or smaller, more preferably in the range of 0 to 0.8°, and even more preferably in the range of 0.01 to 0.5°. Setting the inclination angle within the above-noted range makes it possible to minimize the leakage of light.

In addition, an incident angle of light on an incoming end surface and an exit angle of light on an outgoing end surface are prevented from becoming too small with respect to the X-axis. This makes it possible to improve connectivity between the optical waveguide, which is produced by severing the optical waveguide film 10, and a connection counterpart connected thereto, thereby reliably reducing optical connection loss therebetween.

In this regard, since the inclination angle depends on the above-mentioned parameters such as the cycle L and the amplitude A, it is preferred that these parameters are set depending on a desired range of the inclination angle.

The curvature of each of the core portions 94A to 94H shown in FIG. 25 and other drawings is exaggerated for the sake of easier understanding. In the actual optical waveguide film, the core portions 94A to 94H may not be seen inclined at a first glance even if they have large curvature.

In order to allow total reflection of light to occur on an interfacial surface between each of the core portions 94A to 94H and the cladding body 96, a refractive index difference therebetween needs to exist on the interfacial surface. The refractive index of each of the core portions 94A to 94H is greater than the refractive index of the cladding body 96.

The refractive index difference is not limited to a specific value, but is preferably 0.5% or more, and more preferably 0.8% or more. An upper limit value of the refractive index difference is not set to a specific value, but is preferably about 5.5%. If the refractive index difference is smaller than the lower limit value noted above, a light propagation effect is sometimes reduced. On the other hand, even if the refractive index difference is set greater than the upper limit value, the light propagation effect can no longer be expected to further increase.

In this regard, in the case where the refractive index of each of the core portions 94A to 94H is defined as $n_1$ and the refractive index of the cladding body 96 is defined as $n_2$, the refractive index difference is represented by the following equation (6):

$$\text{refractive index difference}(\%) = |n_1/n_2 - 1| \times 100 \qquad (6).$$

Further, across-sectional shape of each of the core portions 94A to 94H has a quadrangular shape such as a square shape or a rectangular shape.

Each of a width and height of the cross-sectional shape is not limited to a specific value, but is preferably in the range of about 1 to 200 μm, more preferably in the range of about 5 to 100 μm, and even more preferably in the range of about 10 to 60 μm.

Constituent materials of the core portions 94A to 94H and the cladding body 96 are not limited to specific kinds, as long as they can make the refractive index difference set forth above. More specifically, examples of the constituent materials include various kinds of resin materials such as an acryl-based resin, a methacryl-based resin, polycarbonate, polystyrene, epoxy resin, polyamide, polyimide, polybenzoxazole, polysilane, polysilazane and a cyclic olefin-based resin (e.g., a benzo cyclobutene-based resin or a norbornene-based resin), and the like.

In the present embodiment, the core portions 94A to 94H and the side cladding portions 95 of the core layer 93 are made of the same base material (base component). The refractive index difference between the core portions 94A to 94H and the side cladding portions 95 is developed by a difference between chemical structures of the constituent materials thereof.

In order to develop the refractive index difference due to the difference between chemical structures, it is preferred that a material whose refractive index is changed by being irradiated with an activated energy ray (actinic radiation) such as an ultraviolet ray or an electron ray (or by being additionally heated) is used as each of the constituent materials of the core portions 94A to 94H and the side cladding portions 95.

Examples of such a material with variable refractive index include a material whose chemical structures can be changed by breaking at least apart of bonds or removing at least a part of functional groups by being irradiated with the activated energy ray or heated.

Specifically, examples of a base resin of the material with variable refractive index include a silane-based resins such as polysilane (e.g., polymethyl phenyl silane) or polysilazane (e.g., perhydropolysilazane), the following resins (1) to (6) having functional groups in side chains or terminals of molecules (i.e., (1) an addition-type (co)polymer composed of molecules each obtained by addition (co)polymerization reaction between molecules of a norbornene-based monomer, (2) an addition-type copolymer composed of molecules each obtained by addition copolymerization reaction between the molecules of the norbornene-based monomer and molecules of ethylene or α-olefin, and (3) an addition-type copolymer composed of molecules each obtained by addition copolymerization reaction between the molecules of the norbornene-based monomer, molecules of non-conjugated diene, and, if needed, molecules of another monomer; and ring opening-type polymers such as (4) a ring opening-type norbornene-based (co)polymer or a (co)polymer obtained by hydrogenating, if needed, the ring opening-type norbornene-based (co)polymer, (5) a ring opening-type norbornene-based copolymer composed of molecules each obtained by ring opening copolymerization reaction between the molecules of the norbornene-based monomer and the molecules of the ethylene or α-olefin or a copolymer obtained by hydrogenating, if needed, the ring opening-type norbornene-based copolymer, and (6) a ring opening-type norbornene-based copolymer composed of molecules each obtained by ring opening copolymerization reaction between the molecules of the norbornene-based monomer and the molecules of the non-conjugated diene or another monomer or a copolymer obtained by hydrogenating, if needed, the ring opening-type norbornene-based copolymer).

Other examples of the base resin include an acryl-based resin and an epoxy-based resin, both of which can be obtained by polymerizing photo-curable monomers, and the like. In this regard, examples of such polymers include a random copolymer, a block copolymer, an alternating copolymer and the like.

It is particularly preferable to use norbornene-based polymers (resins) among them. These norbornene-based polymers can be obtained using various kinds of well known polymerizations such as ring opening metathesis polymerization (ROMP), a combination of ROMP and hydrogenation, polymerization via radicals or cations, polymerization using a cationic palladium polymerization initiator and polymerization using another polymerization initiator (e.g., a nickel polymerization initiator or another transition metal polymerization initiator).

On the other hand, the cladding layers 91 and 92 make up the cladding body 96 positioned below and above the core portions 94A to 94H. This configuration allows each of the core portions 94A to 94H to serve as a waveguide whose outer periphery is surrounded by the cladding body 96.

An average thickness of each of the cladding layers 91 and 92 is preferably about in the range of 0.1 to 1.5 times an average thickness of the core layer 93 (average height of the core portions 94A to 94H), and more preferably in the range of about 0.2 to 1.25 times the average thickness of the core layer 93.

Specifically, the average thickness of each of the cladding layers 91 and 92 is not limited to a specific value, but, in general, is preferably in the range of about 1 to 200 µm, more preferably in the range of about 5 to 100 µm, and even more preferably in the range of about 10 to 60 µm.

This enables each of the cladding layers 91 and 92 to reliably perform its function while preventing the optical waveguide film 10 from being unnecessarily increased in a size (thickness).

Further, as a constituent material of each of the cladding layers 91 and 92, it is possible to use, for example, the same material as the constituent material of the core layer 93 described above. In particular, it is preferable to use a norbornene-based polymer.

In this regard, in the present embodiment, it is possible to appropriately select different materials in light of the refractive index difference between the cladding layers 91 and 92 and the core layer 93 and to use them as the constituent material of the cladding layers 91 and 92 and the constituent material of the core layer 93. It is desirable if the materials thus selected are capable of generating a refractive index difference great enough to totally reflect light in borders between the core layer 93 and cladding layers 91 and 92.

This makes it possible to obtain a great enough refractive index difference in a thickness direction of the optical waveguide assembly 1, thereby restraining light from being leaked from each of the core portions 94A to 94H to the cladding layers 91 and 92. As a consequence, it is possible to suppress attenuation of light propagating through each of the core portions 94A to 94H.

From the viewpoint of the suppression of the light attenuation, it is preferable to enhance adhesion between the core layer 93 and the cladding layers 91 and 92. Therefore, the constituent material of each of the cladding layers 91 and 92 may be any material as long as it has a refractive index smaller than that of the constituent material of the core layer and provides enhanced adhesion with respect to the constituent material of the core layer 93.

While the optical waveguide area 11A has been described hereinabove, the same areas as the optical waveguide area 11A may be provided in a plural number in the core layer 93.

Further, in the optical waveguide film 10, as described above, the strip-shaped alignment patterns 12A and 12B are provided in both outer edges of the optical waveguide area 11A, respectively.

FIGS. 24(A) to 24(C) are views each showing a relationship between the core portions 94A to 94H and the alignment patterns 12A and 12B. FIG. 24(C) shows a portion of an upper surface of the core layer 93 of the optical waveguide film 10. FIG. 24(A) shows a cross section of the optical waveguide film 10 taken along the line S1-S1 in FIG. 24(C). FIG. 24(B) shows a cross section of the optical waveguide film 10 taken along the line S2-S2 in FIG. 24(C).

In this regard, the alignment pattern 12A includes a pair of parallel linear patterns 121A and 122A provided in a marginal portion outside the core portion 94A so as to extend along the X-direction.

On the other hand, the alignment pattern 12B includes a pair of parallel linear patterns 121B and 122B provided in a marginal portion outside the core portion 94H so as to extend along the X-direction.

The linear patterns 121A, 122A, 121B and 122B can be formed though the same process as used for the formation of the core portions 94A to 94H. In the case where a plurality of optical waveguide areas 11A are provided in the optical waveguide film 10, the alignment patterns 12A and 12B are arranged to divide the optical waveguide areas 11A and are used as markers when severing the optical waveguide areas 11A.

Further, a plurality of linear alignment marks 13A extending in the Y-direction are formed between the linear patterns 121A and 122A. The alignment marks 13A are arranged at an equal interval or specified intervals.

On the other hand, a plurality of linear alignment marks 13B extending in the Y-direction are formed between the linear patterns 121B and 122B. The alignment marks 13B are also arranged at an equal interval or specified intervals.

The alignment marks 13A and 13B can be formed though the same process as used for the formation of the core portions 94A to 94H.

The alignment marks 13A and 13B are used as indicia (reference marks) when the optical waveguide film 10 is cut along the direction orthogonal to the X-axis.

In the case where one attempts to cut the optical waveguide film 10, a position where the width of the optical waveguide to be cut coincides with the size of the waveguide gap may be found by visual estimation or measurement, and then the optical waveguide film 10 may be cut in the position thus found. However, use of the reference marks composed of the alignment marks 13A and 13B makes it possible to accurately cut the optical waveguide film 10. This makes it possible to reliably prevent each of the core portions 94A to 94H from becoming eccentric.

Further, the alignment marks 13A and 13B can be used as reference marks for grasping the size of the waveguide gap. In other words, it is possible to establish an unchanged constant relationship between the alignment marks 13A and 13B and the size of the waveguide gap by forming the alignment marks 13A and 13B within the same layer as the core portions 94A to 94H and by making the alignment marks 13A and 13B with the same resin material as the core portions 94A to 94H.

Therefore, even if the optical waveguide film 10 is cut based on the alignment marks 13A and 13B without having to perform any visual estimation or measurement but by merely specifying the kind of the resin material, the width of the optical waveguide to be severed can be matched with the size of the waveguide gap in the optical waveguide film 10 produced. As a result, it is possible to easily produce optical waveguides each having core portions with reduced eccentricity.

Figure 24:
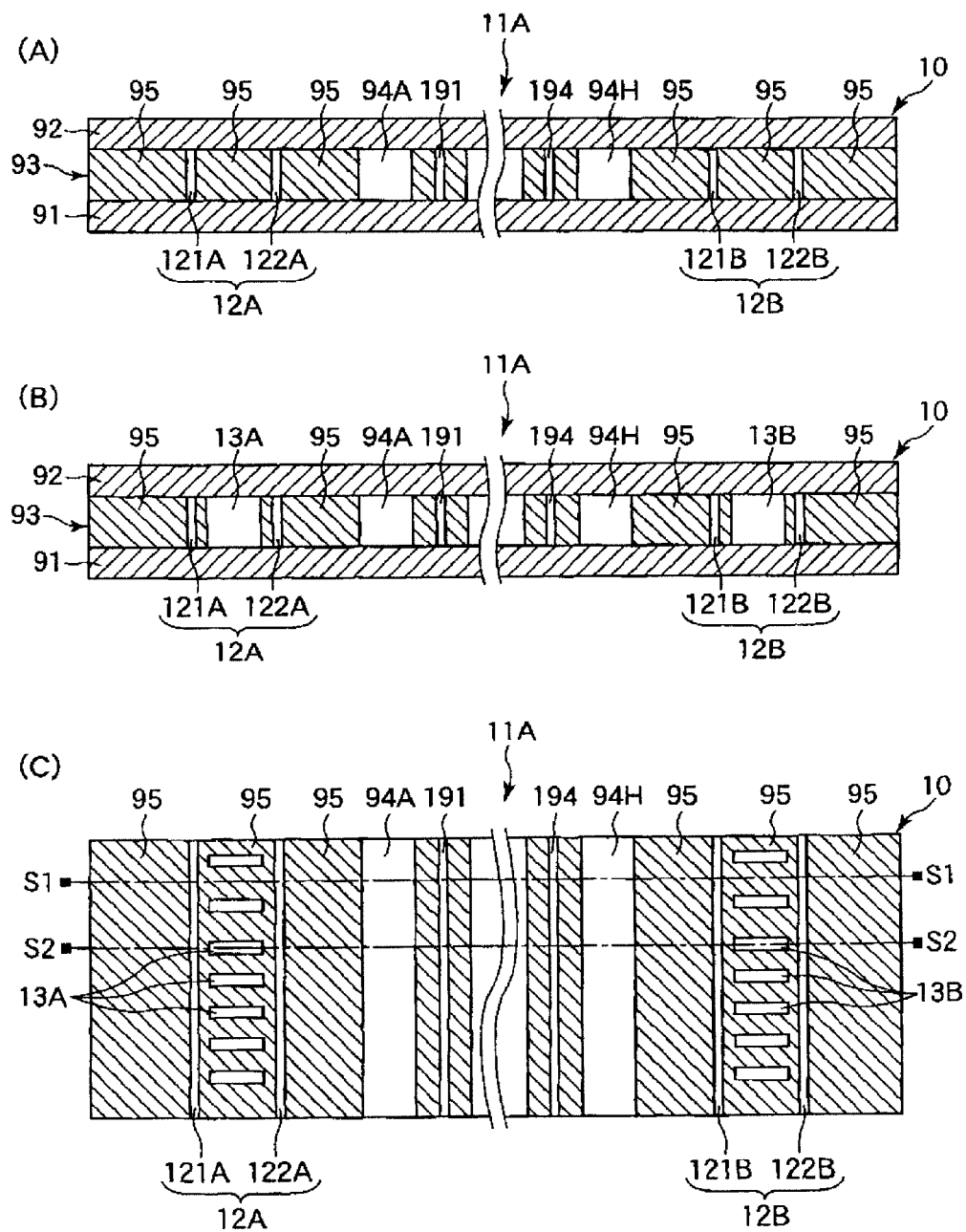
FIGS. 24(A) to 24(C) are views each showing a relationship between core portions and alignment patterns.

While the alignment marks 13A are separated from the linear patterns 121A and 122A and the alignment marks 13B are separated from the linear patterns 121B and 122B as shown in FIG. 24, the present invention is not limited thereto. For example, the alignment marks 13A may be contiguous to one or both of the linear patterns 121A and 122A and the alignment marks 13B may be contiguous to one or both of the linear patterns 121B and 122B.

Further, shrinkage between the alignment patterns 12A and 12B is measured. Based on the measurement result, it is possible to calculate a Y-direction shrinkage ratio of the optical waveguide film 10.

On the other hand, an X-direction shrinkage ratio of the optical waveguide film 10 can be deemed to have the same value as the Y-direction shrinkage ratio thus calculated. Alternatively, the shrinkage between the alignment marks 13A or the shrinkage between the alignment marks 13B may be measured and the X-direction shrinkage ratio of the optical waveguide film 10 may be calculated based on the measurement result.

In this regard, it is preferred that a test piece made of the same material as the constituent material of the optical waveguide film 10 is prepared before the production of the optical waveguide film 10 and that a shrinkage ratio of the resin material is preliminarily calculated in the same manner as mentioned above. This makes it possible to accurately find the maximum magnification ratio Rmax and the minimum magnification ratio Rmin used in the equations (7) and (8).

While the alignment marks 13A and 13B may be simple lines drawn along the Y-direction in a plan view, numbers or symbols may be added in the vicinity of the alignment marks 13A and 13B so that the user can identify the respective alignment marks 13A and 13B.

Further, alignment lines are formed between the core portions 94A to 94H. Specifically, as shown in FIG. 25, the optical waveguide film 10 includes an alignment line 191 provided between the core portions 94A and 94B, an alignment line 192 provided between the core portions 94B and 94C, an alignment line 193 provided between the core portions 94C and 94G and an alignment line 194 provided between the core portions 94G and 94H.

The alignment lines 191 to 194 can be formed through the same process as used for the formation of the core portions 94A to 94H (see FIG. 24).

Further, each of the alignment lines 191 to 194 is formed so as to extend along a center line interconnecting middle points of the waveguide gap (middle points of the side cladding portion 95).

Each of the alignment lines 191 to 194 always shows the middle points of the side cladding portion 95. Therefore, if the middle points are used as cutting start points on an end surface of the optical waveguide film 10 when severing the optical waveguide film 10 using the multi-blade saw 7, it is possible to easily produce optical waveguides having core portions with reduced eccentricity.

For example, if a size "m" of a gap between the mutually adjoining alignment lines coincides with the width of optical waveguide to be cut in positions of cutting lines CL1 and CL2 shown in FIG. 25, a cutting operation may be started from intersection points of the cutting lines CL1 and CL2 and the alignment lines 191 to 194. In this regard, such a cutting method will be described below.

Figure 26:
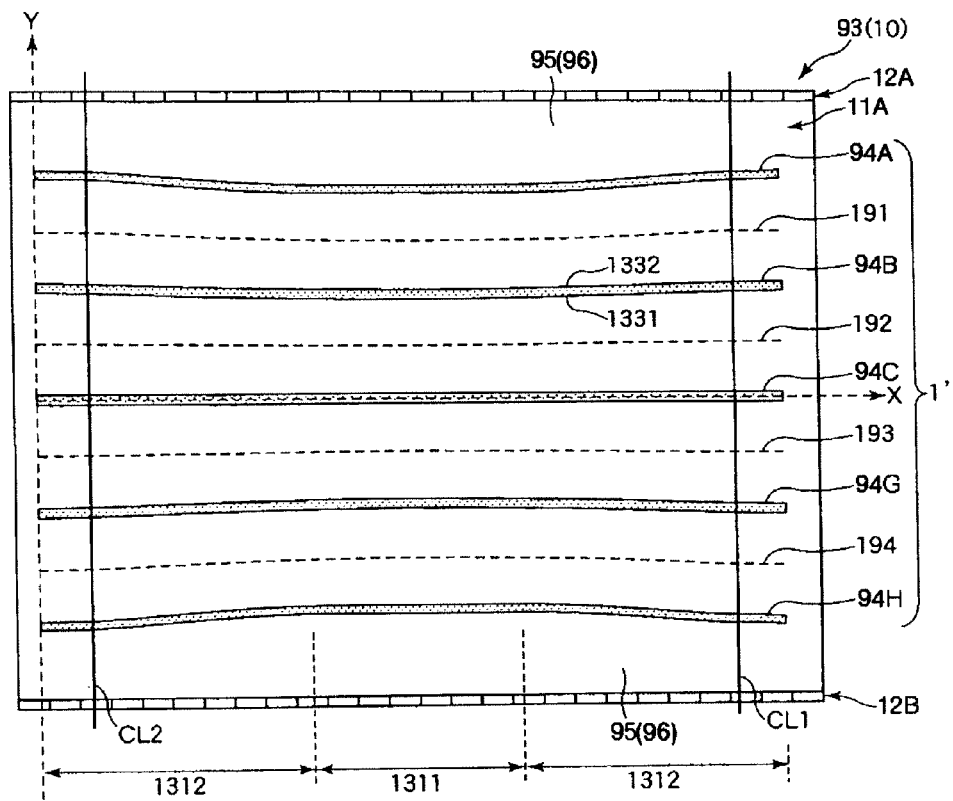
FIG. 26 is a view showing another configuration example of the core portions that can be formed in the optical waveguide area.

FIG. 26 is a view showing another configuration example of the core portions 94A to 94H that can be formed in the optical waveguide area 11A. An optical waveguide assembly 1' shown in FIG. 26 is the same as the optical waveguide assembly 1 shown in FIG. 25 except a plan-view shape of each of the core portions 94A to 94H.

A longitudinal part of each of the core portions 94A to 94H shown in FIG. 26 has a rectilinear shape parallel to the X-axis. In other words, each of the core portions 94A to 94H shown in FIG. 26 is divided into a rectilinear section 1311 and a pair of curved sections 1312 describing the cosine curve set forth above.

The optical waveguide assembly 1' having such a configuration can provide the same advantageous effects as provided by the afore-mentioned optical waveguide assembly 1.

Further, the curved sections 1312 may preferably be provided in at least opposite end portions of the optical waveguide assembly 1'. This makes it possible for the curved sections 1312 to suppress optical connection loss which would be caused when connecting to a connection counterpart. On the other hand, the rectilinear section 1311 having no curved part is capable of minimizing leakage of light to the cladding portion 96. As a result, the optical waveguide produced from the optical waveguide assembly 1' can further enhance a quality of optical communication.

Figure 27:
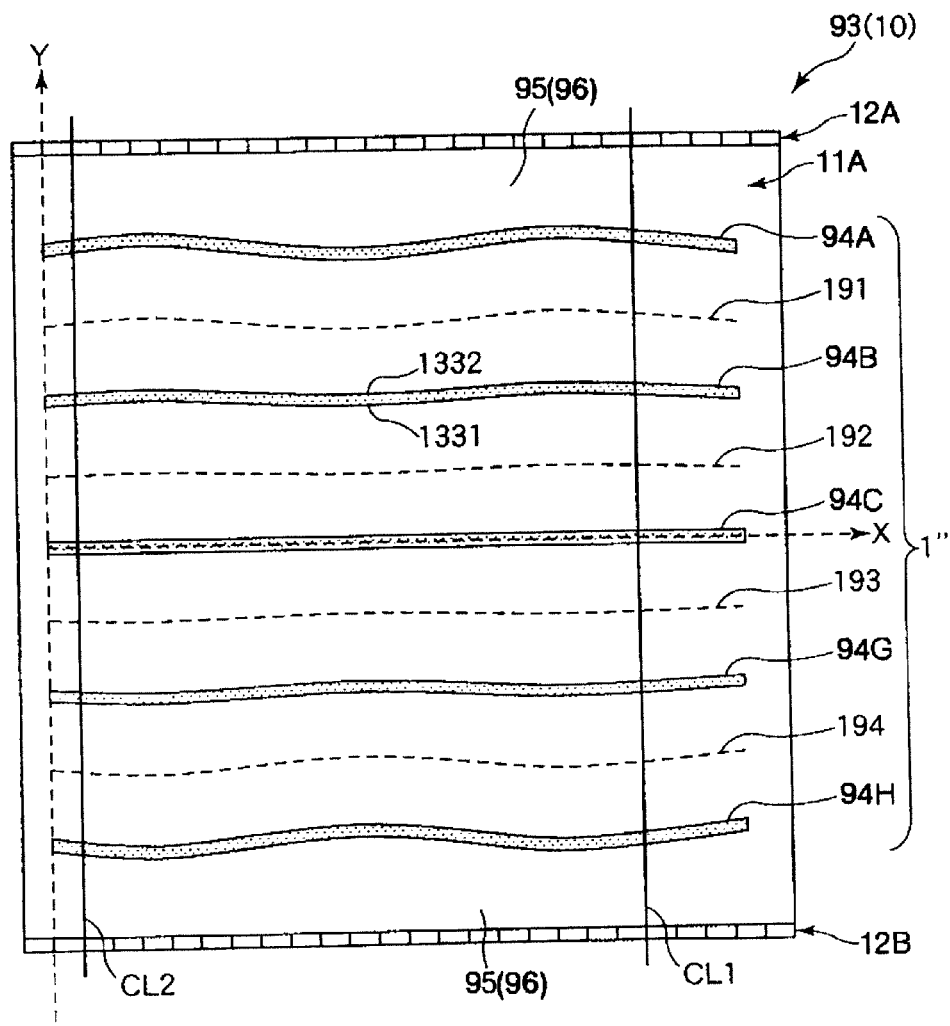
FIG. 27 is a view showing a further configuration example of the core portions that can be formed in the optical waveguide area.

On the other hand, FIG. 27 is a view showing a further configuration example of the core portions 94A to 94H that can be formed in the optical waveguide area 11A. The optical waveguide assembly 1" shown in FIG. 27 is the same as the optical waveguide assembly 1 shown in FIG. 25 except a plan-view shape of each of the core portions 94A to 94H.

In the optical waveguide assembly 1" shown in FIG. 27, a left end of each of the core portions 94A to 94H used as a starting point of the X-axis coincides with a point corresponding to a "valley bottom" of each of the curved sections. On the other hand, in the case of the optical waveguide assembly 1 shown in FIG. 25, the left end of each of the core portions 94A to 94H used as the starting point of the X-axis coincides with a point corresponding to a "ridge top" of each of the curved sections. This is a differing point between the optical waveguide assembly 1 and the optical waveguide assembly 1".

In other words, the optical waveguide assembly 1" shown in FIG. 27 is the same as the optical waveguide assembly 1 shown in FIG. 25 except that functions representing the shapes of the contour lines of each of the core portions 94A to 94H are defined by the following equations (9-3) and (10-3).

The following equation (9-3) represents the shape of the contour line 1331 of the core portion 94B of the optical waveguide assembly 1" shown in FIG. 27, while the following equation (10-3) represents the shape of the contour line 1332 of the core portion 94B:

$$f_a(X) = A\cos(2\pi X/L) + B - C/2 \quad (9\text{-}3); \text{ and}$$

$$f_b(X) = A\cos(2\pi X/L) + B + C/2 \quad (10\text{-}3),$$

where A, B, C and L are arbitrary real numbers, A denotes an amplitude, B signifies an offset amount, C refers to the width of the core portion 94B, and L stands for a cycle in the above equations (9-3) and (10-3).

The shapes of the contour lines 1331 and 1332 of the core portion 94B are defined by the equations (9-3) and (10-3), respectively. Each of the contour lines 1331 and 1332 thus defined is shaped to describe a so-called "cosine curve". In this regard, A, B, C and L have the same values in the equations (9-3) and (10-3). Further, A, B, C and L are the same parameters as A, B, C and L used in the equations (9-1) and (10-1).

In this regard, the optical waveguide assembly 1" is substantially equivalent to parallel translation of the afore-mentioned optical waveguide assembly 1, thereby providing the same advantageous effects as provided by the afore-mentioned optical waveguide assembly 1.

The optical waveguide assembly 1' and the optical waveguide assembly 1" are capable of providing the same advantageous effects as provided by the afore-mentioned optical waveguide assembly 1.

Further, although not shown in the drawings, the functions $f_a(X)$ and $f_b(X)$ may be sine curves defined by the following equations (9-2) and (10-2), respectively:

$$f_a(x) = A\sin(2\pi X/L) + B - C/2 \quad (9\text{-}2); \text{ and}$$

$$f_b(X) = A\sin(2\pi X/L) + B + C/2 \quad (10\text{-}2),$$

where A, B, C and L are arbitrary real numbers, A denotes an amplitude, B signifies an offset amount, C refers to the width of the core portion 94B, and L stands for a cycle in the above equations (9-2) and (10-2).

The shapes of the contour lines 1331 and 1332 of the core portion 94B are defined by the equations (9-2) and (10-2), respectively. In this regard, A, B, C and L have the same values in the equations (9-2) and (10-2). Further, A, B, C and L are the same parameters as A, B, C and L used in the equations (9-1) and (10-1).

The optical waveguide assembly provided with the core portions each having the shape defined by the "sine curve" is substantially equivalent to parallel translation of the optical waveguide assembly provided with the core portions each having the shape defined by the "cosine curve", such as the optical waveguide assembly 1 or the optical waveguide assembly 1", thereby providing the same advantageous effects as provided by the afore-mentioned optical waveguide assembly 1 and the optical waveguide assembly 1".

(Production Method of Optical Waveguide Assembly)

The optical waveguide assembly having such a configuration can be produced by the same method as used for the production of the optical waveguide film.

(Production Method of Optical Waveguide)

Next, description will be made on a method of producing a plurality of optical waveguides 20 by severing the optical waveguide film 10. The following description is directed to a case that the multi-blade saw 7 is used as a cutting tool for cutting the optical waveguide film 10.

Figure 29:
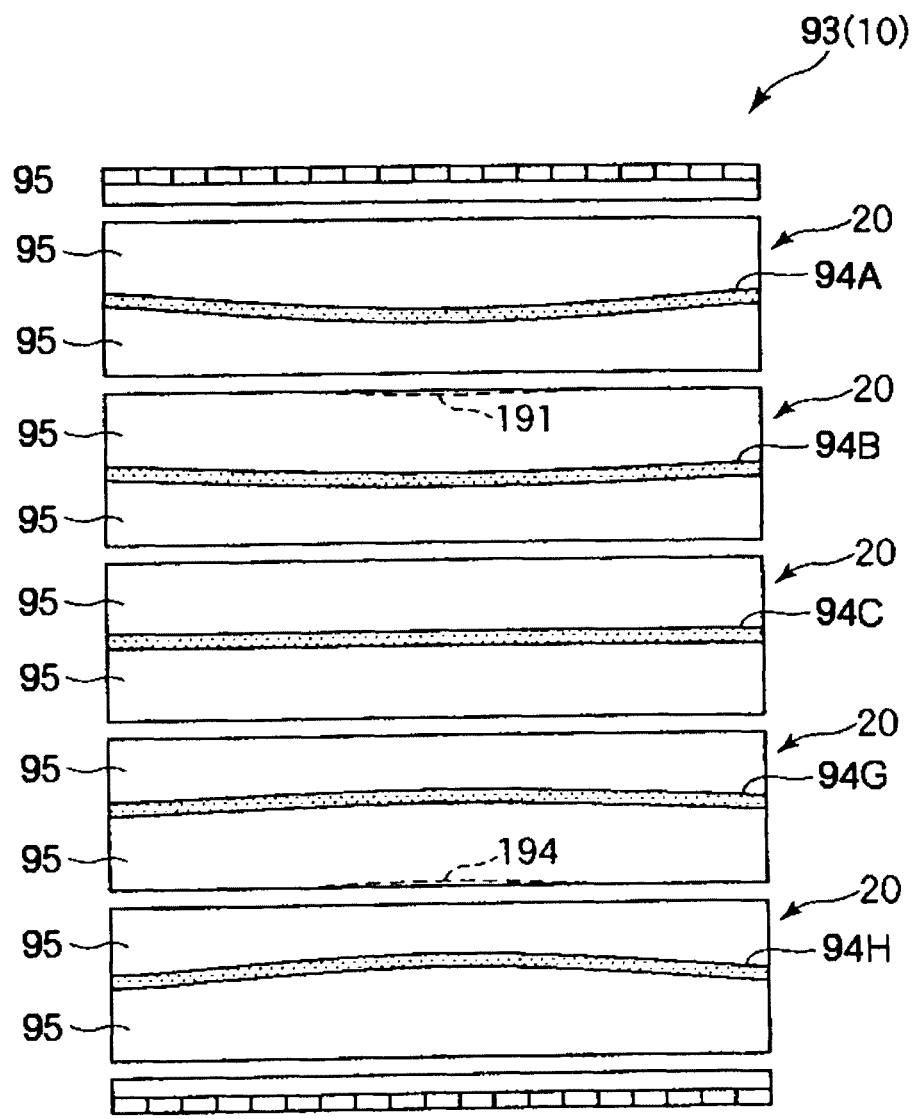
FIG. 29 is a view illustrating a method of producing a plurality of optical waveguides by severing the optical waveguide film shown in FIG. 25.

FIGS. 28(a), 28(b) and 29 are views each illustrating the method of producing the plurality of optical waveguides by severing the optical waveguide film shown in FIG. 25.

First, positions where the width of the optical waveguide 20 to be produced coincides with the size of the waveguide gap (the width of the side cladding portion 95) are specified in the optical waveguide assembly 1 of the optical waveguide film 10 by visual estimation or measurement. Description will be made herein on an exemplary case that the coinciding positions include a position indicated by the cutting line CL1 in FIG. 25 and a position indicated by the cutting line CL2 in FIG. 25.

Then, the optical waveguide film 10 is cut along the cutting lines CL1 and CL2 as illustrated in FIG. 28(a). A cut piece existing at a right side of the cutting line CL1 and a cut piece existing at a left side of the cutting line CL2 are useless.

Subsequently, a size of a gap between the saw blades 71 of the multi-blade saw 7 is adjusted so that the width of the optical waveguide 20 to be produced coincide with the size of the gap between the mutually adjoining saw blades 71 (a distance between opposing surfaces of the saw blades 71). Once the size of the gap between the saw blades 71 is adjusted, there is no need to change the size of the gap between the saw blades 71 unless the width of the optical waveguide 20 is changed.

The optical waveguide film 10 and the multi-blade saw 7 are aligned so that the saw blades 71 can be positioned at intersection points Q of the cutting line CL1 and the alignment lines 191 to 194.

Since the width of the optical waveguide 20 to be produced coincides with the size of the waveguide gap and the size of the gap between the mutually adjoining saw blades 71 of the multi-blade saw 7, it is a matter of course that a size of a gap between the alignment lines 191 to 194 as middle lines of the waveguide gaps coincides with the size of the gap between the saw blades 71.

Therefore, only if one of the saw blades 71 is aligned with one of the intersection points Q, alignment between the remaining intersection points Q and the remaining saw blades 71 occurs in the course of nature. This makes it possible to perform the position alignment with ease.

Then, the optical waveguide film 10 is cut using the multi-blade saw 7. The respective saw blades 71 begin to cut the optical waveguide film 10 from the intersection points Q of the cutting line CL1 and the alignment lines 191 to 194 while moving in a direction parallel to the A-axis. As a result, the optical waveguide film 10 is severed into a plurality of pieces as illustrated in FIG. 29, thereby producing a plurality of optical waveguides 20 at one time.

With the optical waveguides 20 thus produced, the core portions 94A to 94H are curved in middle areas of the optical waveguides 20 and are eccentric with respect to the widths of the optical waveguides 20, respectively. On the other hand, in opposite end areas of the optical waveguides 20, end surfaces of the core portions 94A to 94H are exposed at centers of the widths of the optical waveguides 20.

With the optical waveguides 20 each having such a configuration, light transmission properties thereof are hardly affected even if the core portions 94A to 94H are curved in the middle areas of the optical waveguides 20. On the other hand, if the core portions 94A to 94H are eccentrically positioned in the end areas of the optical waveguides 20, light loss occurs. This may possibly impair connectivity of each of the optical waveguides 20 with respect to a connection counterpart.

However, the optical waveguides 20 shown in FIG. 29 show reduced light loss because the eccentricity of the core portions 94A to 94H is suppressed in the end areas of the optical waveguides 20.

Further, since the saw blades 71 of the multi-blade saw 7 suffer from individual thickness variability, cutting widths may possibly vary from blade to blade. As mentioned above, the optical waveguide film 10 is produced in light of the individual dimension variability thereof. Therefore, if the individual thickness variability of the saw blades 71 falls within the individual dimension variability of the optical waveguide film 10, it is possible to absorb the individual thickness variability of the saw blades 71.

Even when cutting an optical waveguide film 10 having unknown individual dimension variability, the cutting method mentioned above does not entail cumbersome work of measuring the individual dimension variability on a case-by-case basis and adjusting the size of the gap between the saw blades 71 in conformity with the individual dimension variability thus measured. Accordingly, it is possible to efficiently produce a plurality of optical waveguides 20 each having reduced eccentricity of the core portions.

In this regard, in FIGS. 28 and 29, there is illustrated an exemplary case that the multi-blade saw 7 provided with six saw blades 71 is used in dicing the optical waveguide film 10 into five optical waveguides 20. Alternatively, the optical waveguide film 10 may be cut using a multi-blade saw having less than six saw blades (e.g., one or two saw blades) while displacing the saw blades in the Y-direction at a pitch matching the width of the optical waveguide 20 to be produced.

In this case, the optical waveguide film 10 can be cut without having to change the displacement pitch of the saw blades 71 according to the individual dimension variability of the optical waveguide film 10, namely by fixing the displacement pitch at one value. As a result, it is possible to efficiently produce a plurality of optical waveguides 20 each having reduced eccentricity of the core portions but with no involvement of cumbersome works.

(Structure of Laminated Type Optical Waveguide Film)

Figure 30:
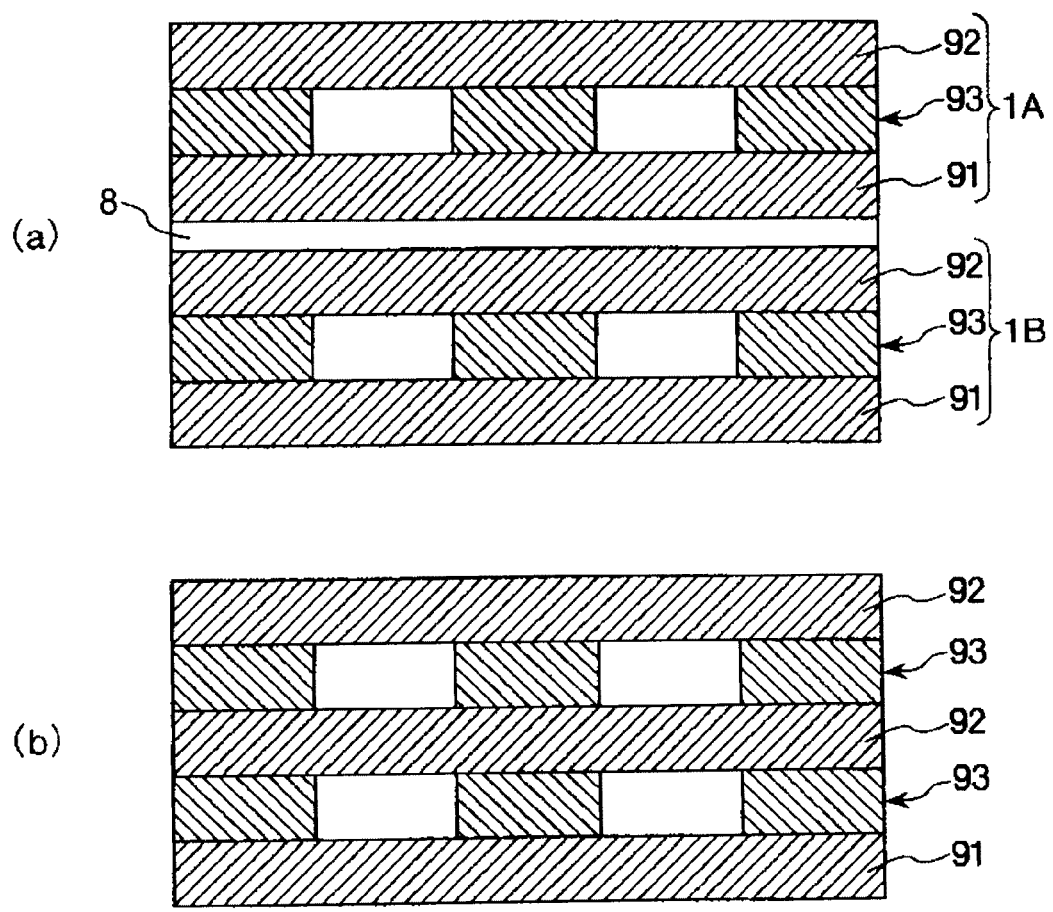
FIGS. 30(a) and 30(b) are section views each showing a schematic structure of a laminated type optical waveguide film.

FIGS. 30(a) and 30(b) are section views each showing a schematic structure of a laminated type optical waveguide film.

The laminated type optical waveguide film shown in FIG. 30(a) has a structure in which first and second optical waveguide assemblies 1A and 1B each having the same structure as the afore-mentioned optical waveguide film 10 (optical waveguide assembly) are laminated through an adhesive layer 8. A production method of each of the first and second optical waveguide assemblies 1A and 1B is the same as the production method of the optical waveguide assembly 1.

Further, the laminated type optical waveguide film shown in FIG. 30(b) has a structure in which a cladding layer (lower cladding layer) 91, a core layer (lower core layer) 93, a cladding layer (middle cladding layer) 92, a core layer (upper core layer) 93 and a cladding layer (upper cladding layer) 92 are laminated in the named order. Thus, the laminated type optical waveguide film shown in FIG. 30B has a structure in which two optical waveguides are laminated one above the other.

A laminated structure including the lower cladding layer 91, the lower core layer 93 and the middle cladding layer 92 is formed by the same method as used for the production of the optical waveguide assembly 1. Thereafter, the upper core layer 93 and the upper cladding layer 92 are formed on the laminated structure through the same process as used for the formation of the core layer 93 and the cladding layer 92 of the optical waveguide assembly 1.

The laminated type optical waveguide film thus obtained is severed into a plurality of optical waveguides in the same manner as mentioned above. Consequently, it is possible to efficiently produce a plurality of laminated type optical waveguides each having reduced eccentricity of the core portions.

<Second Embodiment of Optical Waveguide Assembly>

Next, description will be made on a second embodiment of the optical waveguide assembly according to the present invention.

(Structure of Optical Waveguide Assembly)

Figure 31:
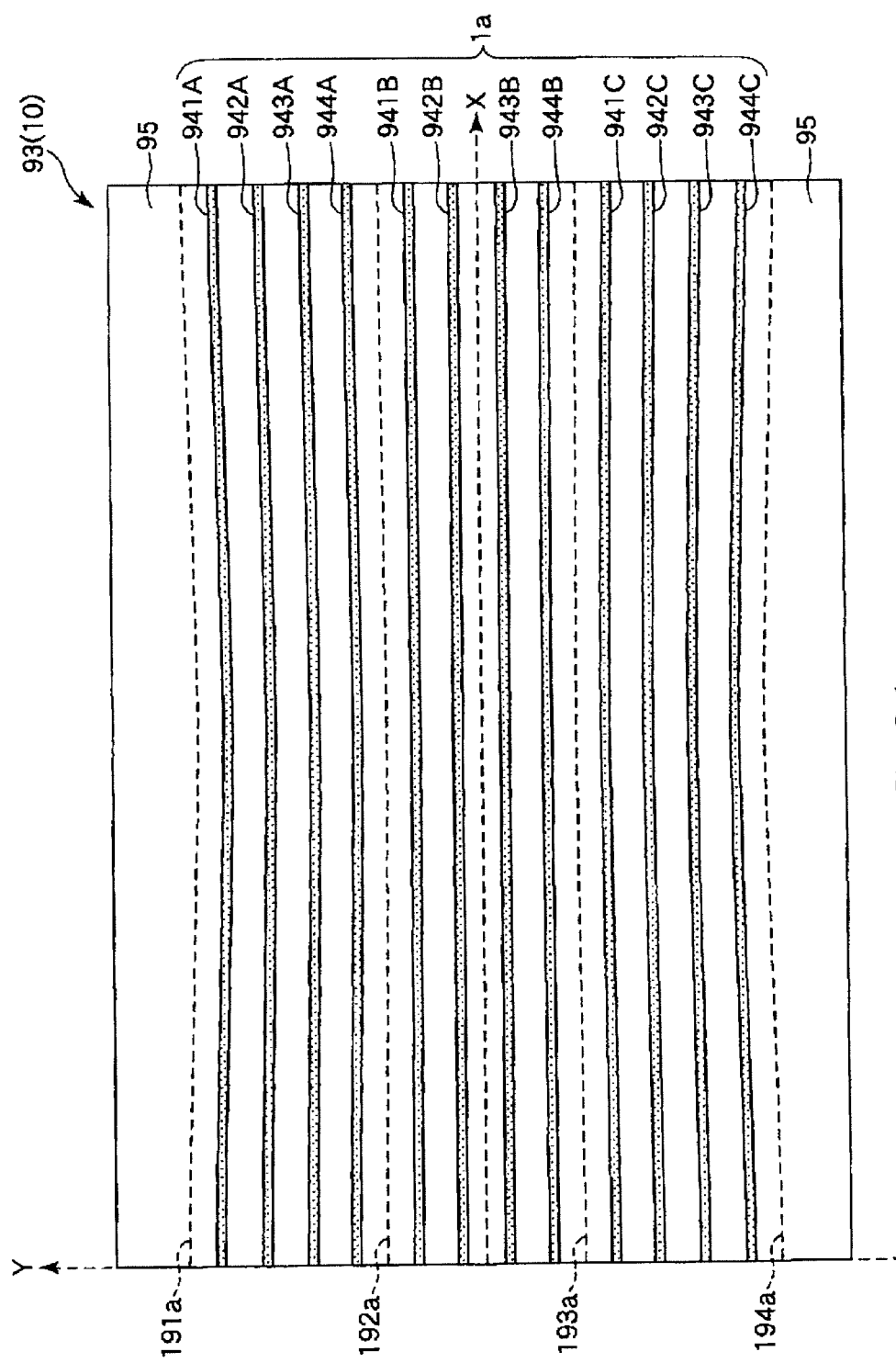
FIG. 31 is a schematic plan view of a core layer showing a second embodiment of an optical waveguide assembly according to the present invention.

FIG. 31 is a schematic plan view of a core layer showing the second embodiment of the optical waveguide assembly according to the present invention.

Hereinafter, the second embodiment will be described with emphasis placed on points differing from the first embodiment. No description will be made on the same points.

The present embodiment remains the same as the first embodiment except an arrangement pattern of the cutter lanes.

The optical waveguide film 10 (optical waveguide assembly 1a) shown in FIG. 31 includes twelve core portions 941A, 942A, 943A, 944A, 941B, 942B, 943B, 944B, 941C, 942C, 943C and 944C arranged side by side so as to extend along the X-axis.

Further, while the cutter lanes are provided between all the mutually-adjoining core portions in the first embodiment, the optical waveguide assembly 1a of the present embodiment includes four cutter lanes provided one in every four core portions. Alignment lines 191a, 192a, 193a and 194a are provided in the side cladding portions 95 having the cutter lanes. The core portions 941A to 944C are divided into three core portion bundles by the alignment lines 191a, 192a, 193a and 194a.

Since the optical waveguide assembly 1a includes four cutter lanes provided one in every four core portions, a plurality of multichannel optical waveguides each having four core portions can be produced at one time with no involvement of cumbersome works even if the optical waveguide assembly 1a has unknown individual dimension variability when cutting the optical waveguide assembly 1a using the multi-blade saw 7.

Further, in the optical waveguide assembly 1a, the width of the side cladding portion 95 varies continuously along the X-direction. Despite such variation, a ratio of lengths obtained by deducting the widths of the cutter lanes from the widths of the side cladding portions 95 is kept constant in an arbitrary X coordinate. For this reason, the width of the multichannel optical waveguide to be cut coincides with a size of a gap between the core portion bundles in a certain X-direction position.

In this regard, the size of the gap between the core portion bundles may be replaced by a size of a gap between the mutually-adjoining alignment lines. Therefore, if the optical waveguide assembly 1a is cut in the coinciding position along a direction orthogonal to the X-axis, the four core portions are arranged on a cut surface of the multichannel optical waveguide to be cut with no eccentricity. As a result, it is possible to produce a plurality of multichannel optical waveguides each having suppressed deviation of optical axes and reduced light loss.

In the present embodiment, the core portion bundle having the four core portions may be regarded as one thick core portion. Contour lines of this thick core portion can be defined by functions satisfying the equations (7) and (8) used in the first embodiment.

The equations (9-1) and (10-1), the equations (9-2) and (10-2) or the equations (9-3) and (10-3) may be applied to the functions for defining the shapes of the contour lines, respectively.

With the present invention described above, the cladding portions are preliminarily provided with the cutter lanes each having the width wider than the cutting width of the cutting tool. A ratio of lengths obtained by deducting the widths of the cutter lanes from the widths of the side cladding portions is kept constant in an arbitrary X coordinate. The optical waveguide assembly 1a has a varying area where the lengths (the widths of the side cladding portions) continuously vary.

Thanks to this feature, even if the optical waveguide assembly suffers from individual dimension variability, it is possible to efficiently produce a plurality of optical waveguides while suppressing occurrence of eccentricity in the end portions thereof. Use of such an optical waveguide assembly makes it possible to produce optical waveguides capable of reducing the light loss caused due to the eccentricity of the core portions and enhancing the quality of optical communication.

In addition, since there is no need to, when cutting the optical waveguide assembly, change the cutting pitch on a case-by-case basis depending on the dimension of the optical waveguide assembly, it is possible to efficiently cut and dice the optical waveguide assembly having individual dimension variability using a multi-blade saw whose cutting pitch is fixed to one value.

(Production Method of Optical Waveguide Assembly)

The optical waveguide assembly having such a configuration can be produced by the same method as used for the production of the optical waveguide film.

While the optical waveguide assembly of the present invention has been described hereinabove with reference to the embodiments shown in the drawings, the present invention is not limited thereto. The configurations of the respective parts may be substituted by or added with other arbitrary configurations having the equivalent functions.

For example, although the alignment pattern 12A is composed of the alignment marks 13A and the linear patterns 121A and 122A in the foregoing embodiments, the present invention is not limited thereto. The pattern representing the alignment marks may be completely separated from the linear patterns.

<Optical Wiring Line, Optical/Electrical Combination Substrate and Electronic Device>

The optical waveguide film (core layer) described above is cut in a specified position when in use to thereby obtain the plurality of optical waveguides. An optical wiring line can be formed by mounting optical elements (e.g., light-emitting elements or light-receiving elements) to the optical waveguide in specified positions. In other words, the optical waveguide of the present invention can find its application in, e.g., optical wiring lines for optical communication.

In addition, an optical/electrical combination substrate having an electrical wiring line and an optical wiring line can be produced by forming conductive layers on the optical waveguide.

Similarly, an optical/electrical combination substrate also can be produced by mounting the optical wiring line provided with the optical waveguide of the present invention (that is, the optical wiring line of the present invention) on a substrate together with a conventional electrical wiring line.

In such an optical/electrical combination substrate (the optical/electrical combination substrate of the present invention), optical signals transmitted through the optical wiring line (the core portions of the optical waveguide) are converted to electrical signals by a photoelectric conversion device, and then the electrical signals are transferred to the electrical wiring line. The optical wiring line can transfer information in a larger volume and at a higher speed than a conventional electrical wiring line.

Accordingly, if the optical/electrical combination substrate is applied to, e.g., a bus interconnecting an operation device such as a CPU or an LSI and a storage device such as a RAM, it becomes possible to enhance overall system performance and to suppress generation of electromagnetic noises.

In this regard, it is thinkable to mount the optical/electrical combination substrate to electronic devices for transferring a large volume of data at a high speed, such as cellular phones, game machines, personal computers, television sets and home servers. The electronic device provided with the optical/electrical combination substrate (the electronic device of the present invention) is superior in an internal information processing speed and can deliver high performance.

In other words, if the optical waveguide film is cut and used in the electronic devices such as cellular phones and computers, it is possible to provide electronic devices having superior data transmission performance.

With the present invention described above, it is possible, through the use of the optical waveguide capable of making optical communication in a high quality, to provide an optical wiring line, an optical/electrical combination substrate and an electronic device, all of which are superior in performance (high in reliability).

Further, with the present invention, it is also possible, through the use of the optical waveguide produced from the optical waveguide assembly and capable of making optical communication in a high quality, to provide an optical wiring line, an optical/electrical combination substrate and an electronic device, all of which are high in reliability.

Examples

Next, the present invention will be described in detail based Example. However, the present invention is not limited to Example.

Figure 32:
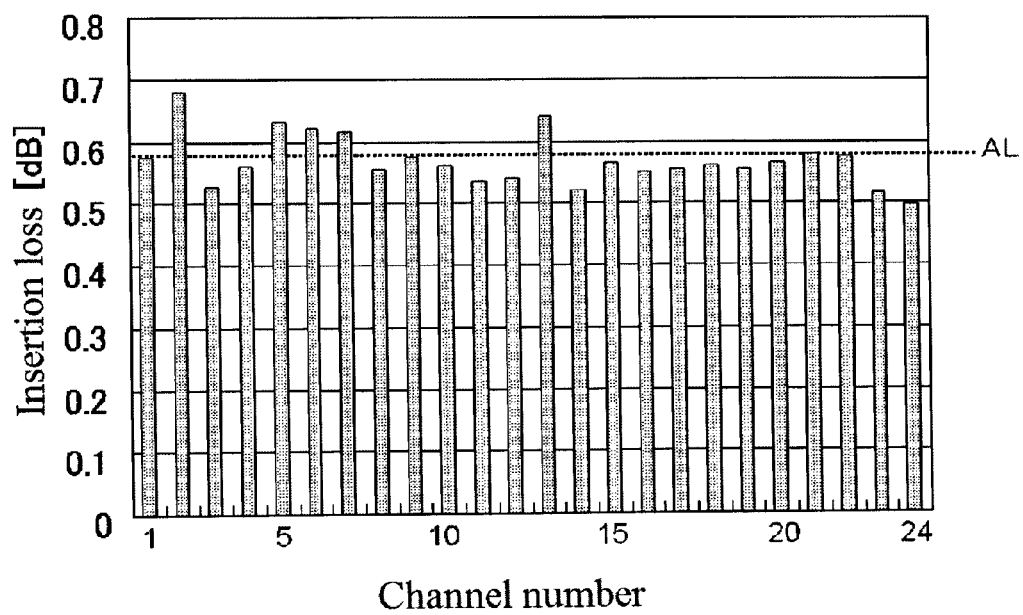
FIG. 32 is a graph representing a measurement result of insertion loss for Example of an optical waveguide film having twenty four core portions (channels).

FIG. 32 is a graph representing a measurement result of insertion loss (IL) for Example of an optical waveguide film 10 (optical waveguide pattern) having twenty four core portions (channels). This graph shows measurement values of insertion loss of the twenty four core portions. The first and twenty fourth core portions are arranged at Y-direction outermost positions. A configuration of the core portions of Example is as follows.

Width of core portion: 40 μm.
Cycle of waveguide gap in X-direction: 34 mm.
Total length in X-direction: two cycles (=68 mm).
Minimum value of waveguide gap: 123.7 μm.
Maximum value of waveguide gap: 125.8 μm.

According to the measurement result of insertion loss in Example, an arithmetic mean value of insertion loss was about 0.58 dB and an error (standard deviation) of insertion loss σ was in the range of about 0.02 to 0.03 dB. Thus, it was confirmed that little difference in insertion loss exists between the Y-direction outer core portions and the central core portions.

The dot line AL in the graph indicates an arithmetic mean value of insertion loss of an optical waveguide pattern including twenty four rectilinear core portions arranged side by side (where a size of a waveguide gap is 123.125 μm and a width of each of the core portions is 40 μm).

A method of producing the optical waveguide film of the Example will now be described. First, an Avatrel (registered trademark) 2000P solution (available from Promerus, LLC, located in Brecksville, Ohio, U.S.A.) was poured on a glass substrate set to an angle of 4" and spread in a substantially uniform thickness using a spin coater to form a layer having 1 μm in a wet thickness.

Then, the glass substrate was placed on a hot plate and heated for ten minutes at 100° C., after which the layer was irradiated with an ultraviolet ray without a photomask (irradiation level: 400 mJ/cm$^2$). Subsequently, the layer was cured by heating it for fifteen minutes at 100° C. and then for one hour at 160° C.

Next, a varnish solution as a core layer forming material was poured on a surface of the cured layer and spread in a substantially uniform thickness using a doctor blade to form a liquid coating film having 70 μm in a wet thickness. Thereafter, the coated glass substrate was kept on a ventilated level table one night to evaporate solvent from the liquid coating film, thereby forming a substantially dry solid film.

The next day, the solid film made from the varnish solution was irradiated with an ultraviolet ray having a wavelength of 365 nm through a photomask (irradiation level: 3,000 mJ). The solid film was aged for thirty minutes at room temperature, after which it was heated for thirty minutes at 85° C. and then for sixty minutes at 150° C. An optical waveguide pattern (core portions) could be observed at the time when the solid film was heated for thirty minutes at 85° C.

Then, an Avatrel 2000P solution was poured on a surface of the solid film (cured layer made from the varnish solution) and was spread in a substantially uniform thickness using a spin coater to form a layer having 1 μm in a wet thickness. The glass substrate was placed on a hot plate and heated for ten minutes at 100° C., after which the layer was irradiated with an ultraviolet ray without a photomask (irradiation level: 400 mJ/cm$^2$).

Subsequently, the layer was cured by heating it for fifteen minutes at 110° C. and then for one hour at 160° C. The above optical waveguide pattern was observed, but the cured layer (upper cladding layer) became brown.

The afore-mentioned varnish solution contains a matrix polymer, a norbornene-based monomer, a procatalyst, a acid generator, an arbitrary anti-oxidizing agent, and a solvent. Since the varnish solution contains a photosensitive material, it was prepared under a yellow light.

A procatalyst (Pd(OAc)$_2$(P(Cy)$_3$)$_2$) and a copolymer are contained in the varnish solution. The procatalyst was prepared in the following manner. A suspension solution with red-brown color containing Pd (OAc)$_2$ (5.00 g, 22.3 mol) and CH$_2$Cl$_2$ (30 mL) was stirred at −78° C. in a dual mouth round-bottom flask mounted with a funnel.

A CH$_2$Cl$_2$ solution (30 mL) containing P(Cy)$_3$ (13.12 mL, 44.6 mol) was put into the funnel and then dripped to the stirred suspension solution for fifteen minutes. As a result, the color of the suspension solution was gradually changed from red-brown to yellow. Then, the suspension solution was stirred for one hour at −78° C., after which it was heated up to a room temperature and further stirred for two hours. Thereafter, the suspension solution was diluted with hexane (20 mL).

A yellow solid thus obtained was filtered in the air, washed with pentane (5×10 mL) and dried in a vacuum. A secondarily collected material was separated by cooling the filtrate and was subjected to washing and drying in the same manner as mentioned above.

A hexyl norbornene (HxNB)/diphenyl methyl norbornene methoxysilane (diPhNB) copolymer was used as the copolymer mentioned above. The copolymer was synthesized in the following manner. First, HxNB (8.94 g, 0.05 mol), diPhNB (16.1 g, 0.05 mol), 1-hexene (4.2 g, 0.05 mol) and toluene (142.0 g) were mixed in a 250 mL serum bottle and then heated to 120° C. using an oil bath, thereby forming a solution.

[Pd(PCy$_3$)$_2$(O$_2$CCH$_3$)(NCCH$_3$)]tetrakis(pentafluorophenyl) borate (Pd1446) (5.8×10$^{-3}$ g, 4.0×10$^{-6}$ mol) and N-dimethyl anillinium tetrakis(pentafluorophenyl) borate (DANFABA) (3.2×10$^{-3}$ g, 4.0×10$^{-6}$ mol) were added to the solution in a form of a concentrated dichloromethane solution. Thereafter, the resultant solution was kept heated for six hours at 120° C.

As methanol is dripped to the vigorously-stirred mixed solution, a copolymer was precipitated. The precipitated copolymer was collected by filtering the same and vacuum-dried in an 80° C. oven. A weight of the copolymer dried was 12.0 g (48%). When a molecular weight of the copolymer was measured using a GPC in a THF solvent (polystyrene conversion), Mw was 16,196 and Mn was 8,448.

A composition of the copolymer was analyzed using $^1$H-NMR. A ratio of HxNB and diPhNB was found to be 54/46. A refractive index of the copolymer was measured using a prism coupling method. At a wavelength of 633 nm, the refractive index was 1.5569 in a TE mode and 1.5555 in a TM mode. The dried copolymer was dissolved in a sufficient quantity of mesytilene, thereby producing a 10 wt % copolymer solution.

INDUSTRIAL APPLICABILITY

Each of an optical waveguide film and a laminated type optical waveguide film according to the present invention includes a plurality of core portions arranged side by side within the same layer so as to extend along an X-direction; and cladding portions covering side surfaces of each of the core portions and made of a resin material having a refractive index smaller than that of each of the core portions. A size of a gap between the core portions adjoining to each other in a Y-direction orthogonal to the X-direction varies along the X-direction over at least a part of an entire area of the optical waveguide.

Therefore, even when shrinkage occurs in the optical waveguide film, dimension on a cut surface can be kept accurate by selecting a position where a size of a waveguide gap of the optical waveguide coincides with a size of a waveguide gap of a connection counterpart (connector) and cutting the optical waveguide film in that position. As a result, it is possible to enhance connectivity of the optical waveguide to the connection counterpart (to reduce light loss). This makes it possible to provide an optical waveguide film which can produce an optical waveguide capable of making optical communication in a high quality.

In addition, an optical waveguide assembly according to the present invention includes a plurality of strip-shaped core portions arranged side by side in a Y-direction orthogonal to an X-direction so as to extend along the X-direction; and a plurality of cladding portions adjoining to side surfaces of each of the core portions, wherein the core portions and the cladding portions are positioned on an XY plane. The optical waveguide assembly is made of a solidified product obtained by solidifying a material which undergoes shrinkage when being solidified.

With the optical waveguide assembly, it is possible to produce a plurality of optical waveguides by cutting at least one of the cladding portions along a longitudinal direction thereof. The optical waveguide assembly has a varying area where widths of the cladding portions continuously vary toward the X-direction. Cutter lanes parallel to the X-axis of the XY plane are provided in the cladding portions. In the optical waveguide assembly, a ratio of lengths obtained by deducting the widths of the cutter lanes from the widths of the cladding portions is kept constant in an arbitrary X coordinate throughout the varying area thereof.

Therefore, even if the optical waveguide assembly suffers from individual dimension variability, it is possible to provide, in addition to the advantageous effects provided by the optical waveguide film, an advantageous effect of efficiently producing a plurality of optical waveguides while preventing occurrence of eccentricity in end portions.

Moreover, an optical waveguide, an optical wiring line, an optical/electrical combination substrate and an electronic device according to the present invention are produced using the optical waveguide film or the optical waveguide assembly according to the present invention.

Accordingly, the optical waveguide film, the laminated type optical waveguide film, the optical waveguide, the optical waveguide assembly, the optical wiring line, the optical/electrical combination substrate and the electronic device according to the present invention are industrially applicable.

What is claimed is:

1. An optical waveguide film, comprising:
  a core layer having an optical waveguide area having an X-direction and a Y-direction orthogonal to the X-direction, the optical waveguide area including a plurality of core portions each having a strip shape and positioned side by side, a plurality of cladding portions each having a strip shape and each comprising a resin having an optical refractive index smaller than an optical refractive index of each of the core portions, and a plurality of cutter lanes formed in the cladding portions such that the cutter lanes are extending parallel to the X-direction of the optical waveguide area in the cladding portions,
  wherein the plurality of core portions is positioned such that the core portions are extending along the X-direction of the optical waveguide area, the cladding portions are interposed between side surfaces of the core portions such that the core portions are adjoined through the cladding portions in the core layer, the plurality of cutter lanes is positioned such that a plurality of optical waveguides is formed by cutting at least one of the cladding portions along at least one of the cutter lanes, and the optical waveguide area in the core layer includes a varying area portion in which each of the cladding portions has a width varying along the X-direction at a constant ratio, where the width is obtained by deducting widths of the cutter lanes from widths of the cladding portions at an arbitrary X-coordinate of an X-axis in the X-direction.

2. The optical waveguide film as claimed in claim 1, wherein each of the cutter lanes has a width which is the same value.

3. The optical waveguide film as claimed in claim 1, wherein the width of each of the cutter lanes is larger than a cutting width of a cutting tool to be used in cutting the cladding portions.

4. The optical waveguide film as claimed in claim 1, wherein each of the cutter lanes has a width which is kept constant along the X-direction.

5. The optical waveguide film as claimed in claim 1, wherein the cutter lanes are formed in each of the cladding portions or are intermittently formed in a part of the cladding portions in a cycle.

6. The optical waveguide film as claimed in claim 1, wherein the core portions have alignment and shapes which are in a line-symmetric relationship with respect to the X-axis in the X-direction, before the core layer is solidified, in one of the core portions positioned at a Y positive side higher than the X-axis, Y coordinates of a contour line of the one of the core portions positioned at an X-axis side are represented by an X function $f_a(X)$ and the Y coordinates of a contour line of the one of the core portions positioned on the opposite side from the X-axis are represented by an X function $f_b(X)$, the X functions $f_a(X)$ and $f_b(X)$ satisfy $f_a(X)>\{(N'-½)P+N'W\}Rmax$ and $f_b(X)<\{(N'+½)P+N'W\}Rmin$, where in $f_a(X)>\{(N'-½)P+N'W\}Rmax$ and $f_b(X)<\{(N'+½)P+N'W\}Rmin$, N' is an arrangement order of the one of the core portions counted from the X-axis, when the number of the core portions is odd, the arrangement order N' is expressed by an integer reckoned from a central core portion (N'=0), when the number of the core portions is even, the arrangement order N' is expressed by a half-integer reckoned from a core portion closest to the X-axis (N'=0.5), P, W, Rmax and Rmin are the same values in each of the core portions, P is a setting value of a width of each of the optical waveguides produced by cutting the cladding portions, W is a cutting width of a cutting tool to be used in cutting the cladding portions Rmax and Rmin are real numbers of 1 to 1.05, and Rmax is greater than Rmin.

7. The optical waveguide film as claimed in claim 6, wherein the core layer comprises a material which has individual variability in a shrinkage ratio which is a magnification ratio of a pre-solidification dimension to a post-solidification dimension, and in $f_a(X)>\{(N'-½)P+N'W\}Rmax$ and $f_b(X)<\{(N'+½)P+N'W\}Rmin$, Rmax is a maximum of the shrinkage ratio within the individual variability and Rmin is a minimum of the shrinkage ratio within the individual variability.

8. The optical waveguide film as claimed in claim 6, wherein each of the X functions $f_a(X)$ and $f_b(X)$ is a sine curve or a cosine curve.

9. The optical waveguide film as claimed in claim 6, wherein the X functions $f_a(X)$ and $f_b(X)$ are defined by the $f_a(X)=A\cos(2\pi X/L)+B-C/2$ and $f_b(X)=A\cos(2\pi X/L)+B+C/2$, where A, B and L are real numbers, and C is a positive real number in $f_a(X)=A\cos(2\pi X/L)+B-C/2$ and $f_b(X)=A\cos(2\pi X/L)+B+C/2$.

10. The optical waveguide film as claimed in claim 6, wherein the X functions $f_a(X)$ and $f_b(X)$ are defined by $f_a(X)=A\sin(2\pi X/L)+B-C/2$ and $f_b(X)=A\sin(2\pi X/L)+B+C/2$, where A, B and L are real numbers, and C is a positive real number in $f_a(X)=A\sin(2\pi X/L)+B-C/2$ and $f_b(X)=A\sin(2\pi X/L)+B+C/2$.

11. The optical waveguide film as claimed in claim 9 or 10, wherein in $f_a(X)=A\cos(2\pi X/L)+B-C/2$, $f_b(X)=A\cos(2\pi X/L)+B+C/2$, $f_a(X)=A\sin(2\pi X/L)+B-C/2$ and $f_b(X)=A\sin(2\pi X/L)+B+C/2$, of each of the core portions, L and C are the same values, and A and B are different values.

12. The optical waveguide film as claimed in claim 9 or 10, wherein before the core layer is solidified, in $f_a(X)=A\cos(2\pi X/L)+B-C/2$, $f_b(X)=A\cos(2\pi X/L)+B+C/2$, $f_a(X)=A\sin(2\pi X/L)+B-C/2$ and $f_b(X)=A\sin(2\pi X/L)+B+C/2$, A is represented by $A=(Rmax-Rmin)(P+W)N'/2$, where N', P, W, Rmax and Rmin are the same as N', P, W, Rmax and Rmin of $f_a(X)>\{(N'-½)P+N'W\}Rmax$ and $f_b(X)<\{(N'+½)P+N'W\}Rmin$.

13. The optical waveguide film as claimed in claim 9 or 10, wherein before the core layer is solidified, in $f_a(X)=A\cos(2\pi X/L)+B-C/2$, $f_b(X)=A\cos(2\pi X/L)+B+C/2$, $f_a(X)=A\sin(2\pi X/L)+B-C/2$ and $f_b(X)=A\sin(2\pi X/L)+B+C/2$, B is represented by $B=(Rmax+Rmin)(P+W)N'/2$, where N', P, W, Rmax and Rmin are the same as N', P, W, Rmax and Rmin of $f_a(X)>\{(N'-½)P+N'W\}Rmax$ and $f_b(X)<\{(N'+½)P+N'W\}Rmin$.

14. The optical waveguide film as claimed in claim 6, further comprising a plurality of alignment marks formed at an interval along the X-axis.

15. The optical waveguide film as claimed in claim 14, wherein the alignment marks comprise first and second alignment mark groups formed on both outsides of a core portion bundle including the core portions such that the alignment marks included in the first alignment mark group are positioned on one side of the core portion bundle and the alignment marks included in the second alignment mark group are positioned on the other side of the core portion bundle in a paired relationship.

16. The optical waveguide film as claimed in claim 14, wherein the alignment marks are made of the same material as the core portions.

17. The optical waveguide film as claimed in claim 1, wherein each of the cladding portions further includes an alignment line extending along a center line interconnecting middle points of the cladding portions in a width direction thereof.

18. The optical waveguide film as claimed in claim 1, wherein each of the core portions is formed of a first norbornene-based material as a major component thereof and each of the cladding portions is formed of a second norbornene-based material having a refractive index lower than a refractive index of the first norbornene-based material as a major component thereof.

19. An optical wiring line, comprising:
an optical waveguide obtained by cutting the optical waveguide film as defined in claim 1 along the strip-shaped cladding portions provided with the cutter lanes.

20. An optical/electrical combination substrate, comprising:
a substrate;
an electrical wiring line mounted on the substrate; and
the optical wiring line as claimed in claim 19 and formed on the substrate.

21. An electronic device, comprising:
the optical/electrical combination substrate as claimed in claim 20.

22. The optical waveguide film as claimed in claim 1, wherein the optical waveguide area in the core layer includes a cutting area portion in which the core portions are positioned with a gap having a same size in the Y-direction of the optical waveguide area and varying at constant ratio in the X-direction of the optical waveguide area along the X-direction, and the core portions in the cutting area portion satisfy a relationship represented by $Y=A\cos(2\pi X/L)+B$ or $Y=A\sin(2\pi X/L)+B$, where A, B and L are arbitrary real numbers except 0, X is an X coordinate in the X-direction of the optical waveguide area, and Y is a Y coordinate in the Y-direction of the optical waveguide area.

23. The optical waveguide film as claimed in claim 22, wherein in $Y=A\cos(2\pi X/L)+B$ and $Y=A\sin(2\pi X/L)+B$, L is the same value, and A and B are different values.

24. The optical waveguide film as claimed in claim 22, wherein the core layer is a solidified product obtained by solidifying a material which undergoes shrinkage when being solidified, and before the core layer is solidified, in $Y=A\cos(2\pi X/L)+B$ and $Y=A\sin(2\pi X/L)+B$ of each of the core portions, A satisfies $A=\pm(Rmax-Rmin)(N-1)P/4$, where Rmax and Rmin are arbitrary real numbers of 1 or more, Rmax is greater than Rmin, N satisfies $N=N_0+2-2n$ where $N_0$ is the total number of the core portions, and n is an arrangement order of the core portions from an external side thereof, and P is a positive real number in $A=\pm(Rmax-Rmin)(N-1)P/4$.

25. The optical waveguide film as claimed in claim 22, wherein the core layer is a solidified product obtained by solidifying a material which undergoes shrinkage when being solidified, and before the core layer is solidified, in $Y=A\cos(2\pi X/L)+B$ and $Y=A\sin(2\pi X/L)+B$ of each of the core portions, B satisfies $B=\pm(Rmax+Rmin)(N-1)P/4$, where Rmax and Rmin are arbitrary real numbers of 1 or more, Rmax is greater than Rmin, N satisfies $N=N_0+2-2n$ where $N_0$ is the total number of the core portions, and n is an arrangement order of the core portions from an external side thereof, and P is a positive real number in $B=\pm(Rmax+Rmin)(N-1)P/4$.

26. The optical waveguide film as claimed in claim 24 or 25, wherein in $A=\pm(Rmax-Rmin)(N-1)P/4$ and $B=\pm(Rmax+Rmin)(N-1)P/4$, Rmax is the same value, and Rmin is the same value.

27. The optical waveguide film as claimed in claim 24 or 25, wherein the plurality of core portions of the core layer is configured to be connected to a connection counterpart having a plurality of light receiving portions, respectively, and in $A=\pm(Rmax-Rmin)(N-1)P/4$ and $B=\pm(Rmax+Rmin)(N-1)P/4$, P is equal to a size of a gap between the light receiving portions of the connection counterpart.

28. The optical waveguide film as claimed in claim 24 or 25, wherein in $A=\pm(Rmax-Rmin)(N-1)P/4$ and $B=\pm(Rmax+Rmin)(N-1)P/4$, P is the same value.

29. The optical waveguide film as claimed in claim 1 or 22, wherein the plurality of core portions has M core portions where M is an integer of 3 or more, and a gap between the core portions adjoining to each other in the Y-direction are M−1 in number, and the gap between the core portions has a constant ratio of sizes in the optical waveguide area.

30. The optical waveguide film as claimed in claim 1 or 22, wherein each of the core portions provides an optical path having an inclination angle with respect to the X-direction continuously varying along the X-direction.

31. The optical waveguide film as claimed in claim 1 or 22, wherein a gap between the core portions has a size cyclically varying along the X-direction.

32. The optical waveguide film as claimed in claim 30, wherein each of the core portions has an optical path having an inclination angle of 1° or less with respect to the X-direction.

33. The optical waveguide film as claimed in claim 1 or 22 further comprising at least one alignment pattern formed along the X-direction of the optical waveguide area, wherein the alignment pattern includes a plurality of alignment marks positioned relative to a gap of the core portions having the same size in the Y-direction of the optical waveguide area and varying at the constant ratio in the X-direction of the optical waveguide area.

34. The optical waveguide film as claimed in claim 33, wherein the alignment pattern is formed within the core layer.

35. The optical waveguide film as claimed in claim 33, wherein the optical waveguide area in the core layer includes a cutting area portion in which the core portions are positioned with a gap having a same size in the Y-direction of the optical waveguide area and varying at constant ratio in the X-direction of the optical waveguide area along the X-direction, and the alignment pattern further includes at least one linear pattern which divides the cutting area portion of the optical waveguide area.

36. The optical waveguide film as claimed in claim 1 or 22, wherein each of the core portions is formed of a first norbornene-based material as a major component thereof and each of the cladding portions is formed of a second norbornene-based material having a refractive index lower than a refractive index of the first norbornene-based material as a major component thereof.

37. The optical waveguide film as claimed in claim 1, wherein the optical waveguide area in the core layer includes a cutting area portion in which the core portions are positioned with a gap having a same size in the Y-direction of the optical waveguide area and varying at constant ratio in the X-direction of the optical waveguide area along the X-direction, and each of the cladding portions has a width continuously varying at the constant ratio in the X-direction in the cutting area portion of the optical waveguide area.

38. The optical waveguide film as claimed in claim 37, wherein the width of each of the cladding portions continuously increases from one end of the cutting area portion toward the other end of the cutting area portion in the X-direction.

39. The optical waveguide film as claimed in claim 37, wherein the width of each of the cladding portions has a ratio W2/W1 in a range of 1.01 to 1.1, where a minimum value and a maximum value of the width of the cladding portion in the cutting area portion are defined as W1 and W2, respectively.

40. The optical waveguide film as claimed in claim 37, wherein the cutting area portion includes a plurality of expected cutting areas intermittently existing along the X-direction.

41. The optical waveguide film as claimed in claim 37, wherein each of the cladding portions has a width having a constant variation percentage.

42. A laminated type optical waveguide film produced by laminating the optical waveguides formed by cutting at least one of the cladding portions along at least one of the cutter lanes in the optical waveguide film as claimed in claim 1.

43. An optical waveguide comprising one of the optical waveguides formed by cutting at least one of the cladding portions along at least one of the cutter lanes in the optical waveguide film as claimed in claim 1.

44. The optical waveguide as claimed in claim 43, further comprising a cladding layer provided on at least one of surfaces of the core layer.

* * * * *